United States Patent
Kim et al.

(10) Patent No.: US 11,652,912 B2
(45) Date of Patent: May 16, 2023

(54) METHOD AND APPARATUS FOR REQUESTING COMPLETE INFORMATION OR PARTIAL INFORMATION ON APS IN TRANSMISSION MLD IN WIRELESS LAN SYSTEM

(71) Applicant: LG Electronics Inc., Seoul (KR)

(72) Inventors: Namyeong Kim, Seoul (KR); Jeongki Kim, Seoul (KR); Jinsoo Choi, Seoul (KR); Insun Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 17/527,403

(22) Filed: Nov. 16, 2021

(65) Prior Publication Data

US 2022/0159106 A1 May 19, 2022

(30) Foreign Application Priority Data

Nov. 19, 2020 (KR) .................. 10-2020-0155785

(51) Int. Cl.
*H04L 69/22* (2022.01)
*H04L 27/26* (2006.01)
*H04W 76/15* (2018.01)
*H04L 5/00* (2006.01)

(52) U.S. Cl.
CPC ............. *H04L 69/22* (2013.01); *H04L 5/003* (2013.01); *H04L 27/26025* (2021.01); *H04W 76/15* (2018.02)

(58) Field of Classification Search
CPC ... H04L 69/22; H04L 5/003; H04L 27/26025; H04W 76/15
See application file for complete search history.

(56) References Cited

U.S. PATENT DOCUMENTS

| | | | | |
|---|---|---|---|---|
| 2019/0335454 A1* | 10/2019 | Huang | ...................... | H04B 1/48 |
| 2021/0014911 A1* | 1/2021 | Patil | .................... | H04W 72/0446 |
| 2021/0051563 A1* | 2/2021 | Zhou | ...................... | H04W 28/06 |
| 2022/0287121 A1* | 9/2022 | Hwang | ............... | H04W 74/085 |

\* cited by examiner

*Primary Examiner* — Bryan Lee
(74) *Attorney, Agent, or Firm* — Fish & Richardson P.C.

(57) ABSTRACT

Provided are a method and apparatus for requesting complete information or partial information on access points (APs) in a transmitting multi-link device (MLD) in a wireless local area network (WLAN) system. Specifically, a receiving MLD transmits a probe request frame to the transmitting MLD through a first link. The receiving MLD receives a probe response frame from the transmitting MLD through the first link. The transmitting MLD includes a first transmitting station (STA) operating in the first link and a second transmitting STA operating in a second link. The receiving MLD includes a first receiving STA operating in the first link and a second receiving STA operating in the second link. The probe request frame includes a profile field of the second receiving STA.

15 Claims, 66 Drawing Sheets

FIG. 1
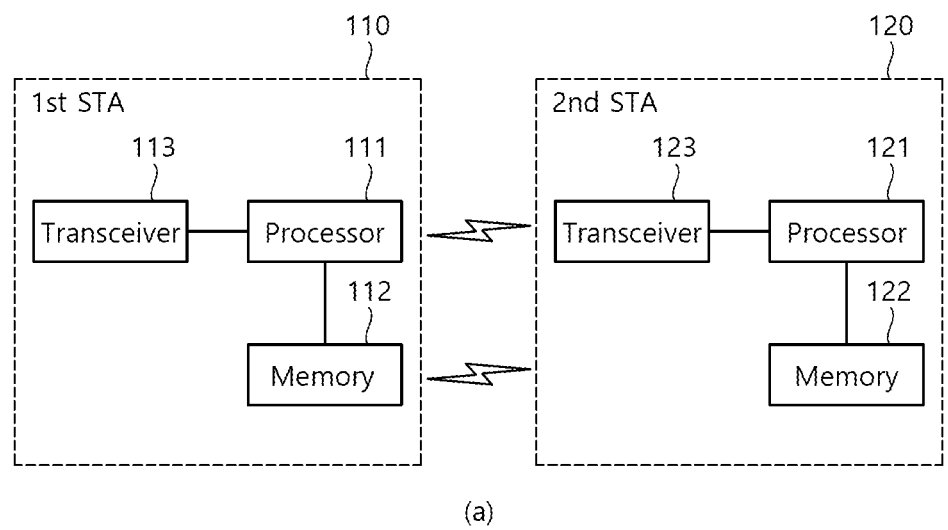
(a)
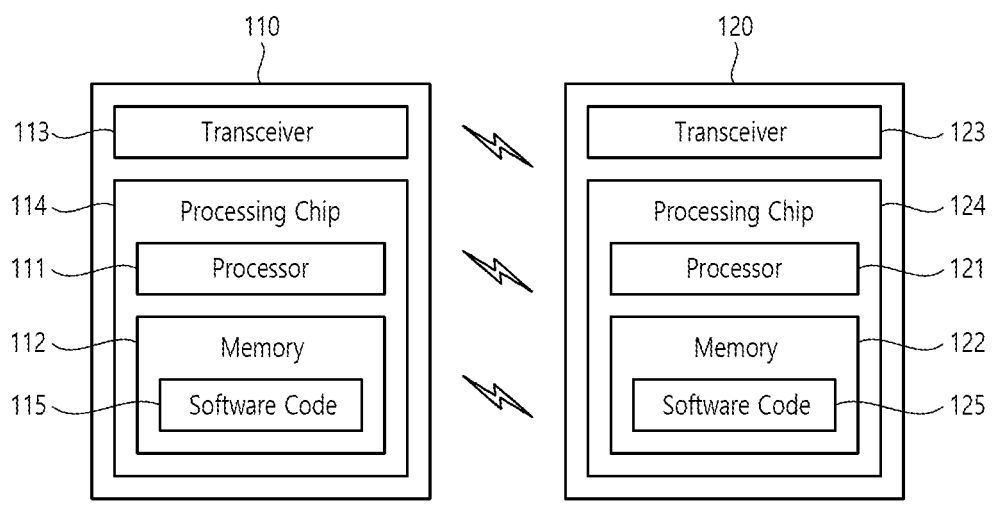
(b)

FIG. 2
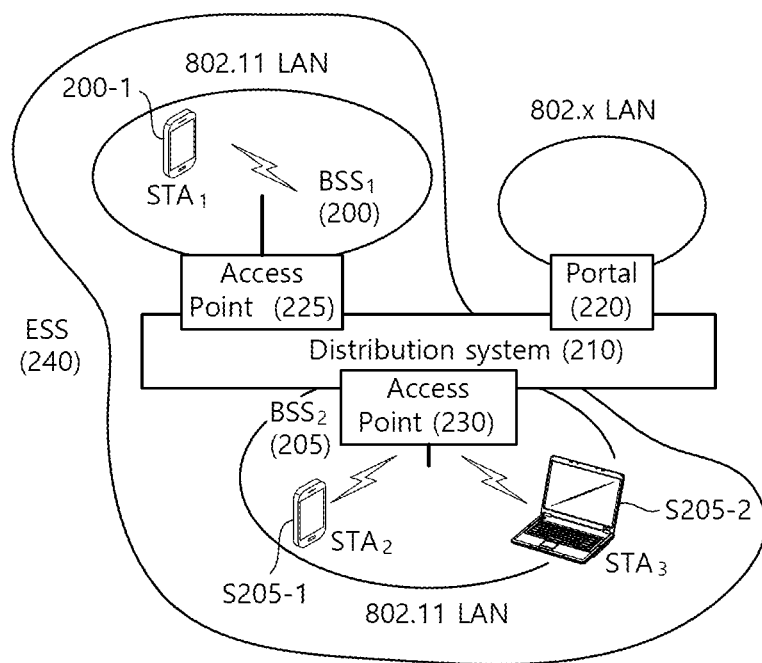
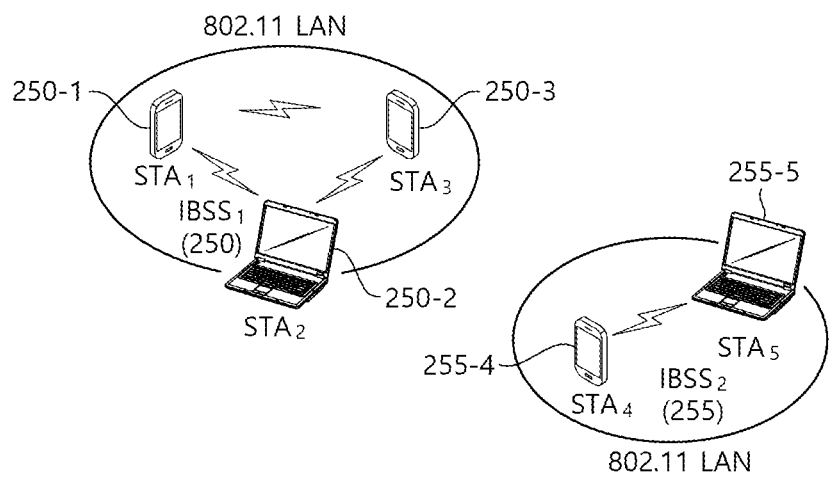

FIG. 4
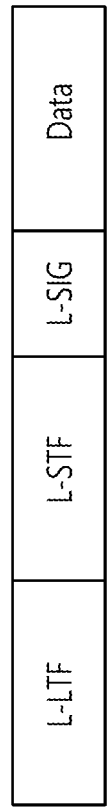
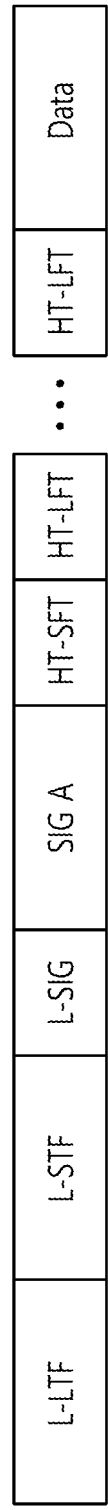
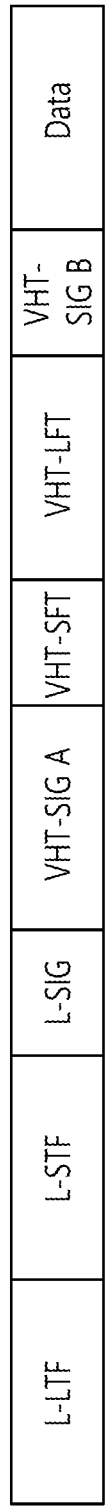
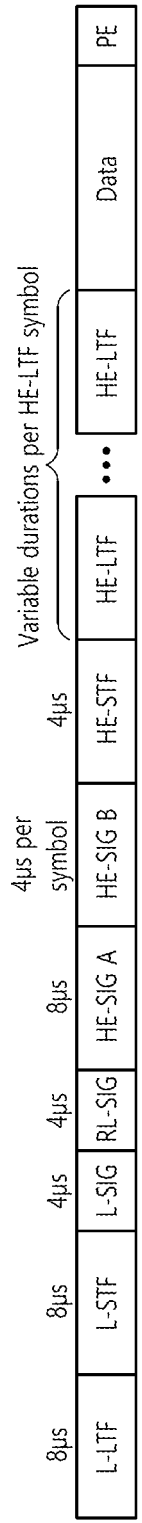

FIG. 10

| L-STF | L-LTF | L-SIG | RL-SIG | U-SIG | EHT-SIG | EHT-STF | EHT-LTF | Data |

FIG. 12

| Multi-link STA ||| 
|---|---|---|
| 5GHz | 6GHz ||
| STA 1 Link 1 | STA 2 Link 2 | STA 3 Link 3 |

FIG. 27

| Element ID | Length | Link Range | Info Range | Link Condition | Info Condition | ... | Per-STA Profile (x) | Per-STA Profile (y) |
|---|---|---|---|---|---|---|---|---|

FIG. 28

| Element ID | Length | Requested Element IDs |
|---|---|---|

Octets:         1         1         variable

FIG. 29

| Element ID | Length | Element ID Extension | Requested Element ID | Requested Element IDs |
|---|---|---|---|---|
| 1 | 1 | 1 | 1 | variable |

Octets:

FIG. 30

| Element ID | Length | Probe Response Group Bitmap (optional) | Probe Response Option Bitmaps |
|---|---|---|---|
| 1 | 1 | 0 or 1 | variable |

Octets:

FIG. 31

| Element ID | Length | Element ID Extension | The number of Link ID | Link ID |
|---|---|---|---|---|
| Octets: 1 | 1 | 1 | 1 | variable |

FIG. 32

| Element ID | Length | Element ID Extension | The number of Link ID | Link ID | Requested Element IDs/ Requested Element ID extensions |
|---|---|---|---|---|---|
| 1 | 1 | 1 | 1 | variable | variable |

Octets:

FIG. 33

| Element ID | Length | Element ID Extension | Requested Element IDs/ Requested Element ID extensions |

FIG. 34

| Element ID | Length | Element ID Extension | The number of Link ID | Link ID (x) | The number of Elements | Request or/and Extended Request Element | ... | Link ID (y) | The number of Elements | Request or/and Extended Request Element |

FIG. 35

| Element ID | Length | Element ID Extension | The number of Link ID | Link ID (x) | The number of Elements | Requested Element IDs/ Requested Element ID extensions | ... | Link ID (y) | The number of Elements | Requested Element IDs/ Requested Element ID extensions |
|---|---|---|---|---|---|---|---|---|---|---|

| Element ID | Length | Element ID Extension | The number of Elements | Requested Element IDs/ Requested Element ID extensions | The number of Link ID | Link ID (x) | The number of Elements | Requested Element IDs/ Requested Element ID extensions | ... |

| ... | Link ID (y) | The number of Elements | Requested Element IDs/ Requested Element ID extensions |

FIG. 38

| MLD Request Element | Request or/and Extended Request Element |

FIG. 56

| Element ID | Length | Element ID Extension | Link ID (x) | Change Sequence(x) | ... | Link ID (y) | Change Sequence(y) |
|---|---|---|---|---|---|---|---|

FIG. 57

| Element ID | Length | Element ID Extension | The number of Link ID | Link ID | Change Sequence |

FIG. 59

| Element ID | Length | Change Sequence |
|---|---|---|

Octets: 1 1 1

METHOD AND APPARATUS FOR REQUESTING COMPLETE INFORMATION OR PARTIAL INFORMATION ON APS IN TRANSMISSION MLD IN WIRELESS LAN SYSTEM

CROSS-REFERENCE TO RELATED APPLICATION

Pursuant to 35 U.S.C. § 119 (a), this application claims the benefit of Korean Patent Application No. 10-2020-0155785 filed on Nov. 19, 2020, the contents of which are all hereby incorporated by reference herein in their entirety.

BACKGROUND

Field of the Disclosure

The present disclosure relates to a multi-link operation in a wireless local area network (WLAN) system, and more particularly, to a method and apparatus for requesting complete information or partial information on access points (APs) in a transmitting multi-link device (MLD).

Related Art

A wireless local area network (WLAN) has been improved in various ways. For example, the IEEE 802.11ax standard proposed an improved communication environment using orthogonal frequency division multiple access (OFDMA) and downlink multi-user multiple input multiple output (DL MU MIMO) techniques.

The present specification proposes a technical feature that can be utilized in a new communication standard. For example, the new communication standard may be an extreme high throughput (EHT) standard which is currently being discussed. The EHT standard may use an increased bandwidth, an enhanced PHY layer protocol data unit (PPDU) structure, an enhanced sequence, a hybrid automatic repeat request (HARQ) scheme, or the like, which is newly proposed. The EHT standard may be called the IEEE 802.11be standard.

In a new WLAN standard, an increased number of spatial streams may be used. In this case, in order to properly use the increased number of spatial streams, a signaling technique in the WLAN system may need to be improved.

SUMMARY

The present specification proposes a method and apparatus for requesting complete information or partial information on access points (APs) in a transmitting multi-link device (MLD) in a wireless local area network (WLAN) system.

An example of the present specification proposes a method of requesting complete information or partial information on APs in a transmitting MLD.

The present embodiment may be performed in a network environment in which a next-generation WLAN system (IEEE 802.11be or EHT WLAN system) is supported. The next-generation WLAN system is a WLAN system evolved from an 802.11ax system, and may satisfy backward compatibility with the 802.11ax system.

The present embodiment proposes a method and apparatus in which, when a non-AP station (STA) requests information on not a peer AP but other APs through a probe request frame, the probe request frame includes a complete information profile subfield, so that whether the request is a partial information request or a complete information request is determined according to a value of the complete information profile subfield. Herein, a transmitting MLD may correspond to an AP MLD, and a receiving MLD may correspond to a non-AP MLD. If the non-AP STA is a first receiving STA, a first transmitting STA connected to the first receiving STA through a first link may be a peer AP, and second and third transmitting STAs connected through other links may be other APs.

The receiving MLD transmits a probe request frame to a transmitting MLD through a first link.

The receiving MLD receives a probe response frame from the transmitting MLD through the first link.

The transmitting MLD includes a first transmitting STA operating in the first link and a second transmitting STA operating in a second link. The receiving MLD includes a first receiving STA operating in the first link and a second receiving STA operating in the second link.

The probe request frame includes a profile field of the second receiving STA. The profile field of the second receiving STA includes a first complete information profile subfield.

When the first receiving STA requests partial information on the second link, a value of the first complete information profile subfield is set to 0. When the first receiving STA requests complete information on the second link, the value of the first complete information profile subfield is set to 1.

That is, the probe response frame may be configured based on the value of the first complete information profile subfield. When the value of the first complete information profile subfield is 0, the transmitting MLD may transfer the probe response frame including the partial information the second link. When the value of the first complete information profile subfield is 1, the transmitting MLD may transfer the probe response frame including the complete information on the second link.

According to an embodiment proposed in the present specification, whether a non-AP STA requests complete information on other APs in an AP MLD or requests partial information thereof may be identified through a complete information profile subfield. Therefore, there is an advantage in that the AP MLD effectively determines whether a probe response frame includes the complete information on other APs or includes the partial information thereof, by decoding the complete information profile subfield.

BRIEF DESCRIPTION OF THE DRAWINGS

FIG. 1 shows an example of a transmitting apparatus and/or receiving apparatus of the present specification.

FIG. 2 is a conceptual view illustrating the structure of a wireless local area network (WLAN).

FIG. 4 illustrates an example of a PPDU used in an IEEE standard.

FIG. 10 illustrates an example of a PPDU used in the present specification.

FIG. 12 illustrates an example of a structure of a non-AP MLD.

FIG. 27 illustrates an example of a field newly proposed to indicate link switching and reconnection.

FIG. 28 illustrates an example of a request IE format.

FIG. 29 illustrates an example of an extended request IE format.

FIG. 30 illustrates an example of a PV1 probe response option element format.

FIG. 31 illustrates an example of an MLD request element.

FIG. 32 illustrates another example of an MLD request element.

FIG. 33 illustrates an example in which a new element is defined based on an MLD request element.

FIG. 34 illustrates another example of an MLD request element.

FIG. 35 illustrates another example of an MLD request element.

FIG. 36 illustrates another example of an MLD request element.

FIG. 37 illustrates another example of an MLD request element.

FIG. 38 illustrates an example of a field for requesting common information.

FIG. 56 illustrates an example of an MLD change sequence format.

FIG. 57 illustrates another example of an MLD change sequence format.

FIG. 59 illustrates an example of a change sequence element in the conventional standard.

DESCRIPTION OF EXEMPLARY EMBODIMENTS

Figure 3:
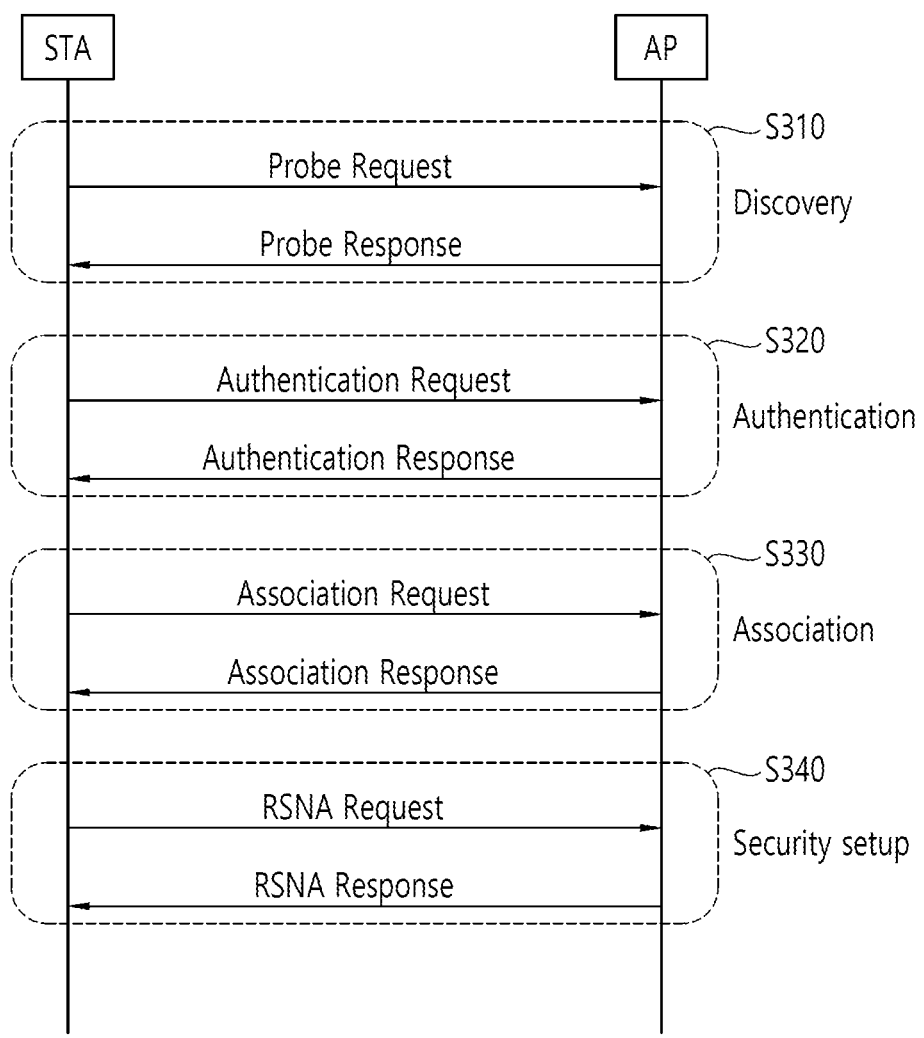
FIG. 3 illustrates a general link setup process.

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

In addition, a parenthesis used in the present specification may mean "for example". Specifically, when indicated as "control information (EHT-signal)", it may mean that "EHT-signal" is proposed as an example of the "control information". In other words, the "control information" of the present specification is not limited to "EHT-signal", and "EHT-signal" may be proposed as an example of the "control information". In addition, when indicated as "control information (i.e., EHT-signal)", it may also mean that "EHT-signal" is proposed as an example of the "control information".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11a/g/n/ac standard or the IEEE 802.11ax standard. In addition, the present specification may also be applied to the newly proposed EHT standard or IEEE 802.11be standard. In addition, the example of the present specification may also be applied to a new WLAN standard enhanced from the EHT standard or the IEEE 802.11be standard. In addition, the example of the present specification may be applied to a mobile communication system. For example, it may be applied to a mobile communication system based on long term evolution (LTE) depending on a 3rd generation partnership project (3GPP) standard and based on evolution of the LTE. In addition, the example of the present specification may be applied to a communication system of a 5G NR standard based on the 3GPP standard.

Hereinafter, in order to describe a technical feature of the present specification, a technical feature applicable to the present specification will be described.

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may imply a link for communication from a non-AP STA to an SP STA, and an uplink PPDU/packet/signal or the like may be transmitted through the uplink. In addition, in the present specification, a downlink may imply a link for communication from the AP STA to the non-AP STA, and a downlink PPDU/packet/signal or the like may be transmitted through the downlink.

FIG. 2 is a conceptual view illustrating the structure of a wireless local area network (WLAN).

An upper part of FIG. 2 illustrates the structure of an infrastructure basic service set (BSS) of institute of electrical and electronic engineers (i.e. EE) 802.11.

Referring the upper part of FIG. 2, the wireless LAN system may include one or more infrastructure BSSs 200 and 205 (hereinafter, referred to as BSS). The BSSs 200 and 205 as a set of an AP and a STA such as an access point (AP) 225 and a station (STA1) 200-1 which are successfully synchronized to communicate with each other are not concepts indicating a specific region. The BSS 205 may include one or more STAs 205-1 and 205-2 which may be joined to one AP 230.

The BSS may include at least one STA, APs providing a distribution service, and a distribution system (DS) 210 connecting multiple APs.

The distribution system 210 may implement an extended service set (ESS) 240 extended by connecting the multiple BSSs 200 and 205. The ESS 240 may be used as a term indicating one network configured by connecting one or more APs 225 or 230 through the distribution system 210. The AP included in one ESS 240 may have the same service set identification (SSID).

A portal 220 may serve as a bridge which connects the wireless LAN network (i.e. EE 802.11) and another network (e.g., 802.X).

In the BSS illustrated in the upper part of FIG. 2, a network between the APs 225 and 230 and a network between the APs 225 and 230 and the STAs 200-1, 205-1, and 205-2 may be implemented. However, the network is configured even between the STAs without the APs 225 and 230 to perform communication. A network in which the communication is performed by configuring the network even between the STAs without the APs 225 and 230 is defined as an Ad-Hoc network or an independent basic service set (IBSS).

A lower part of FIG. 2 illustrates a conceptual view illustrating the IBSS.

Referring to the lower part of FIG. 2, the IBSS is a BSS that operates in an Ad-Hoc mode. Since the IBSS does not include the access point (AP), a centralized management entity that performs a management function at the center does not exist. That is, in the IBSS, STAs 250-1, 250-2, 250-3, 255-4, and 255-5 are managed by a distributed manner. In the IBSS, all STAs 250-1, 250-2, 250-3, 255-4, and 255-5 may be constituted by movable STAs and are not permitted to access the DS to constitute a self-contained network.

FIG. 3 illustrates a general link setup process.

In S310, a STA may perform a network discovery operation. The network discovery operation may include a scanning operation of the STA. That is, to access a network, the STA needs to discover a participating network. The STA needs to identify a compatible network before participating in a wireless network, and a process of identifying a network present in a particular area is referred to as scanning. Scanning methods include active scanning and passive scanning.

FIG. 3 illustrates a network discovery operation including an active scanning process. In active scanning, a STA performing scanning transmits a probe request frame and waits for a response to the probe request frame in order to identify which AP is present around while moving to channels. A responder transmits a probe response frame as a response to the probe request frame to the STA having transmitted the probe request frame. Here, the responder may be a STA that transmits the last beacon frame in a BSS of a channel being scanned. In the BSS, since an AP transmits a beacon frame, the AP is the responder. In an IBSS, since STAs in the IBSS transmit a beacon frame in turns, the responder is not fixed. For example, when the STA transmits a probe request frame via channel 1 and receives a probe response frame via channel 1, the STA may store BSS-related information included in the received probe response frame, may move to the next channel (e.g., channel 2), and may perform scanning (e.g., transmits a probe request and receives a probe response via channel 2) by the same method.

Although not shown in FIG. 3, scanning may be performed by a passive scanning method. In passive scanning, a STA performing scanning may wait for a beacon frame while moving to channels. A beacon frame is one of management frames in IEEE 802.11 and is periodically transmitted to indicate the presence of a wireless network and to enable the STA performing scanning to find the wireless network and to participate in the wireless network. In a BSS, an AP serves to periodically transmit a beacon frame. In an IBSS, STAs in the IBSS transmit a beacon frame in turns. Upon receiving the beacon frame, the STA performing scanning stores information about a BSS included in the beacon frame and records beacon frame information in each channel while moving to another channel. The STA having received the beacon frame may store BSS-related information included in the received beacon frame, may move to the next channel, and may perform scanning in the next channel by the same method.

After discovering the network, the STA may perform an authentication process in S320. The authentication process may be referred to as a first authentication process to be clearly distinguished from the following security setup operation in S340. The authentication process in S320 may include a process in which the STA transmits an authentication request frame to the AP and the AP transmits an authentication response frame to the STA in response. The authentication frames used for an authentication request/response are management frames.

The authentication frames may include information about an authentication algorithm number, an authentication transaction sequence number, a status code, a challenge text, a robust security network (RSN), and a finite cyclic group.

The STA may transmit the authentication request frame to the AP. The AP may determine whether to allow the authentication of the STA based on the information included in the received authentication request frame. The AP may provide the authentication processing result to the STA via the authentication response frame.

When the STA is successfully authenticated, the STA may perform an association process in S330. The association process includes a process in which the STA transmits an association request frame to the AP and the AP transmits an association response frame to the STA in response. The association request frame may include, for example, information about various capabilities, a beacon listen interval, a service set identifier (SSID), a supported rate, a supported channel, RSN, a mobility domain, a supported operating class, a traffic indication map (TIM) broadcast request, and an interworking service capability. The association response frame may include, for example, information about various capabilities, a status code, an association ID (AID), a supported rate, an enhanced distributed channel access (EDCA) parameter set, a received channel power indicator (RCPI), a received signal-to-noise indicator (RSNI), a mobility domain, a timeout interval (association comeback time), an overlapping BSS scanning parameter, a TIM broadcast response, and a QoS map.

In S340, the STA may perform a security setup process. The security setup process in S340 may include a process of setting up a private key through four-way handshaking, for example, through an extensible authentication protocol over LAN (EAPOL) frame.

FIG. 4 illustrates an example of a PPDU used in an IEEE standard.

As illustrated, various types of PHY protocol data units (PPDUs) are used in IEEE a/g/n/ac standards. Specifically, an LTF and a STF include a training signal, a SIG-A and a SIG-B include control information for a receiving STA, and a data field includes user data corresponding to a PSDU (MAC PDU/aggregated MAC PDU).

FIG. 4 also includes an example of an HE PPDU according to IEEE 802.11ax. The HE PPDU according to FIG. 4 is an illustrative PPDU for multiple users. An HE-SIG-B may be included only in a PPDU for multiple users, and an HE-SIG-B may be omitted in a PPDU for a single user.

As illustrated in FIG. 4, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted for illustrated time periods (i.e., 4 or 8 μs).

Hereinafter, a resource unit (RU) used for a PPDU is described. An RU may include a plurality of subcarriers (or tones). An RU may be used to transmit a signal to a plurality of STAs according to OFDMA. Further, an RU may also be defined to transmit a signal to one STA. An RU may be used for an STF, an LTF, a data field, or the like.

The RU described in the present specification may be used in uplink (UL) communication and downlink (DL) communication. For example, when UL-MU communication which is solicited by a trigger frame is performed, a transmitting STA (e.g., AP) may allocate a first RU (e.g., 26/52/106/242-RU, etc.) to a first STA through the trigger frame, and may allocate a second RU (e.g., 26/52/106/242-RU, etc.) to a second STA. Thereafter, the first STA may transmit a first trigger-based PPDU based on the first RU, and the second STA may transmit a second trigger-based PPDU based on the second RU. The first/second trigger-based PPDU is transmitted to the AP at the same time period.

For example, when a DL MU PPDU is configured, the transmitting STA (e.g., AP) may allocate the first RU (e.g., 26/52/106/242-RU. etc.) to the first STA, and may allocate the second RU (e.g., 26/52/106/242-RU, etc.) to the second STA. That is, the transmitting STA (e.g., AP) may transmit HE-STF, HE-LTF, and Data fields for the first STA through the first RU in one MU PPDU, and may transmit HE-STF, HE-LTF, and Data fields for the second STA through the second RU.

Figure 5:
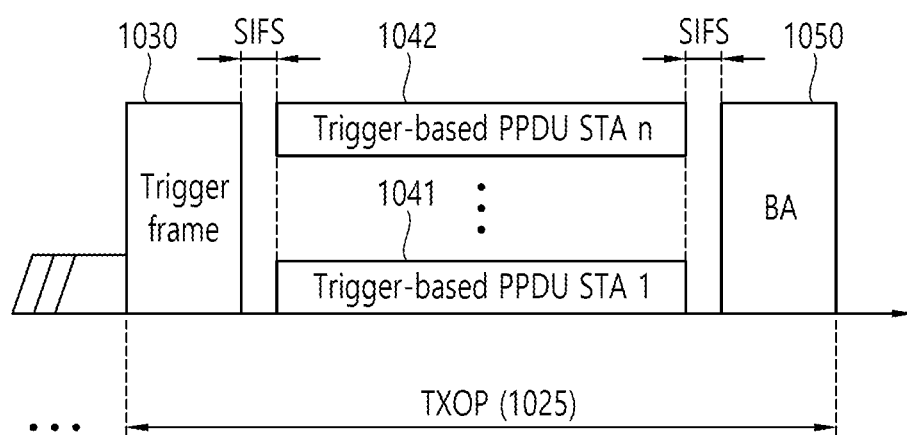
FIG. 5 illustrates an operation based on UL-MU.

FIG. 5 illustrates an operation based on UL-MU. As illustrated, a transmitting STA (e.g., AP) may perform channel access through contending (e.g., a backoff operation), and may transmit a trigger frame 1030. That is, the transmitting STA may transmit a PPDU including the trigger frame 1030. Upon receiving the PPDU including the trigger frame, a trigger-based (TB) PPDU is transmitted after a delay corresponding to SIFS.

TB PPDUs 1041 and 1042 may be transmitted at the same time period, and may be transmitted from a plurality of STAs (e.g., user STAs) having AIDs indicated in the trigger frame 1030. An ACK frame 1050 for the TB PPDU may be implemented in various forms.

A specific feature of the trigger frame is described with reference to FIG. 6 to FIG. 8. Even if UL-MU communication is used, an orthogonal frequency division multiple access (OFDMA) scheme or a MU MIMO scheme may be used, and the OFDMA and MU-MIMO schemes may be simultaneously used.

Figure 6:
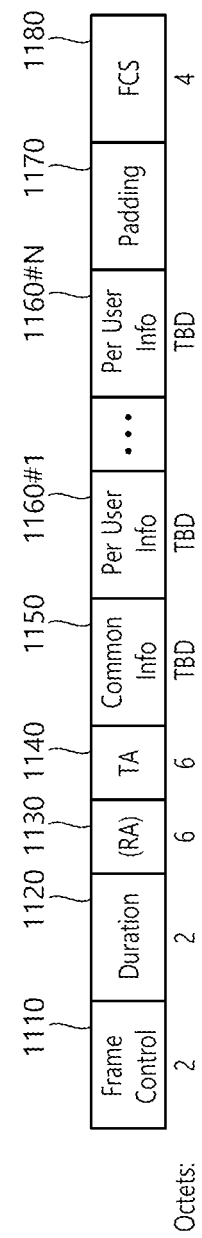
FIG. 6 illustrates an example of a trigger frame.

FIG. 6 illustrates an example of a trigger frame. The trigger frame of FIG. 6 allocates a resource for uplink multiple-user (MU) transmission, and may be transmitted, for example, from an AP. The trigger frame may be configured of a MAC frame, and may be included in a PPDU.

Each field shown in FIG. 6 may be partially omitted, and another field may be added. In addition, a length of each field may be changed to be different from that shown in the figure.

A frame control field 1110 of FIG. 6 may include information related to a MAC protocol version and extra additional control information. A duration field 1120 may include time information for NAV configuration or information related to an identifier (e.g., AID) of an STA.

In addition, an RA field 1130 may include address information of a receiving STA of a corresponding trigger frame, and may be optionally omitted. A TA field 1140 may include address information of an STA (e.g., AP) which transmits the corresponding trigger frame. A common information field 1150 includes common control information applied to the receiving STA which receives the corresponding trigger frame. For example, a field indicating a length of an L-SIG field of an uplink PPDU transmitted in response to the corresponding trigger frame or information for controlling content of an SIG-A field (i.e., HE-SIG-A field) of the uplink PPDU transmitted in response to the corresponding trigger frame may be included. In addition, as common control information, information related to a length of a CP of the uplink PPDU transmitted in response to the corresponding trigger frame or information related to a length of an LTF field may be included.

In addition, per user information fields 1160 #1 to 1160 #N corresponding to the number of receiving STAs which receive the trigger frame of FIG. 6 are preferably included. The per user information field may also be called an "allocation field".

In addition, the trigger frame of FIG. 6 may include a padding field 1170 and a frame check sequence field 1180.

Each of the per user information fields 1160 #1 to 1160 #N shown in FIG. 6 may include a plurality of subfields.

Figure 7:
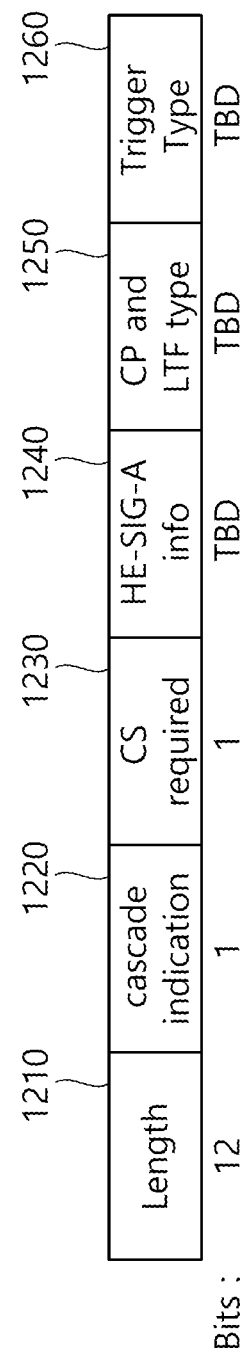
FIG. 7 illustrates an example of a common information field of a trigger frame.

FIG. 7 illustrates an example of a common information field of a trigger frame. A subfield of FIG. 7 may be partially omitted, and an extra subfield may be added. In addition, a length of each subfield illustrated may be changed.

A length field 1210 illustrated has the same value as a length field of an L-SIG field of an uplink PPDU transmitted in response to a corresponding trigger frame, and a length field of the L-SIG field of the uplink PPDU indicates a length of the uplink PPDU. As a result, the length field 1210 of the trigger frame may be used to indicate the length of the corresponding uplink PPDU.

In addition, a cascade identifier field 1220 indicates whether a cascade operation is performed. The cascade operation implies that downlink MU transmission and uplink MU transmission are performed together in the same TXOP. That is, it implies that downlink MU transmission is performed and thereafter uplink MU transmission is performed after a pre-set time (e.g., SIFS). During the cascade operation, only one transmitting device (e.g., AP) may perform downlink communication, and a plurality of transmitting devices (e.g., non-APs) may perform uplink communication.

A CS request field 1230 indicates whether a wireless medium state or an NAV or the like is necessarily considered in a situation where a receiving device which has received a corresponding trigger frame transmits a corresponding uplink PPDU.

An HE-SIG-A information field 1240 may include information for controlling content of an SIG-A field (i.e., HE-SIG-A field) of the uplink PPDU in response to the corresponding trigger frame.

A CP and LTF type field 1250 may include information related to a CP length and LTF length of the uplink PPDU transmitted in response to the corresponding trigger frame. A trigger type field 1260 may indicate a purpose of using the corresponding trigger frame, for example, typical triggering, triggering for beamforming, a request for block ACK/NACK, or the like.

It may be assumed that the trigger type field 1260 of the trigger frame in the present specification indicates a trigger frame of a basic type for typical triggering. For example, the trigger frame of the basic type may be referred to as a basic trigger frame.

Figure 8:
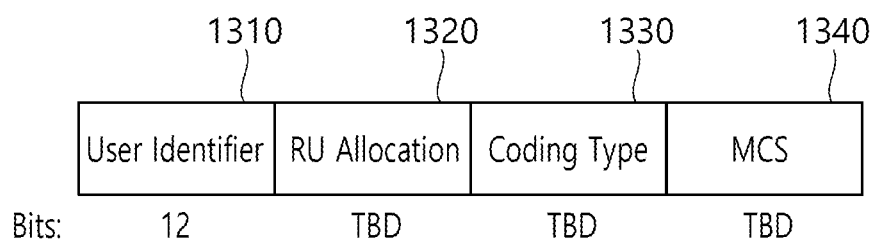
FIG. 8 illustrates an example of a subfield included in a per user information field.

FIG. 8 illustrates an example of a subfield included in a per user information field. A user information field 1300 of FIG. 8 may be understood as any one of the per user information fields 1160 #1 to 1160 #N mentioned above with reference to FIG. 6. A subfield included in the user information field 1300 of FIG. 8 may be partially omitted, and an extra subfield may be added. In addition, a length of each subfield illustrated may be changed.

A user identifier field 1310 of FIG. 8 indicates an identifier of an STA (i.e., receiving STA) corresponding to per user information. An example of the identifier may be the entirety or part of an association identifier (AID) value of the receiving STA.

In addition, an RU allocation field 1320 may be included. That is, when the receiving STA identified through the user identifier field 1310 transmits a TB PPDU in response to the trigger frame, the TB PPDU is transmitted through an RU indicated by the RU allocation field 1320.

The subfield of FIG. 8 may include a coding type field 1330. The coding type field 1330 may indicate a coding type of the TB PPDU. For example, when BCC coding is applied to the TB PPDU, the coding type field 1330 may be set to '1', and when LDPC coding is applied, the coding type field 1330 may be set to '0'.

In addition, the subfield of FIG. 8 may include an MCS field 1340. The MCS field 1340 may indicate an MCS scheme applied to the TB PPDU. For example, when BCC coding is applied to the TB PPDU, the coding type field 1330 may be set to '1', and when LDPC coding is applied, the coding type field 1330 may be set to '0'.

Hereinafter, a UL OFDMA-based random access (UORA) scheme will be described.

Figure 9:
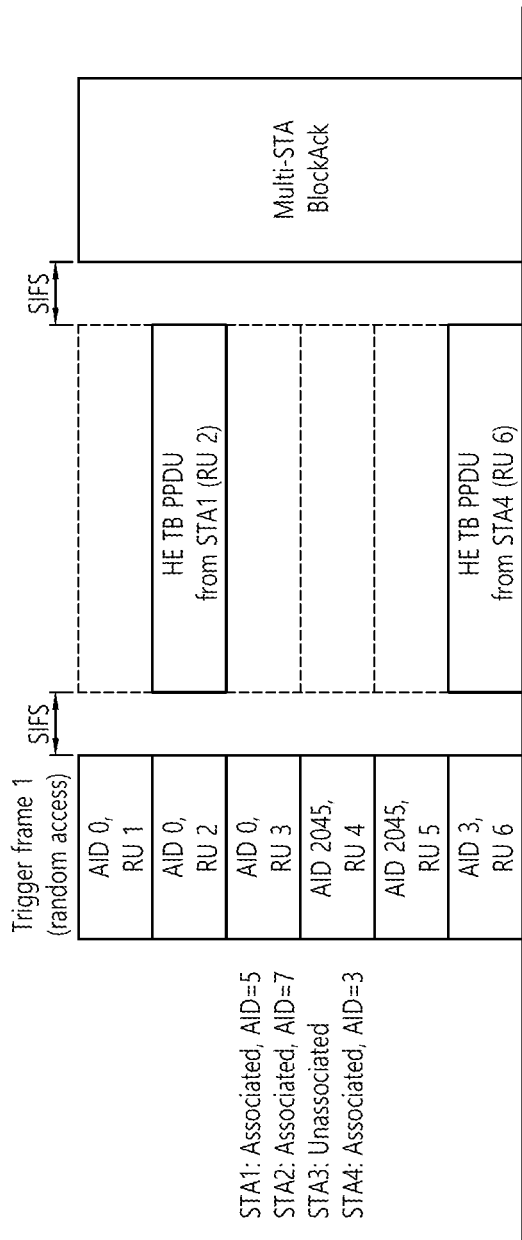
FIG. 9 describes a technical feature of the UORA scheme.

FIG. 9 describes a technical feature of the UORA scheme. A transmitting STA (e.g., AP) may allocate six RU resources through a trigger frame as shown in FIG. 9. Specifically, the AP may allocate a $1^{st}$ RU resource (AID 0, RU 1), a $2^{nd}$ RU resource (AID 0, RU 2), a $3^{rd}$ RU resource (AID 0, RU 3), a 4th RU resource (AID 2045, RU 4), a $5^{th}$ RU resource (AID 2045, RU 5), and a 6th RU resource (AID 3, RU 6). Information related to the AID 0, AID 3, or AID 2045 may be included, for example, in the user identifier field 1310 of FIG. 8. Information related to the RU 1 to RU 6 may be included, for example, in the RU allocation field 1320 of FIG. 8. AID=0 may imply a UORA resource for an associated STA, and AID=2045 may imply a UORA resource for an un-associated STA. Accordingly, the $1^{st}$ to $3^{rd}$ RU resources of FIG. 9 may be used as a UORA resource for the associated STA, the $4^{th}$ and $5^{th}$ RU resources of FIG. 9 may be used as a UORA resource for the un-associated STA, and the $6^{th}$ RU resource of FIG. 9 may be used as a typical resource for UL MU.

In the example of FIG. 9, an OFDMA random access backoff (OBO) of an STA1 is decreased to 0, and the STA1 randomly selects the $2^{nd}$ RU resource (AID 0, RU 2). In addition, since an OBO counter of an STA2/3 is greater than 0, an uplink resource is not allocated to the STA2/3. In addition, regarding an STA4 in FIG. 9, since an AID (e.g., AID=3) of the STA4 is included in a trigger frame, a resource of the RU 6 is allocated without backoff.

Specifically, since the STA1 of FIG. 9 is an associated STA, the total number of eligible RA RUs for the STA1 is 3 (RU 1, RU 2, and RU 3), and thus the STA1 decreases an OBO counter by 3 so that the OBO counter becomes 0. In addition, since the STA2 of FIG. 9 is an associated STA, the total number of eligible RA RUs for the STA2 is 3 (RU 1, RU 2, and RU 3), and thus the STA2 decreases the OBO counter by 3 but the OBO counter is greater than 0. In addition, since the STA3 of FIG. 9 is an un-associated STA, the total number of eligible RA RUs for the STA3 is 2 (RU 4, RU 5), and thus the STA3 decreases the OBO counter by 2 but the OBO counter is greater than 0.

Hereinafter, a PPDU transmitted/received in an STA of the present specification will be described.

FIG. 10 illustrates an example of a PPDU used in the present specification.

The PPDU of FIG. 10 may be called in various terms such as an EHT PPDU, a TX PPDU, an RX PPDU, a first type or N-th type PPDU, or the like. For example, in the present specification, the PPDU or the EHT PPDU may be called in various terms such as a TX PPDU, a RX PPDU, a first type or N-th type PPDU, or the like. In addition, the EHT PPDU may be used in an EHT system and/or a new WLAN system enhanced from the EHT system.

The PPDU of FIG. 10 may indicate the entirety or part of a PPDU type used in the EHT system. For example, the example of FIG. 10 may be used for both of a single-user (SU) mode and a multi-user (MU) mode. In other words, the PPDU of FIG. 10 may be a PPDU for one receiving STA or a plurality of receiving STAs. When the PPDU of FIG. 10 is used for a trigger-based (TB) mode, the EHT-SIG of FIG. 10 may be omitted. In other words, an STA which has received a trigger frame for uplink-MU (UL-MU) may transmit the PPDU in which the EHT-SIG is omitted in the example of FIG. 10.

In FIG. 10, an L-STF to an EHT-LTF may be called a preamble or a physical preamble, and may be generated/transmitted/received/obtained/decoded in a physical layer.

A subcarrier spacing of the L-STF, L-LTF, L-SIG, RL-SIG, U-SIG, and EHT-SIG fields of FIG. 10 may be determined as 312.5 kHz, and a subcarrier spacing of the EHT-STF, EHT-LTF, and Data fields may be determined as 78.125 kHz. That is, a tone index (or subcarrier index) of the L-STF, L-LTF, L-SIG, RL-SIG, U-SIG, and EHT-SIG fields may be expressed in unit of 312.5 kHz, and a tone index (or subcarrier index) of the EHT-STF, EHT-LTF, and Data fields may be expressed in unit of 78.125 kHz.

In the PPDU of FIG. 10, the L-LTE and the L-STF may be the same as those in the conventional fields.

The L-SIG field of FIG. 10 may include, for example, bit information of 24 bits. For example, the 24-bit information may include a rate field of 4 bits, a reserved bit of 1 bit, a length field of 12 bits, a parity bit of 1 bit, and a tail bit of 6 bits. For example, the length field of 12 bits may include information related to a length or time duration of a PPDU. For example, the length field of 12 bits may be determined based on a type of the PPDU. For example, when the PPDU is a non-HT, HT, VHT PPDU or an EHT PPDU, a value of the length field may be determined as a multiple of 3. For example, when the PPDU is an HE PPDU, the value of the length field may be determined as "a multiple of 3"+1 or "a multiple of 3"+2. In other words, for the non-HT, HT, VHT PPDI or the EHT PPDU, the value of the length field may be determined as a multiple of 3, and for the HE PPDU, the value of the length field may be determined as "a multiple of 3"+1 or "a multiple of 3"+2.

For example, the transmitting STA may apply BCC encoding based on a 1/2 coding rate to the 24-bit information of the L-SIG field. Thereafter, the transmitting STA may obtain a BCC coding bit of 48 bits. BPSK modulation may be applied to the 48-bit coding bit, thereby generating 48 BPSK symbols. The transmitting STA may map the 48 BPSK symbols to positions except for a pilot subcarrier{subcarrier index −21, −7, +7, +21} and a DC subcarrier{subcarrier index 0}. As a result, the 48 BPSK symbols may be mapped to subcarrier indices −26 to −22, −20 to −8, −6 to −1, +1 to +6, +8 to +20, and +22 to +26. The transmitting STA may additionally map a signal of {−1, −1, −1, 1} to a subcarrier index{−28, −27, +27, +28}. The aforementioned signal may be used for channel estimation on a frequency domain corresponding to {−28, −27, +27, +28}.

The transmitting STA may generate an RL-SIG generated in the same manner as the L-SIG. BPSK modulation may be applied to the RL-SIG. The receiving STA may know that the RX PPDU is the HE PPDU or the EHT PPDU, based on the presence of the RL-SIG.

A universal SIG (U-SIG) may be inserted after the RL-SIG of FIG. 10. The U-SIB may be called in various terms such as a first SIG field, a first SIG, a first type SIG, a control signal, a control signal field, a first (type) control signal, or the like.

The U-SIG may include information of N bits, and may include information for identifying a type of the EHT PPDU. For example, the U-SIG may be configured based on two symbols (e.g., two contiguous OFDM symbols). Each symbol (e.g., OFDM symbol) for the U-SIG may have a duration of 4 us. Each symbol of the U-SIG may be used to transmit the 26-bit information. For example, each symbol of the U-SIG may be transmitted/received based on 52 data tomes and 4 pilot tones.

Through the U-SIG (or U-SIG field), for example, A-bit information (e.g., 52 un-coded bits) may be transmitted. A first symbol of the U-SIG may transmit first X-bit information (e.g., 26 un-coded bits) of the A-bit information, and a second symbol of the U-SIB may transmit the remaining Y-bit information (e.g. 26 un-coded bits) of the A-bit information. For example, the transmitting STA may obtain 26 un-coded bits included in each U-SIG symbol. The transmitting STA may perform convolutional encoding (i.e., BCC encoding) based on a rate of R=1/2 to generate 52-coded bits, and may perform interleaving on the 52-coded bits. The transmitting STA may perform BPSK modulation on the interleaved 52-coded bits to generate 52 BPSK symbols to be allocated to each U-SIG symbol. One U-SIG symbol may be transmitted based on 65 tones (subcarriers) from a subcarrier index −28 to a subcarrier index +28, except for a DC index 0. The 52 BPSK symbols generated by the transmitting STA may be transmitted based on the remaining tones (subcarriers) except for pilot tones, i.e., tones −21, −7, +7, +21.

For example, the A-bit information (e.g., 52 un-coded bits) generated by the U-SIG may include a CRC field (e.g., a field having a length of 4 bits) and a tail field (e.g., a field having a length of 6 bits). The CRC field and the tail field may be transmitted through the second symbol of the U-SIG. The CRC field may be generated based on 26 bits allocated to the first symbol of the U-SIG and the remaining 16 bits except for the CRC/tail fields in the second symbol, and may be generated based on the conventional CRC calculation algorithm. In addition, the tail field may be used to terminate trellis of a convolutional decoder, and may be set to, for example, "000000".

The A-bit information (e.g., 52 un-coded bits) transmitted by the U-SIG (or U-SIG field) may be divided into version-independent bits and version-dependent bits. For example, the version-independent bits may have a fixed or variable size. For example, the version-independent bits may be allocated only to the first symbol of the U-SIG, or the version-independent bits may be allocated to both of the first and second symbols of the U-SIG. For example, the version-independent bits and the version-dependent bits may be called in various terms such as a first control bit, a second control bit, or the like.

For example, the version-independent bits of the U-SIG may include a PHY version identifier of 3 bits. For example, the PHY version identifier of 3 bits may include information related to a PHY version of a TX/RX PPDU. For example, a first value of the PHY version identifier of 3 bits may indicate that the TX/RX PPDU is an EHT PPDU. In other words, when the transmitting STA transmits the EHT PPDU, the PHY version identifier of 3 bits may be set to a first value. In other words, the receiving STA may determine that the RX PPDU is the EHT PPDU, based on the PHY version identifier having the first value.

For example, the version-independent bits of the U-SIG may include a UL/DL flag field of 1 bit. A first value of the UL/DL flag field of 1 bit relates to UL communication, and a second value of the UL/DL flag field relates to DL communication.

For example, the version-independent bits of the U-SIG may include information related to a TXOP length and information related to a BSS color ID.

For example, when the EHT PPDU is divided into various types (e.g., various types such as an EHT PPDU related to an SU mode, an EHT PPDU related to a MU mode, an EHT PPDU related to a TB mode, an EHT PPDU related to extended range transmission, or the like), information related to the type of the EHT PPDU may be included in the version-dependent bits of the U-SIG.

For example, the U-SIG may include: 1) a bandwidth field including information related to a bandwidth; 2) a field including information related to an MCS scheme applied to EHT-SIG; 3) an indication field including information regarding whether a dual subcarrier modulation (DCM) scheme is applied to EHT-SIG; 4) a field including information related to the number of symbol used for EHT-SIG;

5) a field including information regarding whether the EHT-SIG is generated across a full band; 6) a field including information related to a type of EHT-LTF/STF; and 7) information related to a field indicating an EHT-LTF length and a CP length.

In the following example, a signal represented as a (TX/RX/UL/DL) signal, a (TX/RX/UL/DL) frame, a (TX/RX/UL/DL) packet, a (TX/RX/UL/DL) data unit, (TX/RX/UL/DL) data, or the like may be a signal transmitted/received based on the PPDU of FIG. 10. The PPDU of FIG. 10 may be used to transmit/receive frames of various types. For example, the PPDU of FIG. 10 may be used for a control frame. An example of the control frame may include a request to send (RTS), a clear to send (CTS), a power save-poll (PS-poll), BlockACKReq, BlockAck, a null data packet (NDP) announcement, and a trigger frame. For example, the PPDU of FIG. 10 may be used for a management frame. An example of the management frame may include a beacon frame, a (re-)association request frame, a (re-)association response frame, a probe request frame, and a probe response frame. For example, the PPDU of FIG. 10 may be used for a data frame. For example, the PPDU of FIG. 10 may be used to simultaneously transmit at least two or more of the control frame, the management frame, and the data frame.

Figure 11:
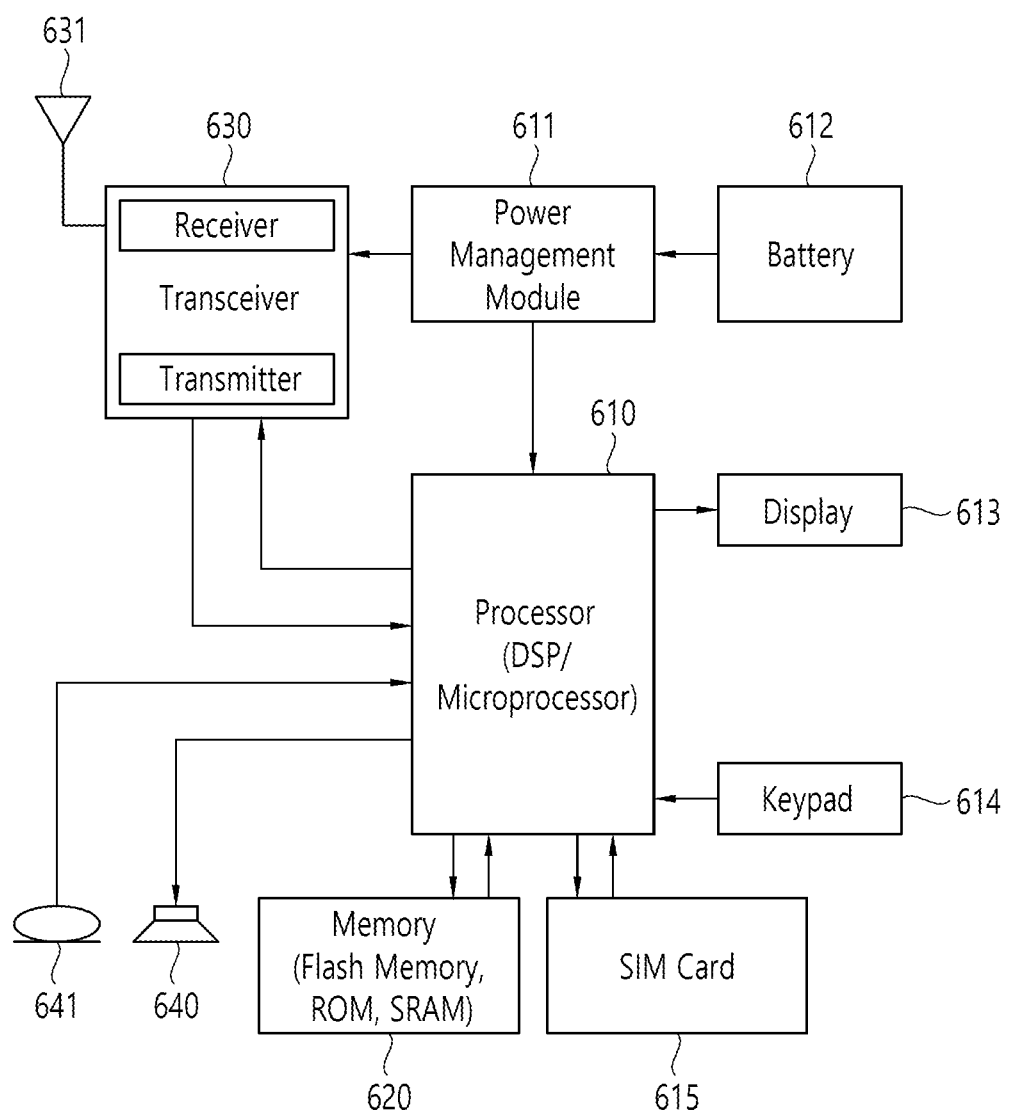
FIG. 11 illustrates an example of a modified transmitting device and/or receiving device of the present specification.

FIG. 11 illustrates an example of a modified transmitting device and/or receiving device of the present specification.

Each device/STA of the sub-figure (a)/(b) of FIG. 1 may be modified as shown in FIG. 11. A transceiver 630 of FIG. 11 may be identical to the transceivers 113 and 123 of FIG. 1. The transceiver 630 of FIG. 11 may include a receiver and a transmitter.

A processor 610 of FIG. 11 may be identical to the processors 111 and 121 of FIG. 1. Alternatively, the processor 610 of FIG. 11 may be identical to the processing chips 114 and 124 of FIG. 1.

A memory 620 of FIG. 11 may be identical to the memories 112 and 122 of FIG. 1. Alternatively, the memory 620 of FIG. 11 may be a separate external memory different from the memories 112 and 122 of FIG. 1.

Referring to FIG. 11, a power management module 611 manages power for the processor 610 and/or the transceiver 630. A battery 612 supplies power to the power management module 611. A display 613 outputs a result processed by the processor 610. A keypad 614 receives inputs to be used by the processor 610. The keypad 614 may be displayed on the display 613. A SIM card 615 may be an integrated circuit which is used to securely store an international mobile subscriber identity (IMSI) and its related key, which are used to identify and authenticate subscribers on mobile telephony devices such as mobile phones and computers.

Referring to FIG. 11, a speaker 640 may output a result related to a sound processed by the processor 610. A microphone 641 may receive an input related to a sound to be used by the processor 610.

Hereinafter, a technical feature of a multi-link (ML) supported by an STA of the present specification will be described.

The STA (AP and/or non-AP STA) of the present specification may support ML communication. The ML communication may imply communication supporting a plurality of links. A link related to the ML communication may include channels (e.g., 20/40/80/160/240/320 MHz channels) of 2.4 GHz, 5 GHz, and 6 GHz bands.

The plurality of links used for the ML communication may be set up variously. For example, the plurality of links supported in one STA for the ML communication may be a plurality of channels in the 2.4 GHz band, a plurality of channels in the 5 GHz band, and a plurality of channels in the 6 GHz band. Alternatively, the plurality of links supported in one STA for the ML communication may be a combination of at least one channel in the 2.4 GHz band (or 5 GHz/6 GHz band) and at least one channel in the 5 GHz band (or 2.4 GHz/6 GHz band). Meanwhile, at least one of the plurality of links supported in one STA for the ML communication may be a channel to which preamble puncturing is applied.

The STA may perform ML setup to perform the ML communication. The ML setup may be performed based on a control frame or a management frame such as Beacon, Probe Request/Response, Association Request/Response, or the like. For example, information on the ML setup may be included in an element field included in the Beacon, the Probe Request/Response, and the Association Request/Response.

Upon completion of the ML setup, an enabled link for the ML communication may be determined. The STA may perform frame exchange through at least one of the plurality of links determined as the enabled link. For example, the enabled link may be used for at least one of the management frame, the control frame, and the data frame.

When one STA supports a plurality of links, a transmitting/receiving device supporting each link may operate as if it is one logical STA. For example, one STA supporting two links may be represented by one ML device (MLD) including a first STA for a first link and a second STA for a second link. For example, one AP supporting two links may be represented by one AP MLD including a first AP for the first link and a second AP for the second link. In addition, one non-AP supporting two links may be represented by one non-AP MLD including the first STA for the first link and the second STA including the second link.

Hereinafter, a feature of the ML setup will be described more specifically.

An MLD (AP MLD and/or non-AP MLD) may transmit information on a link supportable by the MLD through the ML setup. The information on the link may be configured variously. For example, the information on the link may include at least one of: 1) information on whether the MLD (or STA) supports a simultaneous RX/TX operation; 2) information on the number/upper limit of uplink/downlink links supported by the MLD (or STA); 3) information on a location/band/resource of the uplink/downlink links supported by the MLD (or STA); 4) information on a type (management, control, data, etc.) of a frame which is usable or preferred in at least one uplink/downlink link; 5) information on an ACK policy which is usable or preferred in at least one uplink/downlink link; and 6) information on a traffic identifier (TID) which is usable or preferred in at least one uplink/downlink link. The TID is related to a priority of traffic data, and is represented by 8 types of values according to the conventional WLAN standard. That is, 8 TID values corresponding to four access categories (ACs) (AC_BK (background), AC_BE(best effort), AC_VI(video), AC_VO (voice)) may be defined according to the conventional WLAN standard.

For example, it may be pre-set such that all TIDs are mapped to the uplink/downlink links. Specifically, when negotiation is not achieved through the ML setup, all TIDs are used for ML communication, and when mapping between the uplink/downlink link and the TID is negotiated through additional ML setup, the negotiated TID may be used for the ML communication.

A plurality of links related to the ML communication and usable by a transmitting MLD and a receiving MLD may be configured through the ML setup, and such a link may be called an "enabled link". The "enabled link" may be called variously. For example, it may be called variously such as a first link, a second link, a transmission link, a reception link, or the like.

After completion of the ML setup, the MLD may update the ML setup. For example, when there is a need to update information on the link, the MLD may transmit information on a new link. The information on the new link may be transmitted based on at least one of a management frame, a control frame, and a data frame.

A device described hereinafter may be a device of FIG. 1 and/or FIG. 11, and a PPDU may be a PPDU of FIG. 10. The device may be an AP or a non-AP STA. The device described hereinafter may be an AP multi-link device (MLD) or non-AP STA MLD supporting a multi-link.

In an extremely high throughput (EHT) which is a standard discussed after 802.11ax, a multi-link environment in which one or more bands are used simultaneously is taken into consideration. When a device supports a multi-link, the device may simultaneously or alternately use one or more bands (e.g., 2.4 GHz, 5 GHz, 6 GHz, 60 GHz, etc.).

In the specification described below, the MLD implies a multi-link device. The MLD has one or more connected STAs, and has one MAC service access point (SAP) leading to an upper link layer (logical link control (LLC)). The MLD may imply a physical device or a logical device. Hereinafter, the device may imply the MLD.

In the specification described below, a transmitting device and a receiving device may imply the MLD. A first link of the receiving/transmitting device may be a terminal (e.g., STA or AP) which is included in the transmitting/receiving device and which performs signal transmission/reception through the first link. A second link of the receiving/transmitting device may be a terminal (e.g., STA or AP) which is included in the receiving/transmitting device and which performs signal transmission/reception through the second link.

Roughly, two types of multi-link operations may be supported in IEEE802.11be. For example, simultaneously transmit and receive (STR) and non-STR operations may be considered. For example, the STR may be referred to as an asynchronous multi-link operation, and the non-STR may be referred to as a synchronous multi-link operation. The multi-link may include a multi-band. That is, the multi-link may imply a link included in several frequency bands, or may imply several links included in one frequency band.

A multi-link technique is considered in EHT (11be). In this case, the multi-link may include a multi-band. That is, the multi-band may represent a link of several bands, and also may represent several multi-links in one band. Roughly, two types of multi-link operations are considered. An asynchronous operation in which simultaneous TX/RX is possible in several links and a synchronous operation in which the simultaneous TX/RX is not possible are considered. Hereinafter, a capability which enables simultaneous reception and transmission in several links is called simultaneous transmit and receive (STR), and an STA having the SRT capability is called an STR multi-link device (MLD), and an STA not having the STR capability is called a non-STR MLD.

In the specification described below, for convenience of explanation, it is described that the MLD (or a processor of the MLD) controls at least one STA, but the present disclosure is not limited thereto. As described above, the at least one STA may also transmit/receive a signal independently irrespective of the MLD.

According to an embodiment, an AP MLD or a non-AP MLD may be configured with a structure having a plurality of links. In other words, the non-AP MLD may support a plurality of links. The non-AP MLD may include a plurality of STAs. Each of the plurality of STAs may have a link.

A multi-link device (MLD) structure in which one AP/non-AP MLD supports several links is considered as a core technique in the EHT standard (802.11be standard). An STA included in the non-AP MLD may transfer information on other STAs in the non-AP MLD together through one link. Accordingly, there is an advantage in that an overhead is reduced for frame exchange. In addition, there is an advantage in that link usage efficiency of the STA is increased, and power consumption is decreased.

FIG. 12 illustrates an example of a structure of a non-AP MLD.

Referring to FIG. 12, the non-AP MLD may be configured with a structure having a plurality of links. In other words, the non-AP MLD may support a plurality of links. The non-AP MLD may include a plurality of STAs. Each of the plurality of STAs may have a link. Although FIG. 12 illustrates the example of the structure of the non-AP MLD structure, a structure of an AP MLD may also be configured to be the same as the example of the structure of the non-AP MLD illustrated in FIG. 12.

For example, the non-AP MLD may include an STA 1, an STA 2, and an STA 3. The STA 1 may operate in a link 1. The link 1 may be included in a 5 GHz band. The STA 2 may operate in a link 2. The link 2 may be included in a 6 GHz band. The STA 3 may operate in a link 3. The link 3 may be included in a 6 GHz band. A band in which the link 1/2/3 is included is for exemplary purposes only, and may also be included in 2.4, 5, and 6 GHz bands.

As such, in case of the AP/non-AP MLD supporting the multi-link, APs of the AP MLD and STAs of the non-AP MLD may be connected to respective links through a link setup procedure. In addition, the link connected in this case may be switched or re-connected to another link by the AP MLD or the non-AP MLD according to a situation.

In addition, in the EHT standard, the link may be classified into an anchored link and a non-anchored link to reduce power consumption. The anchored link or the non-anchored link may be called variously. For example, the anchored link may be called a primary link. The non-anchored link may be called a secondary link.

According to an embodiment, the AP MLD supporting the multi-link may manage each link by specifying the link as the anchored link or the non-anchored link. The AP MLD may support one or more links as the anchored link, among a plurality of links. The non-AP MLD may use one or more anchored links thereof selected from an anchored link list (an anchored link list supported by the AP MLD).

For example, the anchored link may be used for not only frame exchange for synchronization but also non-data frame exchange (i.e., beacon and management frames). In addition, the non-anchored link may be used only for data frame exchange.

The non-AP MLD may monitor only the anchored link to receive beacon and management frames during an idle period. Therefore, the non-AP MLD shall be connected to at least one anchored link to receive the beacon and management frames. The one or more anchored links shall always maintain an enable state. Unlike this, the non-anchored link is used only for data frame exchange. Therefore, an STA corresponding to the non-anchored link (or an STA connected to the non-anchored link) may enter a doze state during the idle period in which a channel/link is not used. Accordingly, there is an advantage in that power consumption can be decreased.

Therefore, in the specification described below, a protocol in which an AP MLD or a non-AP MLD dynamically recommends or requests a link reconnection according to a situation may be proposed for efficient link connection. In addition, in the specification described below, an anchored link reconnection protocol may be additionally proposed in consideration of a characteristic of not only a typical link but also an anchored link used for the purpose of power reduction.

Embodiment for Link Switching and Reconnection

According to an embodiment, each link between an AP MLD and a non-AP MLD may be determined in an association or (re)association procedure. In this case, the AP MLD and the non-AP MLD may perform frame exchange through a connected link. A specific embodiment in which the AP MLD and the non-AP MLD are connected through a link setup procedure may be described with reference to FIG. 13.

Figure 13:
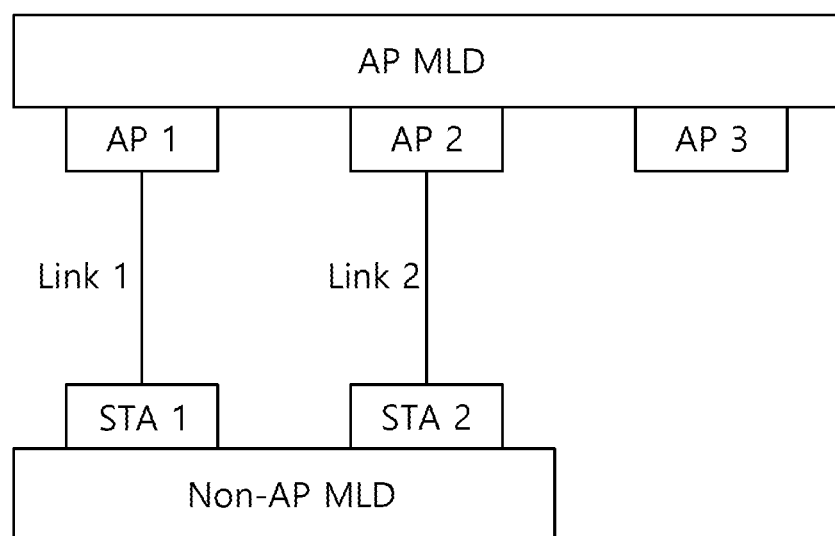
FIG. 13 illustrates an example in which an AP MLD and a non-AP MLD are connected through a link setup procedure.

FIG. 13 illustrates an example in which an AP MLD and a non-AP MLD are connected through a link setup procedure.

Referring to FIG. 13, the AP MLD may include an AP 1, an AP 2, and an AP 3. The non-AP MLD may include an STA 1 and an STA 2. The AP 1 and the STA 1 may be connected through a link 1. The AP 2 and the STA 2 may be connected through a link 2.

For example, the AP 1 and the STA 1 may be connected through the link 1 by using a first link setup procedure. The AP 2 and the STA 2 may be connected through the link 2 by using a second link setup procedure. As another example, the AP MLD and the non-AP MLD may be connected by using one link setup procedure. In other words, the AP MLD and the non-AP MLD may be connected through the link 1 and the link 2, based on one link setup procedure.

As described above, each of the AP and the STA may perform frame exchange through the connected link. In addition, information on other APs for different links or other STAs for different links may be transmitted/received through one link.

However, after the link setup procedure, the AP MLD or the non-AP MLD may request link switching or reconnection for more efficient frame exchange (e.g., load balancing or interference avoiding, etc.) according to a situation/environment.

An embodiment for the link switching or reconnection may be described with reference to FIG. 14.

Figure 14:
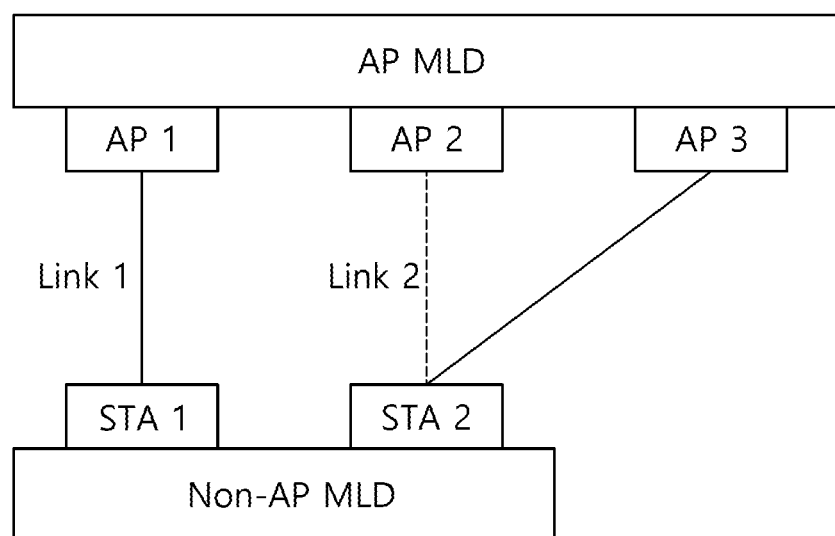
FIG. 14 illustrates an example in which a link is switched or reconnected.

FIG. 14 illustrates an example in which a link is switched or reconnected.

Referring to FIG. 14, an STA 2 is previously connected to an AP 2. There may be an excessive data load of the AP 2 at a later time. The STA 2 may be reconnected to an AP 3 which has a relatively small data load. In this case, there is an advantage in that an AP MLD and a non-AP MLD may effectively perform data exchange.

Figure 15:
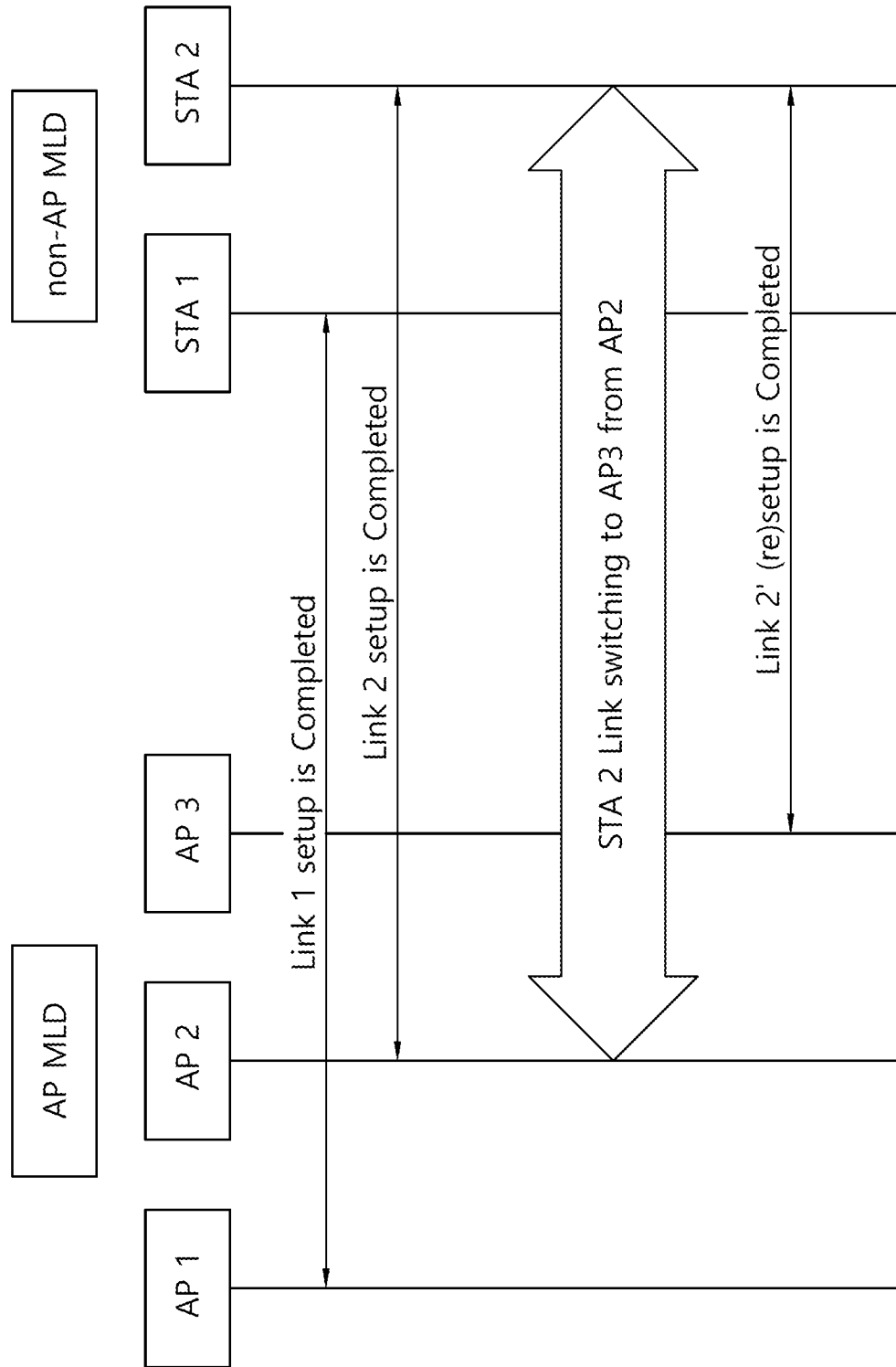
FIG. 15 illustrates an example in which a link is switched or reconnected in detail.

FIG. 15 illustrates an example in which a link is switched or reconnected in detail.

Referring to FIG. 15, an AP 1 of an AP MLD may be connected to an STA 1 of a non-AP MLD through a link 1. An AP 2 of the AP MLD may be connected to an STA 2 through a link 2. At a later time, the STA 2 may attempt/request a connection to an AP 3 through link switching or reconnection, and the STA 2 may be connected to the AP 3 through the link 2, based on the link switching or reconnection.

According to an embodiment, the non-AP MLD and the AP MLD may request a link transition for performance improvement. The AP MLD and the non-AP MLD may transmit and receive/exchange a variety of information for each current link and information on a link state. Therefore, based on the link state and the variety of information for each current link, the AP MLD and the non-AP MLD may select a link which is more appropriate to transmit/receive a signal, and may transmit the aforementioned information to facilitate the selection. For example, the variety of information for each current link may include information on a data traffic load for each link and channel access capability between the links. For example, the link state may be set to 'disable' or 'enable' or the like.

In the specification described below, a process in which the AP MLD/non-AP MLD negotiates with the non-AP MLD/AP MLD to request switching or reconnection to another link, not a link connected to improve performance, may be called "link switching negotiation". The term of the "link switching negotiation" may be variously called and changeable.

In the link switching negotiation process, the non-AP MLD (or AP MLD) may request to switch a link connected to a specific STA to another link, and the AP MLD (or non-AP MLD) may respond to this request through a request accept or decline message.

For example, as shown in FIG. 15, when the link switching is agreed through the link switching negotiation, the STA may perform a link re-setup process in which the existing link is reconnected by switching from the AP 2 to the AP 3.

Hereinafter, the link switching or reconnection process may be described distinctively for a case of being requested by the AP MLD and a case of being requested by the non-AP MLD.

Embodiment in which an AP MLD Requests Link Switching or Reconnection

According to an embodiment, for effective data transmission, an AP MLD may request a non-AP MLD for link switching or reconnection. For example, for load balancing, the AP MLD may request an STA for switching or reconnection to a more effective link, based on data traffic of each AP.

For example, the AP MLD may calculate/verify/confirm a link appropriate for STAs of the non-AP MLD, based on data traffic load information for each AP and/or channel access capability information between the links (e.g., information on simultaneous TX/RX (STR) capability, etc.), or the like. Thereafter, the AP MLD may request the STA (or non-AP MLD) for the link switching or reconnection, based on the data traffic load for each AP and/or the channel access capability information between the links, or the like.

As described above, when the link switching is requested, the AP MLD may transmit link information which is considered most appropriate for the non-AP MLD through the request message. For example, the request message may include a beacon or management frame, or the like.

An element or field including link information which is considered most appropriate may be proposed, in association with the embodiment described above. The newly proposed element or field may be defined as a "recommended link". The "recommended link" is for exemplary purposes, and the specific term "element" or "field" is changeable.

recommend link (element/field): an element or field used when an AP MLD recommends a link which is most appropriate for an STA of a non-AP MLD, based on a variety of information for each link (e.g., a data load for each link, etc.). For example, the recommended link (element/field) may be indicated by AP MLD's link ID information or AP BSS information, etc. In other words, the recommended link (element/field) may include AP MLD's link ID information or AP BSS information, etc.

According to an embodiment, the recommended link (element/field) may be transmitted optionally by being included in a link switching response. For example, the STA may establish a connection to a link recommended by the AP, based on the element/field (i.e., recommended link). As another example, the STA may request a connection to a link different from the indicated link, based on the element/field (i.e., recommended link) and additional information owned by the STA.

A specific signal exchange process of the AP MLD and non-AP MLD may be described with reference to FIG. 16 according to the aforementioned embodiment.

Figure 16:
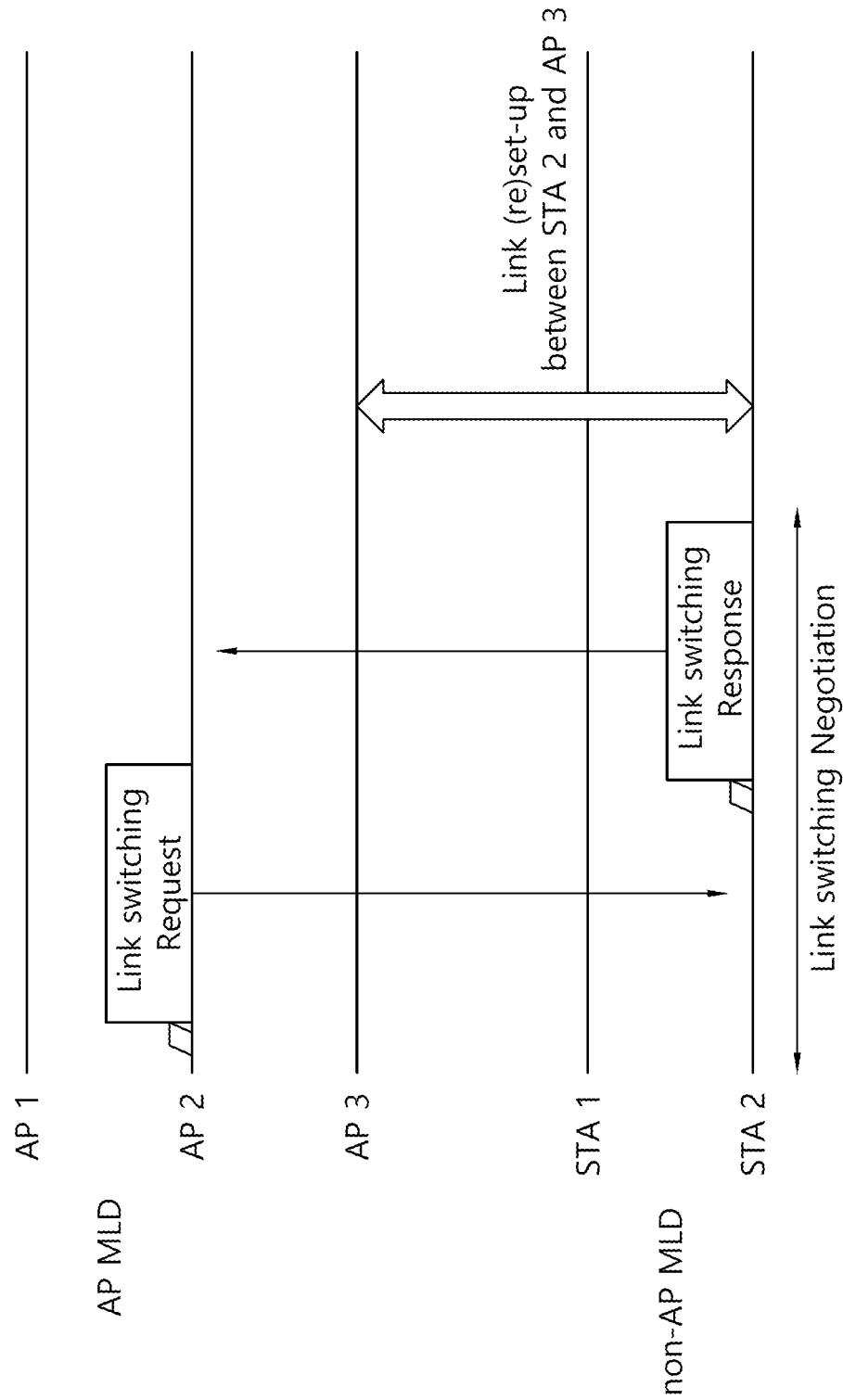
FIG. 16 illustrates an operation of an AP MLD and non-AP MLD for link switching or reconnection.

FIG. 16 illustrates an operation of an AP MLD and non-AP MLD for link switching or reconnection.

Referring to FIG. 16, in a situation where an STA 2 is connected to an AP 2 through a link 2, a lot of data traffic may be concentrated in the AP 2. In other words, in the situation where the STA 2 is connected to the AP 2 through the link 2, a lot of data traffic may be generated in the AP 2.

The AP MLD (or AP 2) may request the non-AP MLD (or STA 2) to reconnect to an AP 3 which has relatively few STA connections. In general, a message for requesting the reconnection is transmitted to the STA (i.e., the STA 2) which desires to be reconnected, but may be transmitted to any STA (i.e., other STAs) according to a situation (e.g., a channel situation or a link state). In other words, an STA to which a request message (e.g., a link switching request frame) for requesting the reconnection is transmitted may be switched according to the channel situation or the link state.

For example, the STA (i.e., STA 2) which has received the request message for requesting the reconnection may transmit a response message of "accept" (e.g., a link switching response frame) when the request is accepted. As another example, the STA (i.e., STA 2) may transmit a response message of "decline" when the request is declined.

In general, the STA (e.g., STA 2) which accepts the reconnection transmits the response message to the existing link (e.g., a link connected before the reconnection), but the response message may also be transmitted through any link (i.e., other STAs) by using a multi-link characteristic.

If the STA 2 accepts the link reconnection request, after transmission of the response message, the STA 2 may disconnect from the existing AP 2 and may request a link reconnection to an AP 3. In this case, a reconnection request process may be performed identically to a link setup process between the existing MLDs. After the link setup process is complete between the AP 3 and the STA 2, the STA 2 may perform frame exchange with the AP 3 through the link 2.

Otherwise, if the STA 2 declines the link reconnection request, the STA 2 and the AP 2 may directly use the previously connected link (i.e., link 2).

According to an embodiment, when the AP requests the STA for link switching, if an appropriate link is recommended, the STA may switch the link to the recommended link or may not switch the link. For example, in order for the AP to recommend the link appropriate for the STA, the aforementioned recommended link may be used.

For example, the STA may accept the link switching with a response message for the request message for requesting the reconnection of the AP. The STA may accept/verify the link switching to the recommended link, and may request the AP for another link switching, based on different information other than information included in the request message.

Accordingly, the AP may need to notify the STA of whether the response message is accepted. To this end, the AP may transmit to the STA a confirmation message (e.g., a link switching confirmation frame) for a response message (e.g., a link switching response frame) of the STA.

A specific operation of the AP MLD and non-AP MLD of the aforementioned embodiment may be described with reference to FIG. 17.

Figure 17:
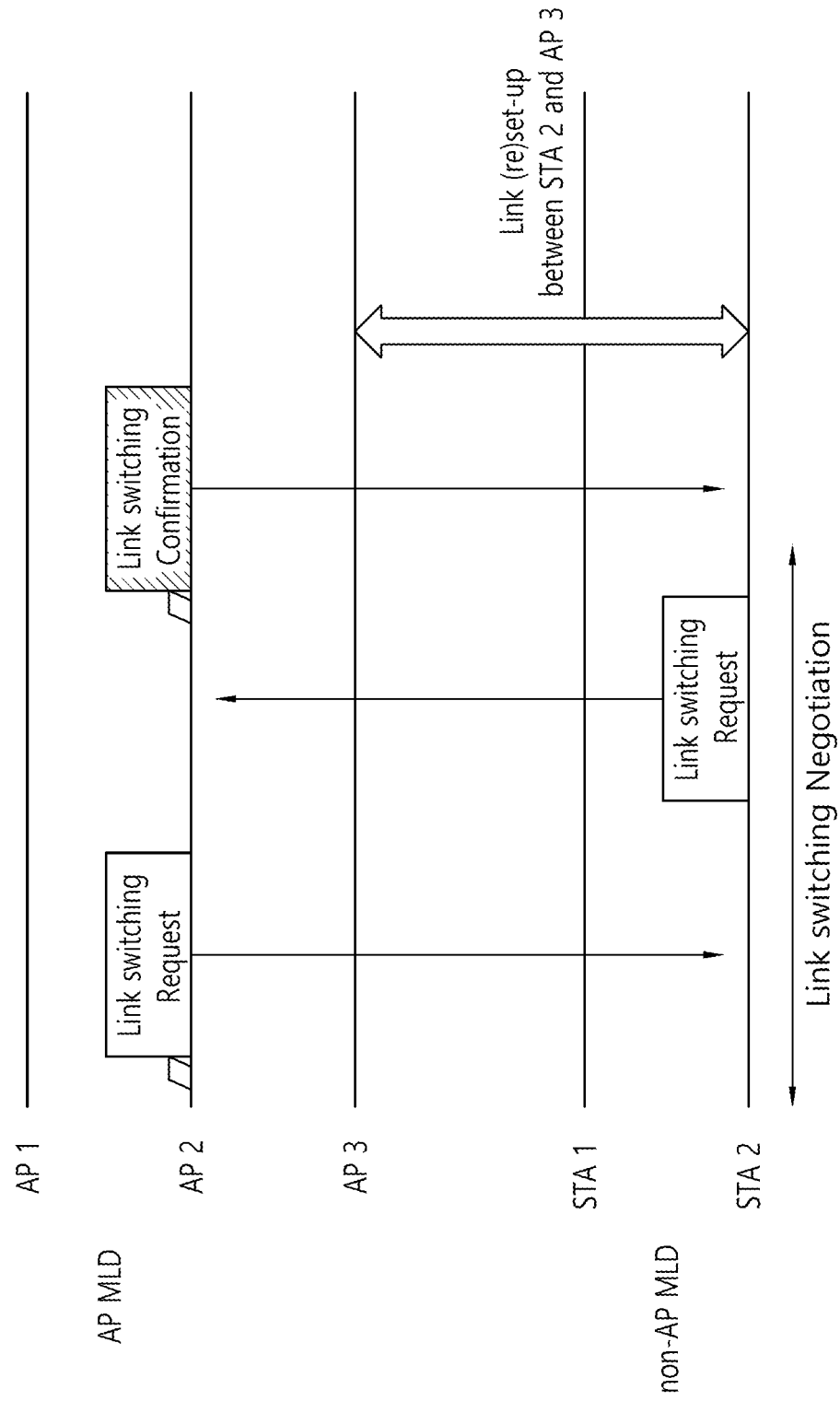
FIG. 17 illustrates an operation of an AP MLD and non-AP MLD for link switching or reconnection.

FIG. 17 illustrates an operation of an AP MLD and non-AP MLD for link switching or reconnection.

Referring to FIG. 17, an AP 2 may request an STA 2 for link switching by including recommended link information. In other words, the AP 2 may transmit to the STA 2 a link switching request frame including the recommended link information.

The STA 2 may transmit whether a link request is accepted through a link switching response frame.

For example, when link switching is accepted, the STA 2 may transmit a link switching response frame including information on a link to be switched. In this case, the information on the link to be switched may be identical to, or different from, a recommended link.

As another example, when the STA 2 responds with a link switching response frame by selecting a different link other than the recommended link provided by the AP 2, the AP may transmit to the STA a message indicating whether it is finally accepted. The message may be called a link switching confirmation frame.

For example, the AP 2 may accept link switching to a link specified by the STA 2, through the link switching confirmation frame. The STA 2 may attempt to switch the link to the link specified by the STA 2, based on the link switching confirmation frame.

As another example, the AP 2 may decline the link switching to the link specified by the STA 2, through the link switching confirmation frame. The STA 2 and the AP 2 may maintain a connection with the previously connected link without having to switch the link.

The embodiment illustrated in FIG. 17 may also apply to a case where the AP transmits the link switching request frame without including the recommended link information. For example, when the AP (e.g., AP 2) transmits the link switching request frame to the STA (e.g., STA 2) without the recommended link information, the STA may directly specify a link to be switched, based on information owned by the STA, and then may respond to the AP through the link switching response frame. In this case, the AP shall also finally transmit the link switching confirmation frame for the accept. Therefore, even if the recommend link information is not included in the link switching request frame, the embodiment in which the AP transmits the link switching confirmation frame may apply.

Embodiment in which a Non-AP MLD Requests Link Switching or Reconnection

According to an embodiment, a non-AP MLD may request an AP MLD for link switching or reconnection in order to perform efficient data transmission. For example, in order to use STR capability in data transmission, the non-AP MLD may request the AP MLD to switch or reconnect to a connected link.

Figure 18:
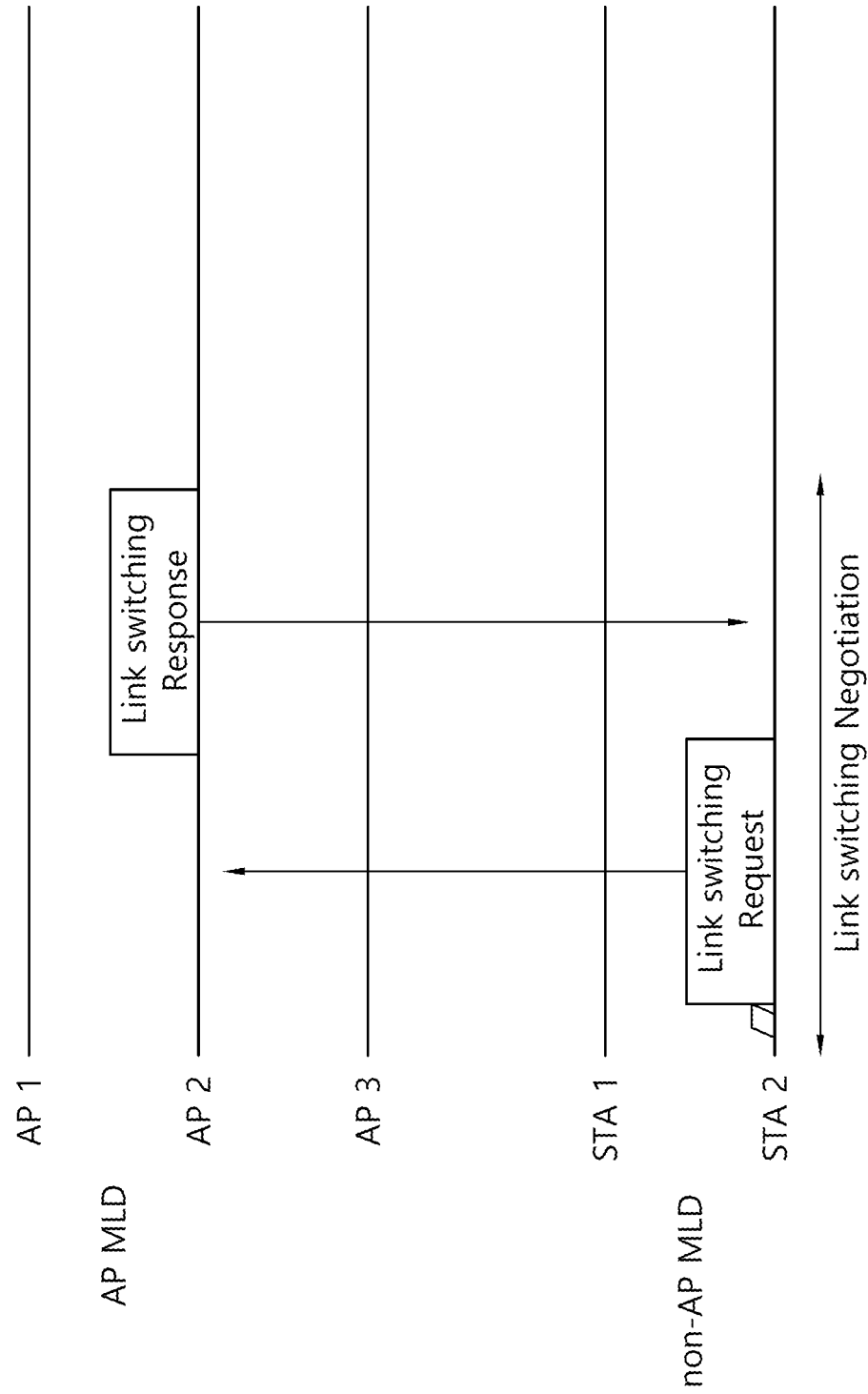
FIG. 18 illustrates an operation of an AP MLD and non-AP MLD for link switching or reconnection.

FIG. 18 illustrates an operation of an AP MLD and non-AP MLD for link switching or reconnection.

Referring to FIG. 18, the AL MLD and the non-AP MLD may perform link switching negotiation. An STA 2 of the non-AP MLD may transmit a link switching request frame to an AP 2 of the AP MLD. The AP 2 of the AP MLD may transmit a link switching response frame to the STA 2 of the non-AP MLD, in response to the link switching request frame. The link switching request frame or the link switching response frame may be transmitted/received through a link to be switched, but the present disclosure is not limited thereto. The link switching request frame or the link switching response frame may be transmitted/received through not only the link to be switched but also various links.

The non-AP MLD may request the link switching or reconnection through various methods. Hereinafter, three methods may be proposed as a method in which the non-AP requests the link switching or reconnection. Specifically, the three methods may be described in the order of a solicited method, an unsolicited method, and a general method.

1) Solicited method: a method in which the non-AP MLD requests the AP MLD for a variety of information for link (re)selection to receive the variety of information. For example, the variety of information may include information on capability, operation elements, and BSS parameters.

According to an embodiment, the method in which the STA requests information on other APs of the connected AP MLD may be used not only a case where the link is reconfigured but also various cases. For example, after the multi-link setup, for the link switching, the STA may request BSS parameter information on other APs, and may select a best link, based on the received information. Alternatively, in a discovery process, the STA may request the AP MLD for BSS load information of each AP, and may select a link for performing link setup, based on the received information (herein, it is assumed that the number of APS of the AP MLD is greater than the number of STAs of the non-AP MLD).

Accordingly, an AP which has received an information request message may transmit any information such as capability information, BSS parameter information, critical parameters, and/or operation element information or the like for all APs in the AP MLD. The aforementioned example may apply to all embodiments described below.

2) Unsolicited method: a method in which the AP transmits a variety of information for the link (re)selection, without an additional information request. The STA may utilize the received information in various situations. According to an embodiment, a method in which the AP of the AP MLD transmits information on other APs, without an additional information request of the STA, may be used not only in a case where the link is reconfigured but also various cases. Accordingly, an AP which has received an information request message may transmit any information such as capability information, BSS parameter information, critical parameters, and/or operation element information or the like for all APs in the AP MLD. The aforementioned example may apply to all embodiments described below.

3) General method: a method in which the non-AP MLD requests a link (re)selection without additional information, based on information obtained through a previous beacon frame or the like.

1) Solicited Method

Hereinafter, an embodiment for the aforementioned solicited method may be described first.

According to an embodiment, a non-AP MLD may request information for selecting a link appropriate for an AP MLD before link switching or reconnection. An STA may utilize per-AP data load information or per-link capability information (or information on other links) or the like to choose an appropriate link.

For example, the per-link capability information may be periodically transmitted by being included in a beacon frame or the like.

As another example, the per-link capability information is optional information, and may not be included in the beacon frame transmitted every period. Alternatively, only information on a link to which the STA is connected or an associated partial link may be received to reduce a frame overhead. Alternatively, when a beacon reception period is long due to a characteristic of the non-AP MLD (e.g., a low-power device), the non-AP MLD may not receive per-link capability information for selecting a more appropriate link.

In the aforementioned cases, the non-AP MLD may request the latest information of per-link capability information and per-link information (e.g., BSS parameter information or operation element information, etc.) of the AP MLD. A link of the per-link capability information and per-link information may include not only a link for transmission/reception but also other links. For example, a field (A-Control field of the 11ax standard) of a QoS data frame, a management frame, a probe response/request frame, a PS-Poll frame, a null frame, or the like may be used to request/transmit the latest information. Alternatively, an additional new frame may be defined to request/transmit the latest information.

According to an embodiment, in order to request the latest information of the per-link capability information and per-link information, the STA may transmit to the AP a request message for requesting information required for link reselection. For example, a probe request frame conventionally defined may be used for the request message. As another example, a new frame may be defined for the request message.

According to an embodiment, through the request message, the STA may specify required specific information and request the AP for the specified information. The specific information to be specified may change depending on a situation. That is, the STA may request only information corresponding to a specific link, or may request only information corresponding to specific capability. For example, the information corresponding to the specific link may include information on BSS load/parameters of the specific link. In addition, the information corresponding to capability may include BSS load information on all links or BSS load information on the specific link. In this case, the AP may transmit only information specified by the STA through the response message. A specific embodiment for the specific information request and response may be described according to an embodiment for an IOM definition and operation.

As another example, the STA may request all capability information (e.g., including information on other links) currently owned by the AP MLD through the request message.

As described in the aforementioned example, an embodiment for transmitting all information owned by the AP or an embodiment for transmitting only specific information specified by the STA may be defined/configured variously. For example, the AP may transmit all information or specified information, based on an additional field, a bitmap, or the like to indicate (or transmit) only the specific information.

In general, a message for requesting information to the AP MLD may be transmitted through an STA which desires for reconnection, but may also be transmitted through any STA (i.e., other STAs) according to a situation (a channel situation or a link situation).

The AP MLD which has received the request message may transmit to the non-AP MLD a response message (i.e., an information message) including information (e.g., per-link data load information, STA capability information between links, etc.) requested by the STA. For example, when a probe request frame based on the conventional standard is re-used for the request message, the AP (or AP MLD) shall respond by using a probe response frame as the response message.

In general, the response message may be transmitted through the AP which has received the request message, but may also be transmitted to any AP (i.e., other APs) by using a multi-link characteristic.

Optionally, the AP MLD may transmit a "recommended link" element, which recommends a link appropriate for the STA, together through the response message including the aforementioned several information (e.g. the latest information required for link reselection).

In the present specification, a case where the STA of the non-AP MLD requests information on other APs will be described in detail.

When the STA of the non-AP MLD transmits an MLD probe request frame to request a peer AP for complete information on other APs, the peer AP is expected to respond with an MLD probe response frame including the complete information on APs, requested by the STA. In this case, the peer AP may respond with the requested complete information on the APs, included in the complete information on the AP, as follows.

1-1) Method in which the Complete Information on the Peer AP is Mandatorily Included in the MLD Probe Response when the STA Requests the Complete Information on Other APs In this method, the complete information on the peer AP is included together even if the STA requests the complete information on other APs of the same AP MLD except for the peer AP. An inheritance model is used in the current 802.11be to reduce an overhead of an MLD probe response. Accordingly, when the STA requests the complete information on other APs, the AP may apply the inheritance model if the complete information on the peer AP is always included. In other words, if the AP MLD includes information on the peer AP when responding to a request for the complete information on specific APs, a value commonly included in the same MLD may be included as common info in an ML IE, and information which differs for each AP may be included as a non-inheritance element in a per-STA profile in the ML IE. When the STA requests the complete information on several other APs, information which exists identically may be configured only one time as common info, thereby reducing an overall overhead of an MLD probe response frame. In this case, when the STA does not request the complete information on the peer AP, an overhead exists to some extent since unrequested information on the peer AP is also included. However, when information on several other APs is requested, it may be effectively used since the overhead may be decreased by a greater extent by using the inheritance model.

1-2) Method in which the Complete Information on the Peer AP is not Mandatorily Included in the MLD Probe Response when the STA Requests the Complete Information on Other APs (i.e., Method in which Only the Requested Complete Information on Other APs is Included in Transmission).

This is a method in which only the requested complete information on APs is transmitted by included in the MLD probe response when the STA requests the peer AP for the complete information on other APs. This method may reduce an overhead by applying an inheritance model when the STA requests information on the peer AP together. However, when the STA requests only information on other APs of the same AP MLD except for the information on the peer AP, the inheritance model is not applicable. Therefore, when the information on the peer AP is not included, an overhead may be increased to some extent since the inheritance model is not applied. However, when the STA requests the complete information only for a specific AP instead of several APs, the overhead may be small since unnecessary information on the peer AP is not included. A method in which a response is made by including only information on APs, requested by the STA, may be simpler to some extent than the first mandatory method. However, with the increase in the number of other APs in the same AP MLD for which the STA requests the complete information, the first mandatory method which uses the inheritance model may be more efficient.

1-3) Method in which the Peer AP Transmits the Complete Information Optionally Through a Configuration Having a Small Overhead.

In this method, the AP configures and transmits an MLD probe response in an effective manner by comparing a frame overhead which occurs in a first case (a method in which information on the peer AP is mandatorily included in the response when the STA does not request the information on the peer AP together) and a second case (a method in which the information on the peer AP is not mandatorily included in the response when the STA does not request the information on the peer AP together) according to a configuration of an MLD probe response frame based on AP's common info requested by the STA. In other words, efficiency for applying the inheritance model is compared according to APs' information requested by the STA, and a response is made by configuring a format having a smaller overhead. However, in this method, a criterion by which it is considered as being efficient by comparing the two cases may be determined according to an implementation of the AP.

The aforementioned method for several options is a method for a case where the STA requests the complete information on other APs, and is not applicable when the STA requests partial information on other APs since information on a specific IE is requested. However, when the STA uses one MLD probe request frame to request the complete information on some APs and request the partial information on some APs, the aforementioned three methods may be used since the inheritance model is applicable.

The aforementioned solicited method may be used for link switching or reconnection in the STA of the non-AP MLD. For example, when the STA of the non-AP MLD desires to reselect a link due to link congestion, the STA of the non-AP MLD may request BSS parameter information and per-link BSS load information on the AP MLD connected through the solicited method. The AP which has received this request message may transmit a response message including a link and information indicated by the STA.

Hereinafter, the aforementioned request message and response message may be described as an information request message and an information response message to distinguish from a request message for link switching and a response message for the link switching.

Based on information included in the aforementioned information response message, the STA may reselect an appropriate link and request the AP MLD for link switching or reconnection through the request message for link switching. The request message for link switching may include information on an AP or link to which the STA is to be reconnected.

The AP MLD which has received the request message may transmit a response message of "accept" when the request is accepted. The AP MLD may transmit a response message of "decline" when the request is declined.

If the request is accepted, after the response message is transmitted, the AP may perform link (re)setup, based on frame exchange through a reselected link of the AP. Otherwise, if the request is declined, the STA may directly use a previously connected link.

An example of the AP MLD and non-AP MLD according to the solicited method may be described in detail with reference to FIG. 19.

Figure 19:
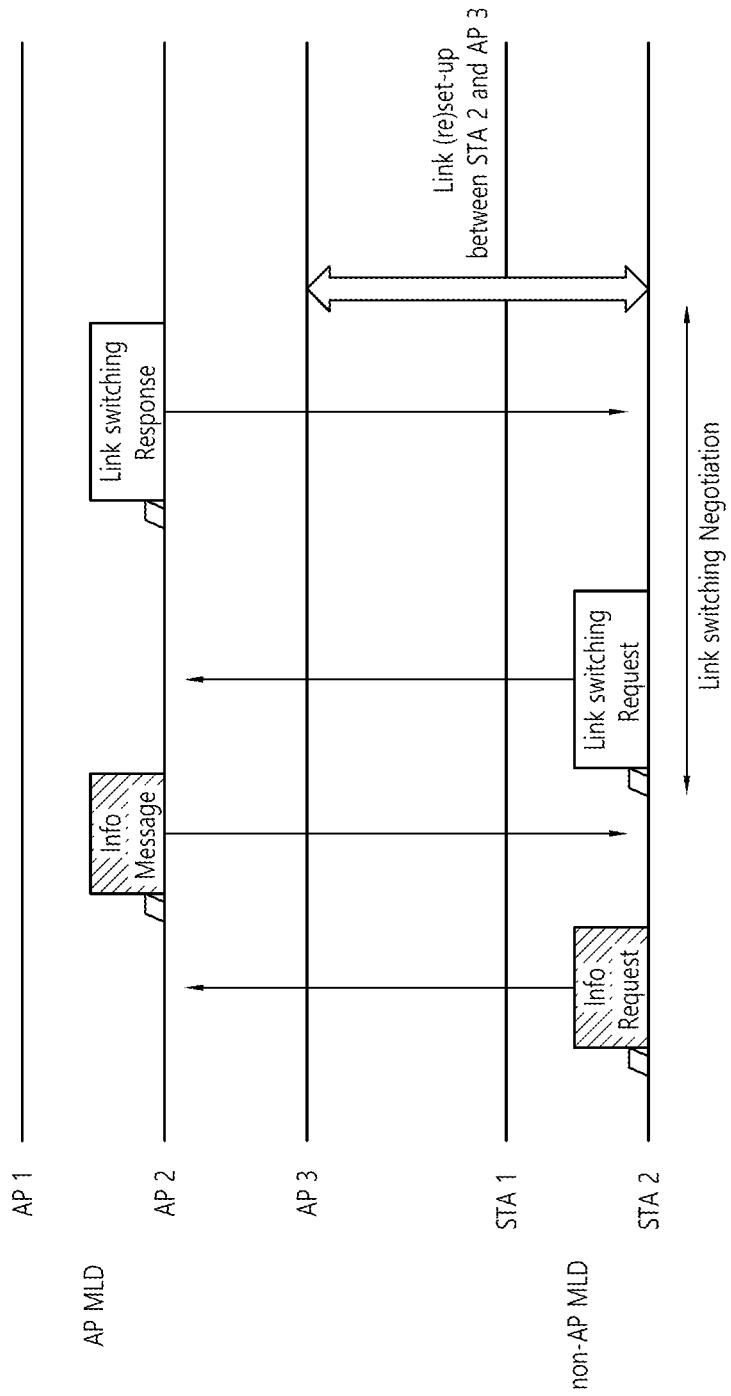
FIG. 19 illustrates an operation of an AP MLD and non-AP MLD for link switching or reconnection.

FIG. 19 illustrates an operation of an AP MLD and non-AP MLD for link switching or reconnection.

Referring to FIG. 19, when it is desired to reselect a link to which an STA 2 of the non-AP MLD is connected, the STA 2 may transmit an info request message to the AP MLD through a link 2. The AP MLD which has received this message may transmit an info response message including information required for the link reselection of the non-AP MLD. Based on information included in the aforementioned info response message, the STA 2 of the non-AP MLD may transmit a request message for link switching (i.e., a link switching request frame) to an AP 2 of the AP MLD. Thereafter, the STA 2 may receive a response message for link switching (i.e., a link switching response frame) and perform link (re)set-up for link switching.

An embodiment for an information request proposed in the present specification may also be used/applied when an STA requests an AP for necessary information. When information included in a frame (e.g., beacon) received by the STA from the AP is insufficient, the STA may request the AP for the insufficient information. For example, when the AP transmits only information on a connected link without including information on other links or when the AP transmits only information on whether the information on other links is updated, the STA may request the AP for the insufficient information.

An example of the aforementioned embodiment may be described in detail with reference to FIG. 20.

Figure 20:
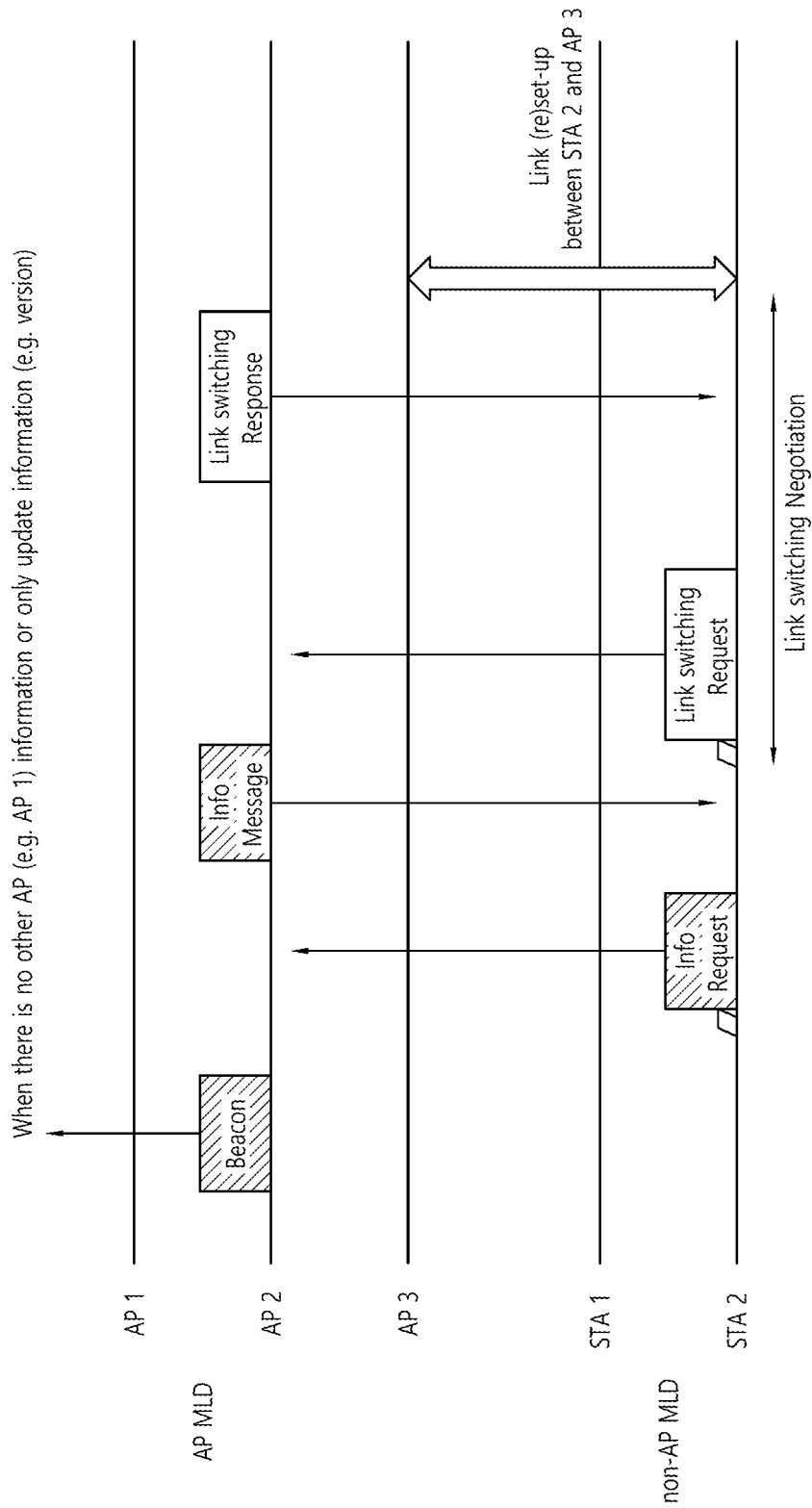
FIG. 20 illustrates an operation of a non-AP MLD for requesting information on other APs.

FIG. 20 illustrates an operation of a non-AP MLD for requesting information on other APs.

Referring to FIG. 20, an AP MLD (or AP 1 to AP 3) may transmit only information on whether information on other APs (i.e., links) is updated to an STA through a beacon frame. Therefore, an STA 2 may transmit an info request message (or info request frame) to the AP2. The STA 2 may receive an info response message (or info message), based on the info request message. The STA 2 may receive/obtain information on other APs, based on the info response message.

For example, the information on other APs (e.g., BSS load information or the like) of the AP MLD may not be included in a beacon, or the AP 2 may transmit only information on whether the information on other APs is updated (e.g., version/update version).

The STA 2 may require information of the AP 1 (or information on the AP 1). The STA 2 may request the required information through the AP 2. The STA 2 may obtain the information of the AP 1 through a response message for the request. The STA 2 may use the information of the AP 1 to reselect a proper link for link switching. For example, a frame for link switching may be configured variously.

Additionally, the aforementioned solicited method may also be used by the STA to obtain information on APs owned by the AP MLD even before multi-link setup. In a multi-link setup process of the non-AP MLD and AP MLD, if the number of APs owned by the AP MLD is greater than the number of STAs owned by the non-AP MLD, STAs of the non-AP MLD shall determine for which AP of the AP MLD the link will be set up. In this case, the STA of the non-AP MLD may request the AP of the AP MLD for per-link specific information (e.g., BSS load information or the like of APs owned by the AP MLD) in order to know a state for each link before the multi-link setup. For example, the STA may use a probe request as a request message. As another example, a new frame may be defined for the request message. The STA may transmit the request message including an indicator (e.g., a request element or an extended request element or a PV2 probe response option element, etc.) for requesting a specific element or an indicator (e.g., a link ID, etc.) for indicating specific link information.

For example, the STA of the non-AP MLD may transmit a request message including an instruction which requests current BSS load information for each of all APs in the AP MLD to be connected. The AP which has received the request message may transmit to the STA a response message containing necessary information (BSS load information on all APs of the AP MLD to which the AP is connected), based on the instruction of the STA. In this case, the STA which has verified the BSS load information for each AP may select a link in an ascending order of BSS load of a BSS (i.e., AP). The STA may indicate a link selected in the multi-link setup. In other words, information on the link selected in the multi-link setup may be transmitted to the AP.

As such, the STA may use the aforementioned solicited method as a method for obtaining information for each AP of the AP MLD in order to select a link to be connected before the multi-link setup.

Hereinafter, a new element/field including information used by the STA of the non-AP MLD to select an appropriate link may be proposed.

For example, a "ratio per link" (element/field) may be proposed. "STA ratio per link" may include information on a ratio of the number of STAs connected for each link. An example of the "STA ratio per link" may be described in detail with reference to FIG. 21.

Figure 21:
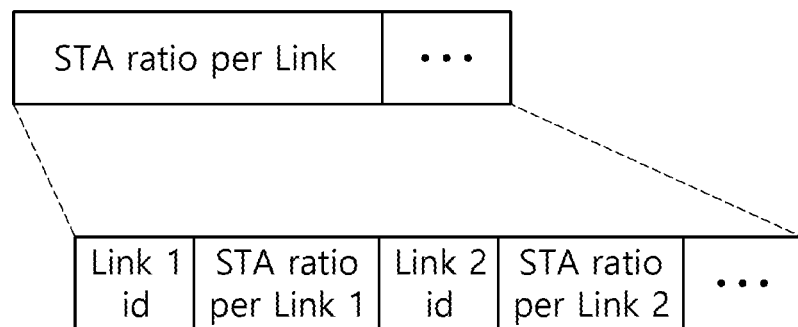
FIG. 21 illustrates an example of an STA ratio per link in detail.

FIG. 21 illustrates an example of an STA ratio per link in detail.

Referring to FIG. 21, the STA ratio per link (element/field) may include information on a ratio or the number of STAs connected for each link in all AP MLDs.

For example, when 50 STAs are connected to the AP MLD having 3 links, 10 STAs may be connected to a link 1, and 20 STAs may be connected to a link 2. The AP MLD may transmit information on the STA connected for each link to a non-AP MLD through the STA ratio per link (element/field) as information on a value or ratio (%).

For example, when the information on the STA connected for each link is represented as a value, the link 1 may be represented/set to 10, and the link 2 may be represented/set to 20. Therefore, a value of an STA ratio per link 1 may be set to 10. In addition, a value of an STA ratio per link 2 may be set to 20.

As another example, when the information on the STA connected for each link is represented as a ratio, the link 1 may be represented/set to 20 (10/50)%, and the link 2 may be represented/set to 40 (20/50)%. Therefore, the value of the STA ratio per link 1 may be set to 20. In addition, the value of the STA ratio per link 2 may be set to 40.

The aforementioned example is for exemplary purposes only, and the information on the STA connected for each link may be set variously. In addition to the aforementioned example, information on the STA connected for each link may be set as a relative value.

Based on the information on the STA connected for each link, the STA may verify/obtain the number and ratio of the STAs connected for each link, and may use this as information for link selection.

According to an embodiment, in addition to the "ratio per link" (element/field), a variety of information/element/field may be included in an information response message. For example, the following information/element/field may be included in the information response message.

BSS load information for each AP
STR capability information between links
TXOP information for each link
NAV information for each link
recommended link information (i.e., "recommend link" element)
information of ratio of STAs connected for each link (i.e., "STA ratio per link" element)
etc.

In addition to the aforementioned information/element/field, a variety of information required for link selection may be transmitted by being included in the information response message.

The STA which has received the aforementioned exemplary information may select an AP to be switched or reconnected by the STA, based on the received information, and then may transmit a request message for requesting link reconnection. The AP which has received the request message may transmit a response message of "accept" when the request is accepted. The AP MLD may transmit a response message of "decline" when the request is declined.

If the request is accepted, the AP may perform frame exchange through a reselected link with the AP after transmission of the response message. Otherwise, if the request is declined, the STA may directly use a previously connected link.

2) Unsolicited Method

Unlike the solicited method in which the non-AP MLD directly requests additional information, according to the unsolicited method, the AP MLD may transmit the additional information to the non-AP MLD through a beacon frame or an additional frame (e.g., a field (A-control field of the 11ax standard) of a QoS data frame, a management frame, an FILS discovery frame, an unsolicited probe response frame, a PS-poll frame, a null frame, or the like) without an additional information request of the non-AP MLD. As another example, a new frame may be defined as a frame for transmitting the additional information to the non-AP MLD.

For example, when a beacon period is long to some extent, necessary information required for link switching may be insufficient or may not be the latest information. Therefore, the AP may transmit a frame including link capability information on the AP MLD to the non-AP MLD. Thereafter, the non-AP STA may obtain the latest information for capability of each link of the AP MLD. The frame may be transmitted periodically or may be transmitted aperiodically.

For example, when the frame is transmitted periodically, the AP may transmit a frame to share the latest information on the AP every specific time interval. In this case, the time interval shall be shorter than a period of a beacon transmitted by the AP. In addition, when an FILS discovery frame is used as the frame, the frame may be transmitted every 20 us. As another example, a period agreed by the AP and the STA through capability negotiation may be used. For example, a transmission interval may be indicated through a "periodic" field and "interval" field/subfield value of an IOM capability element.

As another example, when the frame is transmitted aperiodically, the AP may transmit the frame whenever an event of updating information (capability, BSS parameter, operation element) of the AP occurs. Specifically, for example, changed information may be transmitted to a connected STA whenever link capability of the AP of the AP MLD changes. In this case, the STA may maintain the latest information for the link capability.

According to the aforementioned example, since the non-AP STA does not transmit a request message for obtaining additional link capability, there is an advantage in that a frame exchange overhead is relatively small compared to the solicited method. In addition, since the STA may receive updated information whenever critical information is updated, there is an advantage in that information received by the STA is used usefully.

An example of operations of an AP MLD and non-AP MLD according to the unsolicited method may be described in detail with reference to FIG. 22.

Figure 22:
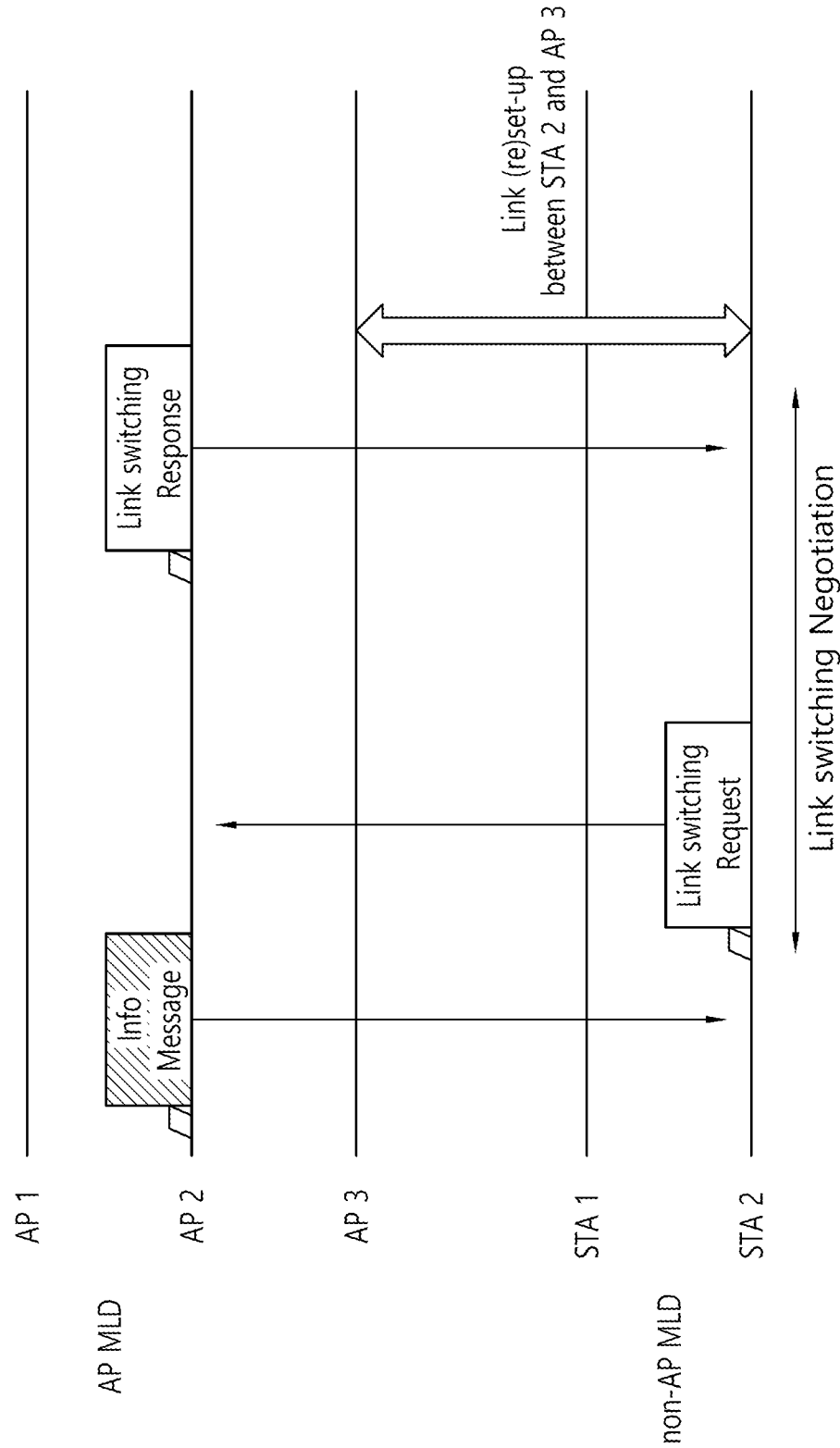
FIG. 22 illustrates an operation of an AP MLD and non-AP MLD for link switching or reconnection.

FIG. 22 illustrates an operation of an AP MLD and non-AP MLD for link switching or reconnection.

Referring to FIG. 22, the AP MLD may transmit necessary information required for link reselection to a non-AP through an additional frame (e.g., a PS-Poll frame, a Null frame, etc.), without an additional request message of the non-AP MLD.

According to an embodiment, unlike in FIG. 22, the AP MLD may transmit information on link capability, without an additional request message of the non-AP MLD, to the STA through a field of a DL frame (e.g., QoS data frame) transmitted by the AP MLD to the non-AP MLD. The operation of the AP MLD and non-AP MLD according to the embodiment may be described with reference to FIG. 23.

Figure 23:
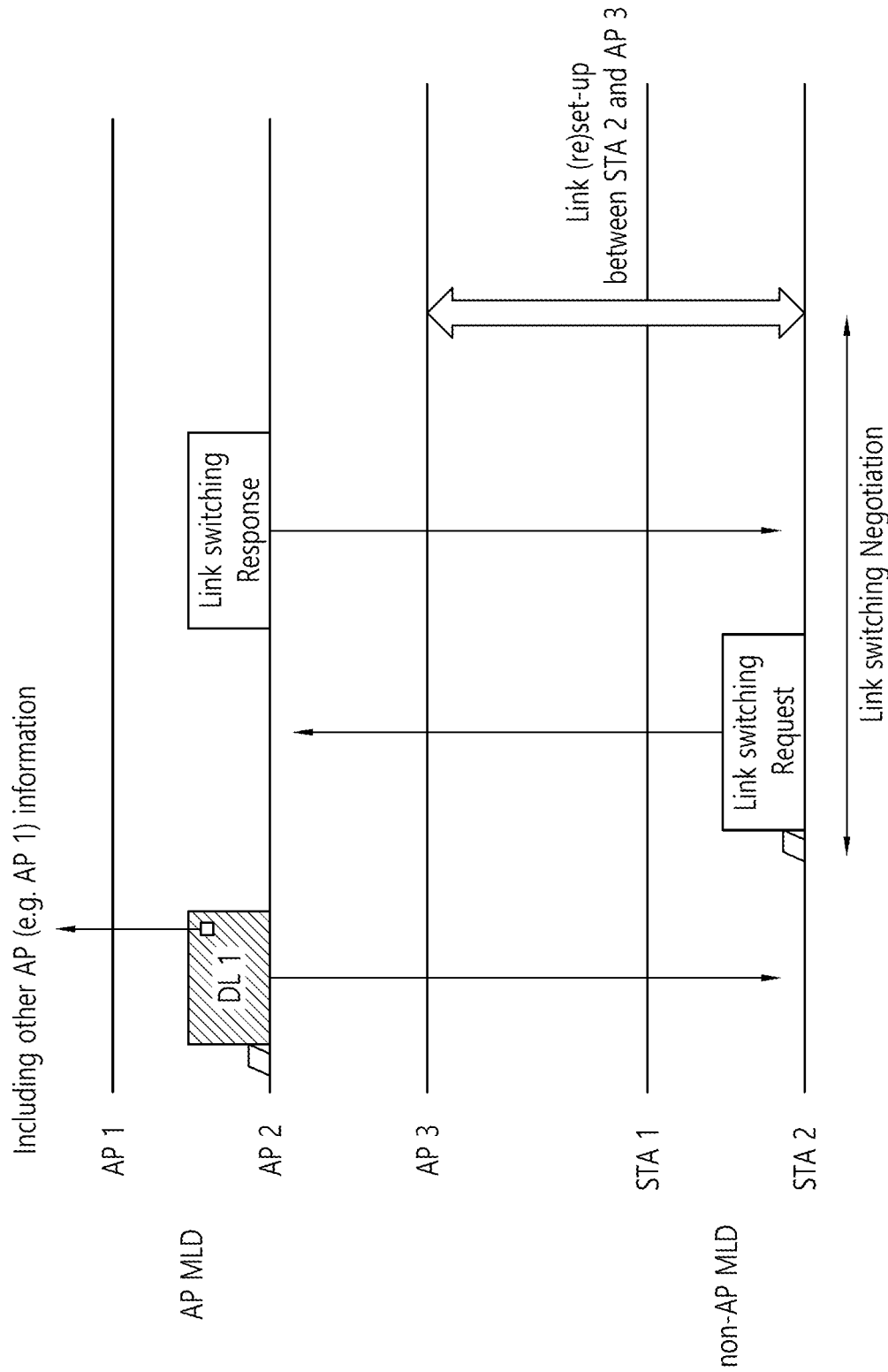
FIG. 23 illustrates an operation of an AP MLD and non-AP MLD for link switching or reconnection.

FIG. 23 illustrates an operation of an AP MLD and non-AP MLD for link switching or reconnection.

Referring to FIG. 23, an AP 2 may transmit information on other APs (or information on other APs) to an STA 2, based on a DL frame (i.e., DL 1). In other words, the DL frame may include information on other APs. For example, the information on other APs may be included in an A-Control field of the like of the 802.11ax standard. According to the aforementioned embodiment, since the existing DL frame is utilized without an additional message, there is an advantage in that a frame overhead is decreased. If information is required on a real-time basis due to a change in critical information on other APs, update information may be transmitted through an additional message as in the embodiment of FIG. 23.

For example, critical information on the AP may include A to Q as follows.

A. Inclusion of a Channel Switch Announcement element
B. Inclusion of an Extended Channel Switch Announcement element
C. Modification of the EDCA parameters element
D. Inclusion of a Quiet element
E. Modification of the DSSS Parameter Set
F. Modification of the CF Parameter Set element
G. Modification of the HT Operation element
H. Inclusion of a Wide Bandwidth Channel Switch element
Inclusion of a Channel Switch Wrapper element
J. Inclusion of an Operating Mode Notification element
K. Inclusion of a Quiet Channel element
L. Modification of the VHT Operation element
M. Modification of the HE Operation element
N. Insertion of a Broadcast TWT element
O. Inclusion of the BSS Color Change Announcement element
P. Modification of the MU EDCA Parameter Set element
Q. Modification of the Spatial Reuse Parameter Set element Therefore, the non-AP MLD may obtain the latest link capability information irrespective of a beam frame period. The non-AP MLD may select an appropriate link in link switching, based on received information. The STA may reselect the appropriate link and request the AP MLD for link switching or reconnection, based on the received information. The request message may include information on an AP or link to which the STA is to be reconnected. In addition, the AP MLD which has received this message may transmit a response message of "accept" when a request is accepted, and may transmit a response message of "decline" when the request is declined.

If the request is accepted, after the response message is transmitted, the AP may perform link (re)setup, based on frame exchange through a reselected link of the AP. Otherwise, if the request is declined, the STA may directly use a previously connected link.

3) General Method

According to the general method, a non-AP MLD may request link switching or reconnection without an additional information request, based on information currently owned by the non-AP MLD. Information used in this case may include information on an AP MLD and information on a non-AP MLD (e.g., per-link STR capability information, link state (enable/disable) information, etc.), included in a previously received beacon or management frame, etc.

Unlike in the solicited method, an STA may directly transmit a request message for link switching or reconnection to the AP MLD without having to request the AP MLD for an additional information request. The request message may include information on an AP or link to which the STA is to be reconnected. The AP MLD which has received the request message may transmit a response message of "accept" when the request is accepted, and may transmit a response message of "decline" when the request is declined.

If the request is accepted, the AP may perform frame exchange through a reselected link with the AP after transmission of the response message. Otherwise, if the request is declined, the STA may directly use a previously connected link.

An example of an operation of an AP MLD and non-AP MLD according to the general method may be described in detail with reference to FIG. 24.

Figure 24:
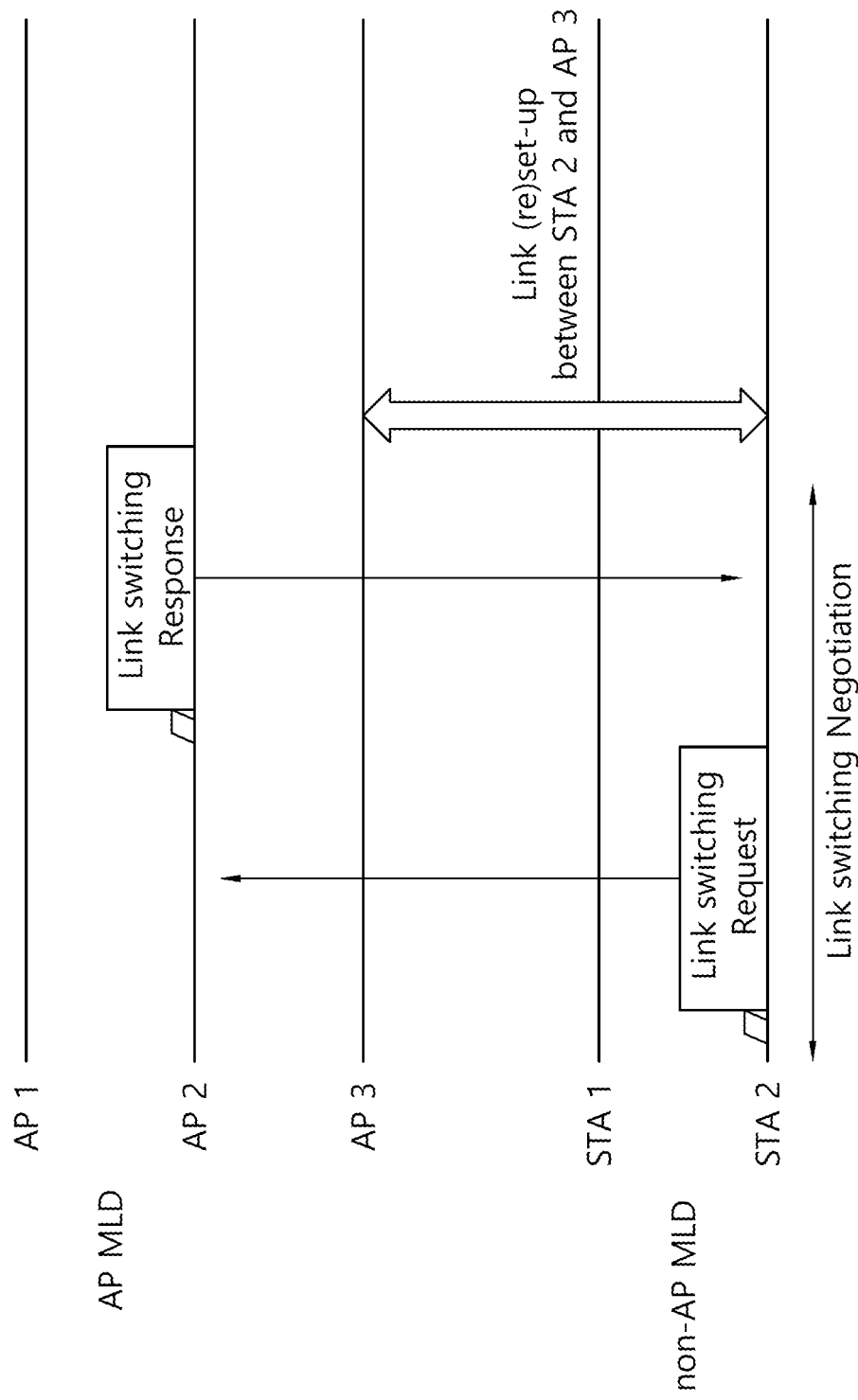
FIG. 24 illustrates an operation of an AP MLD and non-AP MLD for link switching or reconnection.

FIG. 24 illustrates an operation of an AP MLD and non-AP MLD for link switching or reconnection.

Referring to FIG. 24, an STA 2 may desire to directly switch a link for the purpose of guaranteeing QoS. When the STA 2 has information previously received from the AP MLD (e.g., information received through a beacon frame, a management frame, etc.) or has already determined a link to be reconnected, the STA 2 may request the link switching or reconnection without an additional information request.

The STA 2 may transmit a link switching request frame including STA information (e.g., STA ID, etc.) and information on a link to be switched (e.g., a link ID, AP BSS information, etc.). The AP MLD which has received this may transmit a link switching response frame of "accept" to an STA 3 through the existing link 2 when the switching is accepted. Thereafter, the STA 2 of the non-AP MLD may be reconnected to an AP 3 after performing a link (re)setup process.

Signaling for Indicating a Method of Link Switching and Reconnection

In order to indicate the methods proposed above, a mutual agreement process may be required through negotiation between an AP MLD and a non-AP MLD. To this end, a signaling method may be proposed to enable the methods to be proposed in the specification described below.

First, a new element may be proposed to indicate the methods proposed above. Although an embodiment related to signaling for indicating the method of link switching and reconnection is described hereinafter, the embodiment may also apply to an embodiment related to signaling for indicating a method of switching and reconnecting an anchored link.

A signaling process for indicating the method of link switching and reconnection may be performed in multi-link setup or after the multi-link setup. In addition, new elements proposed hereinafter may be used in the signaling process for indicating the method of link switching and reconnection. For example, the elements may be included in a (re)association frame of the conventional standard or a new frame.

IOM (Information Obtain Method) Capability Element

The IOM capability element may include information on whether a method of obtaining additional information for a multi-link is enabled. For example, an IOM capability value may be present in an element in a message in a process (e.g., capability negotiation process) in which an AP MLD and a non-AP MLD exchange a message for agreement on an operation in a multi-link setup process. When the IOM capability value is present in the element in the message, it may imply that IOM capability is supported.

According to an embodiment, when the AP MLD supports the IOM capability, an AP may internally share information on other APs, and may have the information on other APs. An MLD in which the information on other APs is not shared cannot support the IOM capability.

According to an embodiment, when a value of the IOM capability element is set to a first value (e.g., 1), it may imply that the IOM capability element enables the IOM and operates with a specified function. Otherwise, when the value of the IOM capability element is set to a second value (e.g., 0), it may imply that the IOM capability element disables the IOM.

According to an embodiment, the IOM capability element may include various fields/elements to indicate various operations. For example, the IOM capability element may also include various fields/elements described below. However, when the AP MLD requests link switching and when the non-AP MLD requests link switching, a field/element to be added in the IOM capability element may be set differently. In addition, at least some of the fields/elements added in the IOM capability element may be omitted. For example, a field/element including information not necessarily indicated among the fields/elements to be added in the IOM capability element may be omitted.

Hereinafter, an example of various fields/elements defined/configured to obtain additional information on a multi-link. The various fields/elements described below may be configured independently, or at least two fields/elements may be combined and transmitted through various frames. For example, the various fields/elements described below may be included in other elements to perform a defined operation. As another example, the various fields/elements described below may be used as individual elements or may be used by being added in other elements as independent fields.

Method Type (or Method) Field/Element

A method type field/element (hereinafter, method field/element) may include information on a method of operating an IOM. In other words, the method field/element may indicate the method of operating the IOM. For example, when a non-AP MLD enables an IOM method to obtain information from an AP, the non-AP MLD may indicate a method to be used by selecting the method among the methods provided above (e.g., the solicited method, the unsolicited method, and the general method).

For example, the solicited method may be indicated/used, based on that a value of the method field/element is a first value (e.g., 0). The unsolicited method may be indicted/used, based on that the value of the method field/element is a second value (e.g., 1). The general method may be indicted/used, based on that the value of the method field/element is a third value (e.g., 2). Both of the solicited method and the unsolicited method may be indicted/used, based on that the value of the method field/element is a fourth value (e.g., 3).

As another example, 1 bit may be used for the method field/element. In this case, the solicited method may be indicated/used, based on that the value of the method field/element is the first value (e.g., 0). The unsolicited method may be indicated/used, based on that the value of the method field/element is the second value (e.g., 1).

As another example, 2 bits may be used for the method field/element. In this case, it may be indicated that each method is used alone or redundantly.

Link Range Field/Element

When a non-AP MLD requests an AP MLD for information, a range of link to be requested may be indicated through a link range field/element. The link range field/element may include information on whether an STA desires to request information on all links in an AP MLD or desires to request information on some links in the AP MLD.

For example, when a value of the link range field/element is a first value (e.g., 0), it may imply that the link range field/element requests information on all links in the AP MLD. When the value of the link range field/element is a second value (e.g., 1), it may imply that the rink range field/element requests information on some links in the AP MLD.

In this case, when the value of the link range field/element is the first value (e.g., 0), since it is a request for all links in the AP MLD, additional link indicator (e.g., "link condition" field) information is not necessary. Otherwise, when the value of the link range field/element is the second value (e.g., 1), since it is a request for information on some links in the AP MLD, link indicator information is necessary. For example, this field may be used by being included in the multi-link element defined in the 802.11be. The multi-link element currently defined is as shown in FIG. 25.

Figure 25:
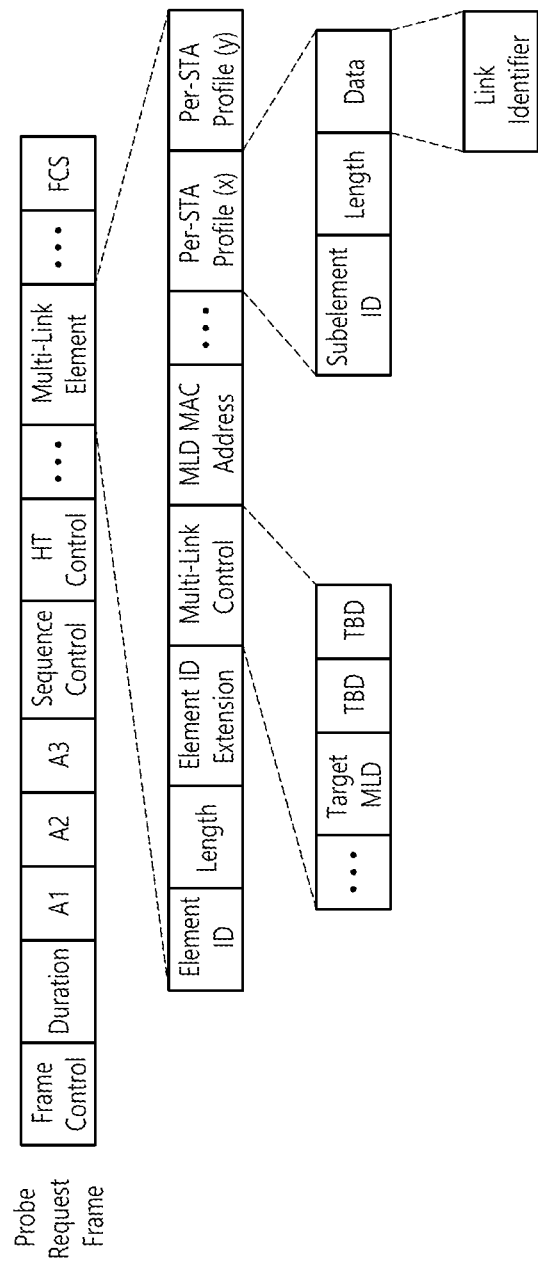
FIG. 25 illustrates an example of a multi-link element added in a probe request.

FIG. 25 illustrates an example of a multi-link element added in a probe request.

As shown in FIG. 25, when a non-AP MLD transmits a request message for requesting information on an AP MLD, a "range" field may be used by being added in the multi-link element. This is exemplified as shown in FIG. 26.

Figure 26:
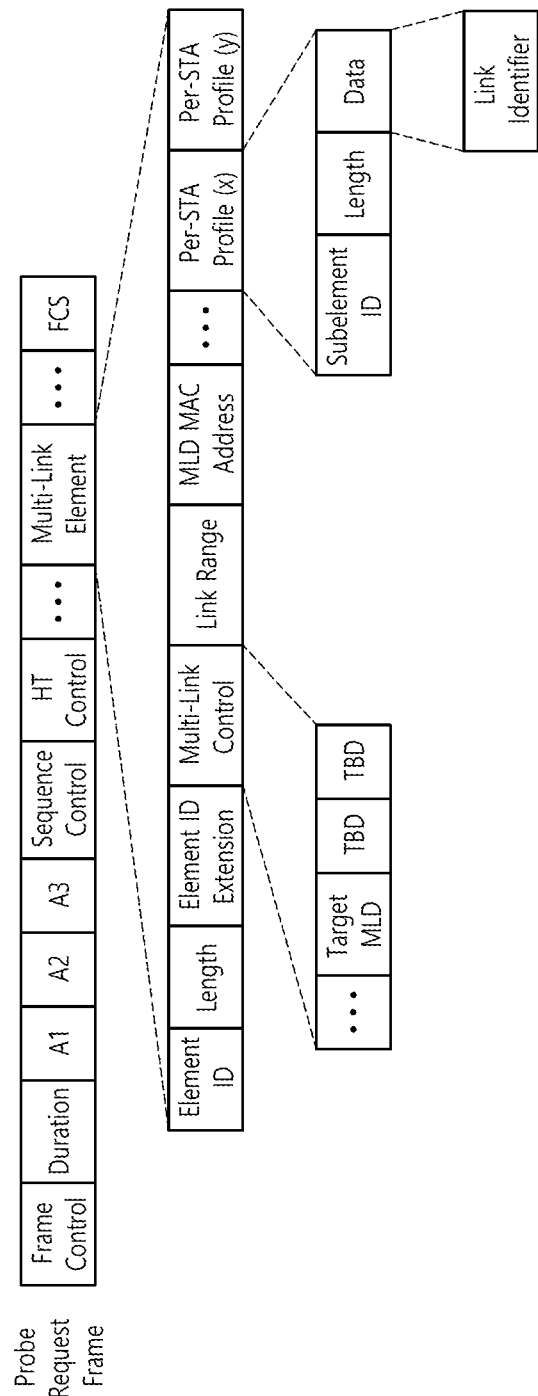
FIG. 26 illustrates an example of using a link range field in a multi-link element.

FIG. 26 illustrates an example of using a link range field in a multi-link element.

As shown in FIG. 26, a link range may be used together with an MLD MAC address field to indicate whether it is a request for information on all links in a corresponding MLD or a request for information on some links. In this case, if a value of the field is 0, it means a request for the information on all links. Therefore, since additional link indicator information is not necessary, a "per-STA profile (x)" sub-element may be omitted.

In addition, this field may not be included in the multi-link element defined in the 802.11be, and may be used by being added in other elements. This is exemplified as shown in FIG. 27.

FIG. 27 illustrates an example of a field newly proposed to indicate link switching and reconnection.

As shown in FIG. 27, several fields proposed in the present specification may be used together to indicate a range and condition of information requested by an STA to an AP MLD in an integrated format as shown in FIG. 27. Alternatively, when the STA requests the AP MLD for the information, each of proposed fields may be included independently in a request message, and may be omitted if it is not necessary.

Info Range Field/Element

When a non-AP MLD requests information, an info range field may be used to indicate a range of information.

For example, when a value of the info range field is a first value (e.g., 0), the info range field may indicate that only partial information owned by an AP is provided. When the value of the info range field is a second value (e.g., 1), the info range field may indicate that all information (or complete information) owned by the AP is provided.

According to an embodiment, the info range field may be defined to indicate a request for complete or partial information (elements) owned by the AP, but an STA may also request more specific information through an additional subfield. For example, a subfield for indicating a range of information to be provided (e.g., all information or partial information) may be included in the info range field. For example, the subfield for indicating the range of information to be provided may be defined/configured as all/partial subfields.

According to an embodiment, a subfield for indicating whether to provide all information or whether to provide only changed information among the all information may be newly proposed. In other words, the subfield newly proposed may indicate whether to provide all information or whether to provide only changed information among the all information.

For example, the subfield for indicating whether to provide all information or whether to provide only changed information among the all information may be defined/configured as an only updated subfield.

When the STA desires to receive only the changed information, a value of the only updated subfield may be set to 1. In other words, when the STA desires to receive only the changed information, the STA may set the value of the only updated subfield to 1. For example, if the value of the only updated subfield is set to 1, according to the solicited method, when the STA requests information, an AP (or AP MLD) may transmit only changed information (i.e., updated information) among the requested information. As another example, if the value of the only updated subfield is set to 1, according to the unsolicited method, the AP may notify only changed information in an info range configured by the STA.

According to the example above, although the only updated subfield in the info range field is restricted in order to receive only the changed information, the present disclosure is not limited thereto. In order to receive only the changed information, an additional field or element may be defined/configured.

According to the aforementioned embodiment, the info range which may be requested by the STA may be set to updated information or all information. In this case, an STA which does not desire a great frame overhead may request to receive only the changed information. Therefore, there is an advantage in that an overhead is reduced.

Link Condition Field/Element

A link condition field may be used to indicate a requested specific link. In other words, the link condition field may include information on the requested specific link. The link condition field may be used when an STA desires to receive only specific link information provided from an AP.

The link condition field may be represented by a link identifier (e.g., link ID, BSS ID). In other words, the link condition field may include information on the link identifier (e.g., link ID, BSS ID). In other words, in order to specify a link for obtaining information, the link identifier may be used.

For example, when an STA connected to a link 1 desires to request the AP for only information on links 2 and 3, the STA may request the AP for information on the links 2 and 3 by indicating the links 2 and 3 in the link condition field. For example, when the value of the info range field is 1, all information corresponding to the links 2 and 3 may be transmitted. As another example, when the value of the info range field is 0, partial information specified by the STA in the links 2 and 3 may be transmitted. According to an embodiment, the partial information specified by the STA may be determined through an info condition field described below.

According to an embodiment, when a value of the link condition field is absent or 0, the AP may determine that there is no link condition. Therefore, the AP may provide/transmit information on all links to the STA.

Info Condition Field/Element

An info condition field may be used to indicate a requested specific information type. In other words, the info condition field may be used when an STA desires to receive only specific information provided by an AP.

For example, the info condition field may be used only when the info range field is set to 1. As another example, the info condition field may also be used by the STA to indicate specific information even if there is no info range field.

For example, in the info condition field, information (e.g., BSS load, STR capability, etc.) specifiable by the STA may be represented by a bitmap. For example, a type of information provided by the AP, a method or order of indication in a bit, or the like may be configured variously.

According to an embodiment, the info condition field may be used together with the aforementioned link condition field. According to an embodiment, the info condition field may be used to transmit request information of various conditions to the STA (or AP), based on a combination of various fields/elements.

In this regards, an element of the conventional standard may be re-used so that the STA requests to indicate specific information. For example, a request IE or an extended request IE may be used. Element information for this is as shown in FIG. 28 and FIG. 29.

FIG. 28 illustrates an example of a request IE format.

FIG. 29 illustrates an example of an extended request IE format.

Elements of FIG. 28 and FIG. 29 may be used to request specific information in a probe request frame or an information request frame. When an STA indicates a list of information of which a response is desired by using requested element IDs, an AP transmits a probe response frame or information response frame including information corresponding thereto. Therefore, in the present specification, this element may be re-used as an indicator for requesting specific information, and may also be used to request desired information on a desired link together with a link identifier. For example, an element ID for BSS load information may be indicated in the request element mentioned in FIG. 28 and FIG. 29, and when information on an AP 2 is desired, only BSS load information on the AP 2 may be requested upon indicating this with a link identifier. The element ID information may be used to indicate specific information on a specific AP with various combinations together with link identifier information. Even if a new frame is defined in the present disclosure for an information request instead of the existing frame, the request element and extended request element of FIG. 28 and FIG. 29 may be re-used.

In addition, in the conventional standard, a PV1 probe response option element is provided to request specific information, and this element may be re-used by using a method of indicating the specific information. For frequently used information, a method in which an STA uses desired information to request optional information as a probe request is used to indicate each information with a probe response option bitmap as described below. However, in case of 11be, since multi-link information shall be provided by considering an MLD, the STA may request specific information on a specific link in various combinations by using a link identifier together with a bitmap indicator described below. However, in this case, since optional information (e.g., STR capability) newly defined may be present together with the multi-link in the 802.11be, when the PV1 probe response option element is re-used, a bitmap for information which is newly defined in the 11be or which is to be additionally obtained shall be newly defined or additionally defined.

FIG. 30 illustrates an example of a PV1 probe response option element format.

Transmission Periodic Field/Element

When an STA desires to receive information provided in the unsolicited method, whether a message including the information is to be received periodically or received aperiodically may be indicated through a periodic field.

For example, when the STA desires to receive the information aperiodically, whenever information on other APs is updated, the AP may notify about the updated information. As another example, when it is indicated that the STA is to receive the information periodically, the STA may receive a message including the information with an interval of a set period.

According to an embodiment, a transmission periodic field may be set to 1 bit. When a value of the transmission periodic field is set to 1, the STA may receive/obtain information through a periodic method in which a message is received periodically. When the value of the transmission periodic field is set to 0, the STA may receive/obtain information through a method in which a message is received aperiodically.

Transmission Interval Field/Element

According to an embodiment, when an STA desires to receive information on other APs periodically, the STA may directly set a period thereof. The STA may transmit information on a period for receiving information on other APs, based on a transmission interval field. However, the period shall be set to be shorter than a beacon transmission period. For example, when an FILS discovery frame is used, a period thereof shall be set to 20 us.

As described above, it may be defined as an additional field in an element indicating a transmission period, or may also be defined as a subfield in a transmission periodic field.

According to an embodiment, the field/element defined/configured to obtain the additional information for the multi-link is not limited to the aforementioned field/element, and various fields/elements may be further configured.

Accordingly, the MLD (AP MLD or non-AP MLD) may indicate IOM capability through negotiation between the AP MLD and the non-AP MLD by using at least one of the aforementioned elements/fields in the multi-link setup process. In addition, after the multi-link setup is complete, the MLD may update content agreed between the MLDs through additional message exchange.

According to an embodiment, when the IOM capability is enabled, the AP MLD and the non-AP MLD may operate based on an embodiment for link changing and reconnection.

Hereinafter, an example of the operation of the AP MLD and non-AP MLD may be described when the IOM capability is enabled. For example, the non-AP MLD may transmit the aforementioned fields/elements to the AP MLD to request additional information for a multi-link. The non-AP MLD may transmit an IOM capability element including the aforementioned fields/elements to the AP MLD. The fields/elements are included in the IOM capability element for exemplary purposes only, and may also be transmitted as independent fields/elements.

For example, in the multi-link setup process, the non-AP MLD may transmit an IOM capability element including "Method field=0" and "Info range field=1" to the AP MLD, and may agree on this with the AP MLD. In this case, after the multi-link setup, the non-AP MLD operates with the solicited method, and when information is requested, may request information on a multi-link including all information included in a beacon (e.g., information on other APs). Therefore, the AP MLD may provide/transmit information on a link as a response message, only when a request message is received from the STA. When the request message is received, the AP MLD may transmit to the STA a response message including information on all links in the AP MLD. The information on all links in the AP MLD may include all information included in the beacon.

As another example, the non-AP MLD may transmit to the AP MLD an IOM capability element including "Method field=1", "Info range field=0", "Link range=Link id 2", "Info condition field=(a value indicating a BSS load through a bitmap)", and may agree on this with the AP MLD. In this case, after the multi-link setup, the non-AP MLD may operate with the unsolicited method. Accordingly, the AP may transmit BSS load information on a link 2 to the STA through an additional message, without having to use an additional request message.

As another example, the non-AP MLD may transmit to the AP MLD an IOM capability element including "Method field=0", "Info range field=0", "only updated field or sub-field=1", "Info condition field=(a value indicating a BSS load through a bitmap)", and may agree on this with the AP MLD. In this case, after the multi-link setup, the non-AP MLD may operate with the solicited method. Accordingly, the AP MLD (or AP) may transmit a response message to the STA by including only updated (changed) information among BSS load information on all APs of the connected AP MLD when the STA requests information.

The present specification proposes several options for new elements so that an STA requests partial information (i.e., target information) on other APs of a connected AP MLD.

FIG. 31 illustrates an example of an MLD request element.

Referring to FIG. 31, "the number of Link ID" is a field for indicating the number of APs (i.e., links) requested when an STA requests information on a specific AP.

"Link ID" is a field including APs' indicator information requested by the STA. For example, when the STA transmits a probe request frame including the aforementioned MLD request element, an AP which has received the request message responds with a probe response including complete information on APs indicated in a corresponding element. When the STA desires to request partial information instead of the complete information on the indicated APs, if the probe request frame is transmitted by including a request element or extended request element defined in the conventional standard together with the MLD request element, an AP which has received this responds with a probe response including only information indicated in the request element or extended request element.

Additionally, a new element of FIG. 32 is also proposed.

FIG. 32 illustrates another example of an MLD request element.

Referring to FIG. 32, "the number of Link ID" is a field for indicating the number of APs (i.e., links) requested when an STA requests information on a specific AP.

"Link ID" is a field including APs' indicator information requested by the STA.

"Requested Element IDs/Requested Element ID extensions" is a field including element ID information of requested information when the STA requests specific information (i.e., element). This field includes only element ID information when an element ID corresponds to 0 to 254, and if it is a value greater than or equal to 255, this is recognized as an extended element ID and thus requested element ID extensions information shall be also be included together. In this case, information corresponding to "Requested Element IDs/Requested Element ID extensions" may be defined in the form of a field, but may also be included in an MLD request element in the form of a sub-element by being defined as a new element as shown in FIG. 33. The new element for this may be defined as shown in FIG. 33. A corresponding element may be indicated as one element without distinction of the existing request element or the extended request element, thereby advantageously reducing an overhead.

FIG. 33 illustrates an example in which a new element is defined based on an MLD request element.

For example, when an STA transmits a probe request frame including the aforementioned MLD request element, an AP which has received a request message responds with a probe response including information on APs indicated in a corresponding element.

Referring to FIG. 33, the AP recognizes information requested by the STA as complete or partial information according to whether a "Requested Element IDs/Requested Element ID extensions" field is omitted in a corresponding element. Element ID value information defined in the standard is defined in the 802.11 standard. In addition, the definition on the "Requested Element IDs" and "Element ID extensions" mentioned in the present specification is the same as in the conventional standard.

For example, if the STA requests the AP for information on the AP or other APs, the probe request frame is transmitted by including the aforementioned MLD request element. The AP which has received this responds with a probe response frame including only information requested through the "Requested Element IDs/Requested Element ID extensions" field among information on APs requested through the "Link ID" field.

In this case, when the STA performs transmission by omitting the "Requested Element IDs/Requested Element ID extensions" field, an AP which has received this responds with a probe response frame including complete information on APs requested through the "Link ID" field.

The format proposed above may request only the same information for all links.

However, the STA may optionally request different information for each link. Several options for this are proposed in the present specification.

First, a format for requesting different information for each link is additionally proposed.

FIG. 34 illustrates another example of an MLD request element.

As shown in FIG. 34, this is a method in which the existing Request element or/and Extended Request element information is included and indicated for each link in an MLE request element in order for an STA to request different information for each link. In this case, a new field or element "The number of Elements" is defined to notify a length of element to be requested. This information implies the number of elements requested for Link ID(x).

An AP which has received this verifies information requested differently for each link, based on the MLD request element, and responds thereto by including the information in a response frame.

In this case, an embodiment for a case where the field proposed in the present disclosure is used instead of the existing request element or/and extended request element may be as shown in FIG. 35. Each field or element may be optionally omitted.

FIG. 35 illustrates another example of an MLD request element.

Figure 36:
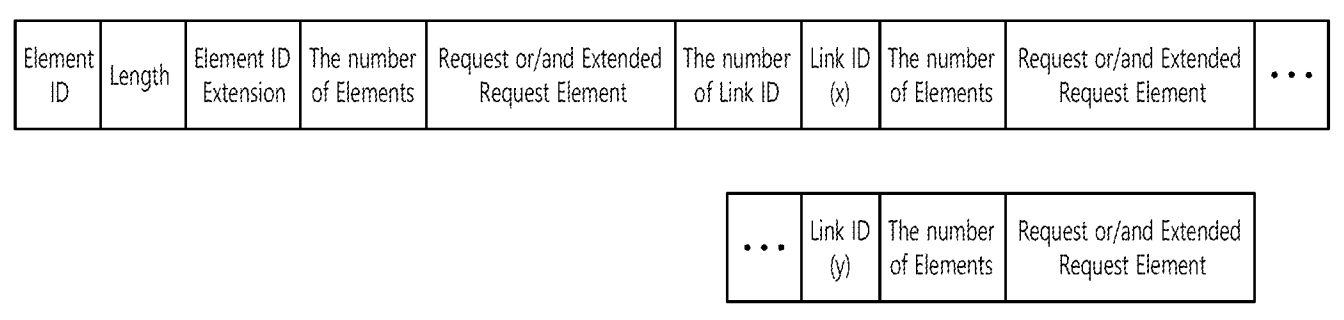

Second, a format in which common information requested identically for all links and link specific information requested differently for each link are identified when an STA requests information is proposed as shown in FIG. 36.

FIG. 36 illustrates another example of an MLD request element.

As shown in FIG. 36, when a request element or/and extended request element is included before the number of link ID field, this means elements for common information commonly requested for links indicated thereafter, and information arranged subsequent to the number of elements together with Link ID(x) subsequent to the number of link ID field means element information requested for each link. Each field or element may be optionally omitted.

In this case, an embodiment for a case where the field proposed in the present disclosure is used instead of the existing request element or/and extended request element may be as shown in FIG. 37. Each field or element may be optionally omitted.

FIG. 37 illustrates another example of an MLD request element.

As shown in FIG. 37, when a request element or/and extended request element is included before the number of link ID field, this means elements for common information commonly requested for links indicated thereafter, and information arranged subsequent to the number of elements together with Link ID(x) subsequent to the number of link ID field means element information requested for each link. Each field or element may be optionally omitted.

Fourth, common information requested identically for all links when the STA requests information is used to indicate as shown in FIG. 38, as an additional request element or extended request element together with the MLD request element.

FIG. 38 illustrates an example of a field for requesting common information.

This is a method in which, when an STA requests information on several links of an AMP MLD through a request frame, information which is commonly requested is indicated through the existing request or/and extended request element, and information requested differently for each link is indicated through an MLD request element. In this case, a format of the MLD request element may be defined in various forms. An AP which has received this request message recognizes information included in the request or/and extended request element as information requested commonly for a link indicated in the MLD request element, and transmits a response message including corresponding element information on all links indicated in the MLD request element. Additionally, when the STA requests different information for each link, the AP transmits the response message including the information, based on information indicted for each link in the MLD request element.

A method in which an STA requests partial information on other APs of a connected AP MLD by using a multi-link (ML) IE defined in the 802.11be standard is proposed.

Figure 39:
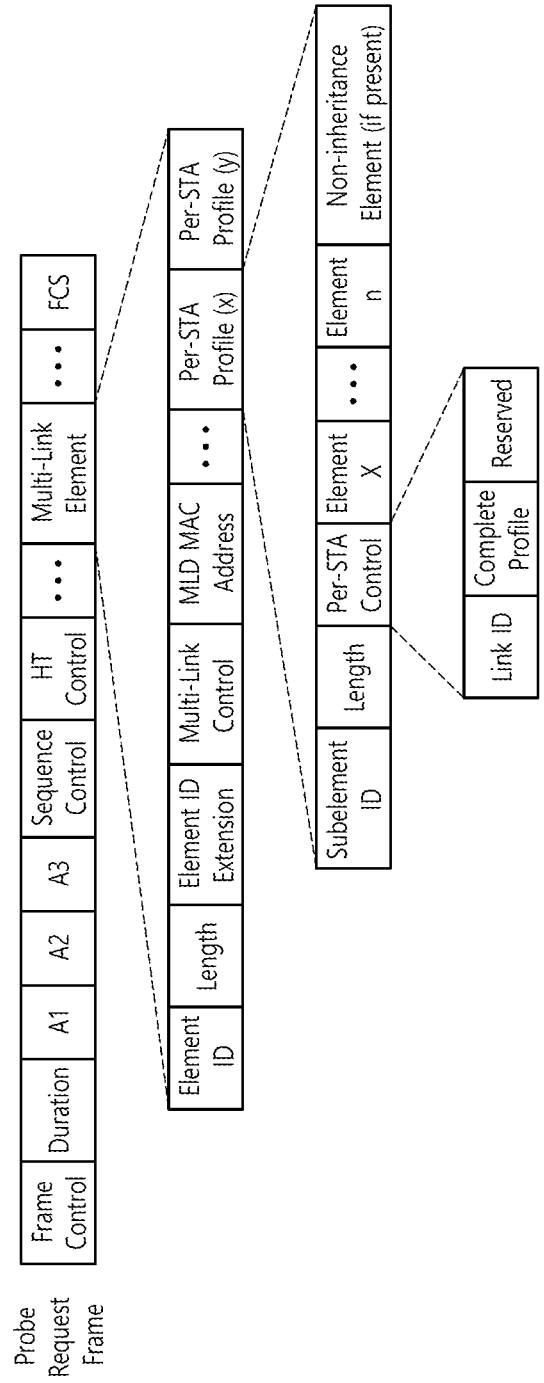
FIG. 39 illustrates an example of an ML IE format defined in 802.11be.

FIG. 39 illustrates an example of an ML IE format defined in 802.11be.

A multi-link (ML) information element (IE) is defined as shown in FIG. 39 in order to define information for each link. An element or a field may be added according to a function proposed at a later time. Several information on a corresponding link may be included in a per-STA profile (x) sub-element. The sub-element includes a corresponding link ID through the per-STA control field and content for an information range included in the sub-element through a per-STA control field, and arranges information (element) corresponding to information requested by an STA at a later time. In this case, in the presence of non-inheritance information, a non-inheritance element may be used to include the information. A complete profile in the per-STA control sub-element is a field for identifying whether the included information is complete information or partial information on a corresponding link.

Accordingly, the ML IE may be included in a request frame (e.g., probe request frame), so that the STA utilizes it for a partial information request of other APs. To this end, various options are proposed.

The following restriction element is defined in the present specification in order to use the ML IE for MLD probing. When the STA uses the ML IE in the probe request frame for MLD probing, element information (e.g. Element x, . . . , Element n) provided in the per-STA profile (x) may be omitted in transmission to reduce an overhead (However, the element information shall be included when the ML IE is used in an association request/response frame used for association). When information requested by the STA is complete information on a link, a complete information bit is indicated through the per-STA control field and is transmitted by omitting a subsequent element information list. Otherwise, a partial information bit is indicated through the per-STA control field, and information on an element ID requested at a later time is added. Several options for a case where the STA requests partial information on a specific element, not the complete information, is defined below in a greater detail.

As described above, information included in the ML IE defined in the 802.11be may vary depending on whether a corresponding element is included in an association frame or a probe frame and whether a corresponding frame is a request or a response. For example, when the STA performs the probe request, if the ML IE is used, elements including several information in the per-STA profile (X) may be omitted, and otherwise, element information shall be included. Accordingly, a control field for indicating this is proposed.

Figure 40:
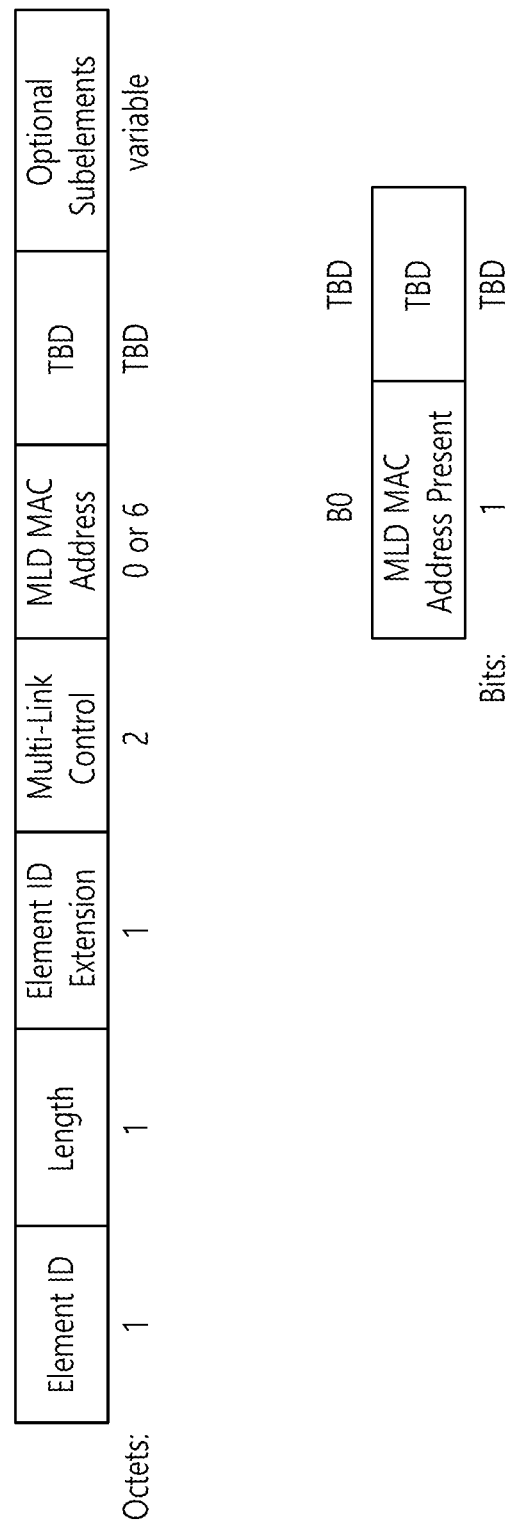
FIG. 40 illustrates an example of a multi-link element format and multi-link control field format.

At present, multi-link element and multi-link control field formats defined in the 802.11b standard are as shown in FIG. 40.

FIG. 40 illustrates an example of a multi-link element format and multi-link control field format.

In this case, a field for indicating a form of a frame including a current multi-link element is added in a multi-link control field element. The proposed field is defined as an "Elements per-STA Present". A name of the field may be re-defined optionally. The field indicates a presence or absence of element list information for each STA, requested by the current ML IE. When a corresponding value is 1, it means that element subsequent to the Per-STA Control field is included in the Per-STA Profile (x) field, and when the value is 0, it means that element information subsequent to the Per-STA Control field is omitted in the Per-STA Profile (x) field. An embodiment thereof is as shown in FIG. 41.

Figure 41:
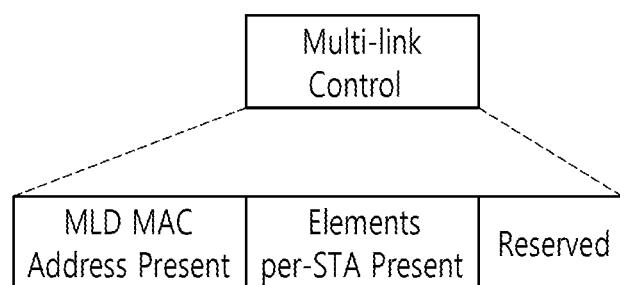
FIG. 41 illustrates an example of a multi-link control field format.

FIG. 41 illustrates an example of a multi-link control field format.

Additionally, as described above, information included in the ML IE defined in the 802.11be may vary depending on whether a corresponding element is included in an association frame or a probe frame and whether a corresponding frame is a request or a response. Accordingly, a field capable of indicating this is proposed. The field is included in the ML IE of the request/response frame to indicate a frame type currently transmitted by the STA. Accordingly, an element configured additionally (an element configured with 0 or a variable) may vary in content or an arrangement order.

"frame type": an indicator which means a frame type transmitted currently by the STA. It indicates a type of a frame in which a current ML IE is included according to a value of a corresponding field. For example, it may be indicated by being classified into "0: association request, 1: association response, 3: probe request, 4: probe response" or the like. This may be represented by an integer value, but may also be represented by a bitmap. In addition thereto, MLD probing configured in the 802.11be may be additionally classified into: "5: MLD Probe request frame, 6: MLD Probe response frame" or the like. As such, this is an indicator for indicating that an element configuration of the ML IE varies depending on the frame type. Each frame type may be arranged in the form of subfields in the "frame type" field, and may be configured to indicate a frame type when it is 1.

In this case, it may be classified again into several subfields in the "frame type" according to several functions of the transmitted frame. Therefore, a "request type" which is a subfield classified according to the purpose of a frame in the "frame type" is defined in the present specification. The "request type" subfield is classified more specifically according to a message format classified as the "frame type", and may be classified according to the purpose of the frame currently transmitted. For example, in the "frame type", when an MLD probe request frame is transmitted to request complete or partial information on a specific AP, the "frame type" field is set to an MLD probe request frame (field=5). However, whether requested information is complete information or partial information or, when the partial information is requested, which specific information (e.g., critical update-related information, link subset information, which is not set up, for link re-setup, etc.) is requested by corresponding information may be classified more specifically as the "request type". If the "frame type" is set to a (re) association request frame for link switching for a specific AP, the "frame type" field is set to the (re)association request frame (For reference, since all frames are classified as the same basic type except for the MLD probe request frame in the current 802.11be, the (re)association request frame will be classified as the basic type, but the classification of the frame type may change in the future). However, this may be indicated in the "request type" subfield according to the purpose of requesting a frame (e.g., TID-link mapping, link switching between MLDs, link switching in the same MLD). A non-AP STA or AP which has received this may recognize the purpose of the frame transmitted by the STS more specifically through a subfield value transferred together with a type of the currently received frame, and may transmit a response frame including proper information.

Several format options and operations for an ML IE for a case where the STA requests partial information on a specific element, not complete information, are proposed as follows.

First, there is a method in which transmission is performed by including a request element or/and extended request element for indicating information to be requested by an STA to a corresponding AP in the per-STA profile (x) in the existing ML IE.

An AP which has received a request message indicating corresponding information may know partial information on a link to be requested by the STA through ML IE information, and transmits a response frame (e.g., probe response frame) including the corresponding information. In this method, the STA indicates whether a link ID to be requested and information currently requested are complete information or partial information through the per-STA control field in the per-STA profile (x) in the ML IE, and additionally indicates specific information to be requested through the request element or/and extended request element. The STA may request desired specific information for each link by using the format of FIG. 42. If the request element or/and extended request element is omitted, it means that complete information on a corresponding AP is requested. However, element information arranged subsequent to the per-STA control field may be optionally omitted as described above.

Figure 42:
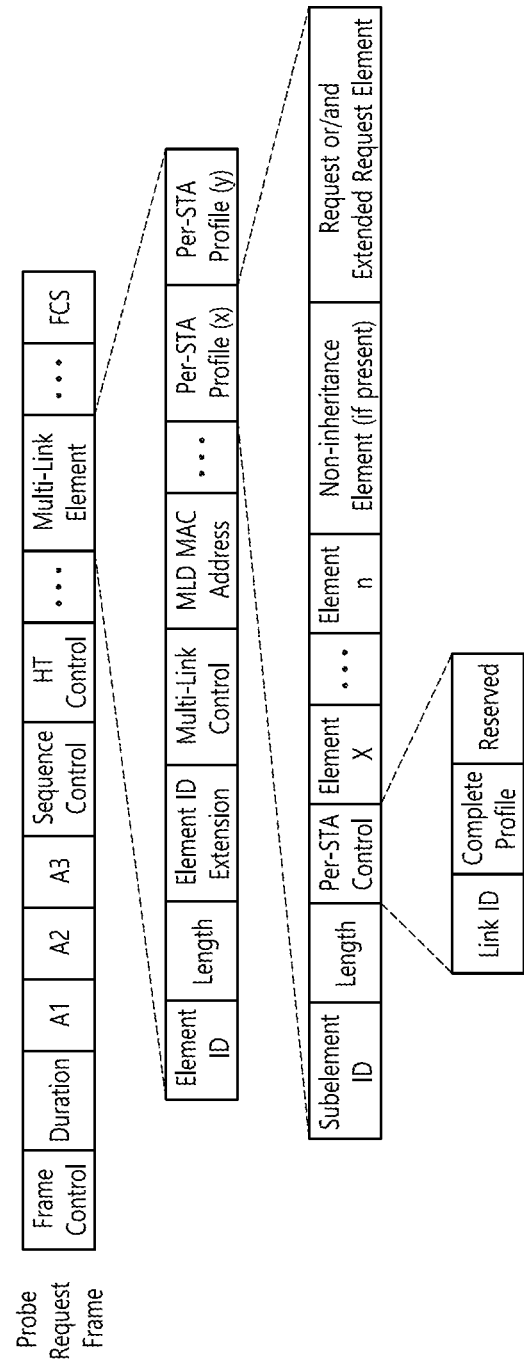
FIG. 42 illustrates an example of an ML IE format.

FIG. 42 illustrates an example of an ML IE format.

Second, there is a method in which transmission is performed by including a requested element IDs/requested element ID extensions field for indicating information to be requested by an AP to a corresponding AP in the per-STA profile (x) in the existing ML IE. A corresponding field is defined in FIG. 43 as a field proposed in the present specification.

Figure 43:
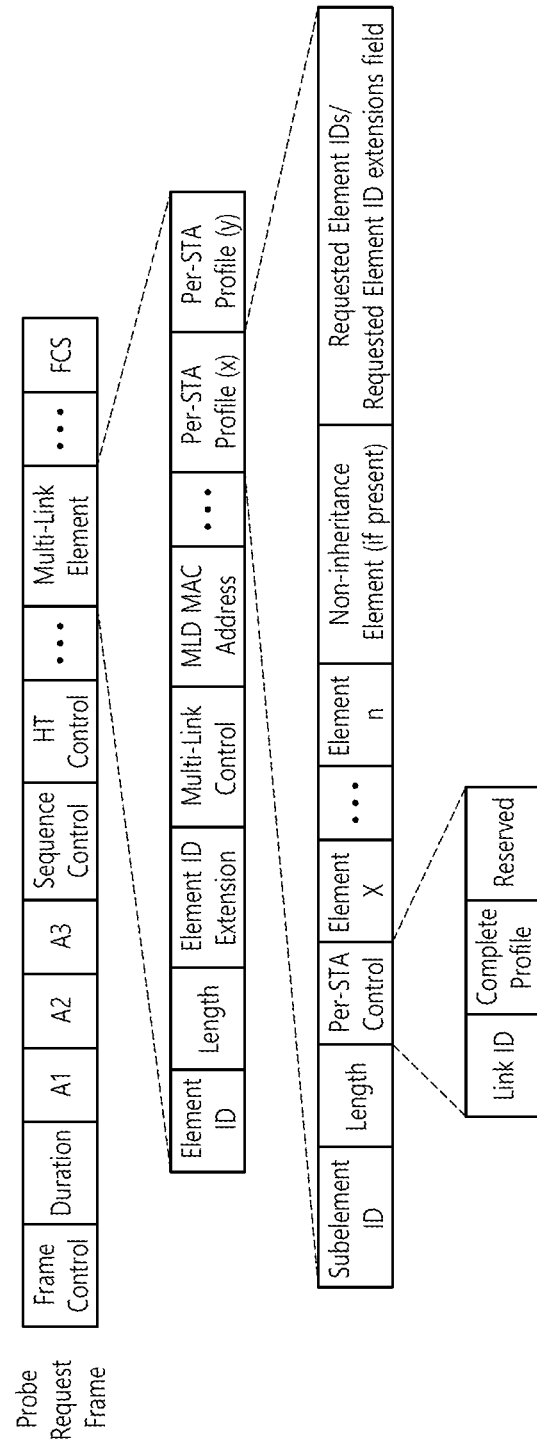
FIG. 43 illustrates another example of an ML IE format.

FIG. 43 illustrates another example of an ML IE format.

An AP which has received corresponding information may know partial information on a link to be requested by the STA through ML IE information, and transmits a response frame (e.g., probe response frame) including the corresponding information. In this method, the STA indicates whether a link ID to be requested and information currently requested are complete information or partial information through the per-STA control field in the per-STA profile (x) in the ML IE, and additionally indicates specific information to be requested through the requested element IDs/requested element ID extension field. If the requested element IDs/requested element ID extensions field is omitted, it means that complete information (i.e., all elements information) of a corresponding AP is requested. An embodiment of a corresponding format is as follows. However, element information arranged subsequent to the per-STA control field may be optionally omitted as described above.

The format of FIG. 43 has an advantage in that element indication information defined in the 802.11 standard is transmitted as one piece of information without having to be identified whether it is the request element or/and extended request element, thereby reducing a default field overhead (e.g., element ID, length) or the like.

Third, there is a format in which an STA performs transmission by including the request element or/and extended request element to indicate information to be requested to each AP, so that a request is made by identifying link specific info and common info which is to be requested commonly for all APs by the STA are requested. The format is defined in FIG. 44.

Figure 44:
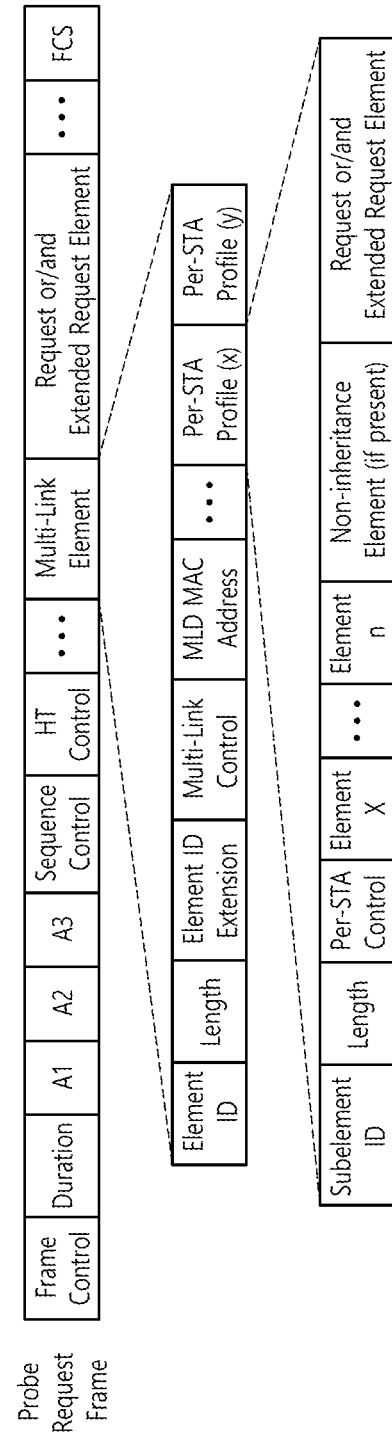
FIG. 44 illustrates another example of an ML IE format.

FIG. 44 illustrates another example of an ML IE format.

When an STA requests information of each of APs through a request frame (e.g., probe request frame), some pieces of information may be identically requested, and the other pieces of information may be requested such that information differs for each AP. A format for indicating this is defined and an embodiment thereof is proposed. As shown in FIG. 44, an indicator for indicating the same information requested by the STA with respect to APs requesting information through the request frame uses a request or/and extended request element together with the ML IE in the request frame, and an indicator for indicating different information requested for each AP uses a request or/and extended element in the per-STA profile (x). However, element information arranged subsequent to the per-STA control field may be optionally omitted as described above.

For example, the STA may perform transmission in such a manner that information (e.g., Element 5=11) corresponding to a TIM element is indicated in the probe request frame as a request element, "Link ID=1, Complete Profile=0 (otherwise, if the value is 1, it means a request for all elements information)" is indicated in a per-STA control of the per-STA profile (x) in the ML IE, information (e.g. Element ID=11) corresponding to a BSS load element is indicated in the request element, "Link ID=2, Complete Profile=0" is indicated in a per-STA control of a per-STA profile (y), and information (e.g. Element ID=255, Element ID extension=56) corresponding to a non-inheritance element is indicated in the extended request element. In this case, the AP responds with the probe response frame including the following information.

TIM element information on Link 1, Link 2
BSS load element information on Link 1
Non-inheritance element information on Link 2

The STA may request different information for each link, by classifying information requested according to an arrangement of an element in the frame into common information or link-specific information.

As such, in the 802.11be, an inheritance model may also be applied for the ML probe request frame. When the STA transmits the ML probe request including the (extended) request element as described above, such a partial information request is accepted by a peer AP as a common information request for all APs since the inheritance model is also applied to not only the peer AP but also APs requested through an ML IE (i.e., probe request variant multi-link element). Accordingly, when a probe request frame including the (extended) request element outside the ML IE is received from the STA as shown in FIG. 44, it is interpreted as a common information request for the peer AP and the requested APs (APs indicated for an information request of other APs in the ML IE), and an ML probe response may be provided as a response by verifying requested information indicated by the (extended) request element and by allowing the per-STA profile to include information corresponding to each AP in the ML IE (e.g., basic variant multi-link element).

Fourth, there is a format in which an STA performs transmission by including the request element or/and extended request element in the multi-link element to indicate information to be requested to each AP, so that a request is made by identifying link specific info and common info which is to be requested commonly for all APs by the STA are requested. The format is defined in FIG. 45.

Figure 45:
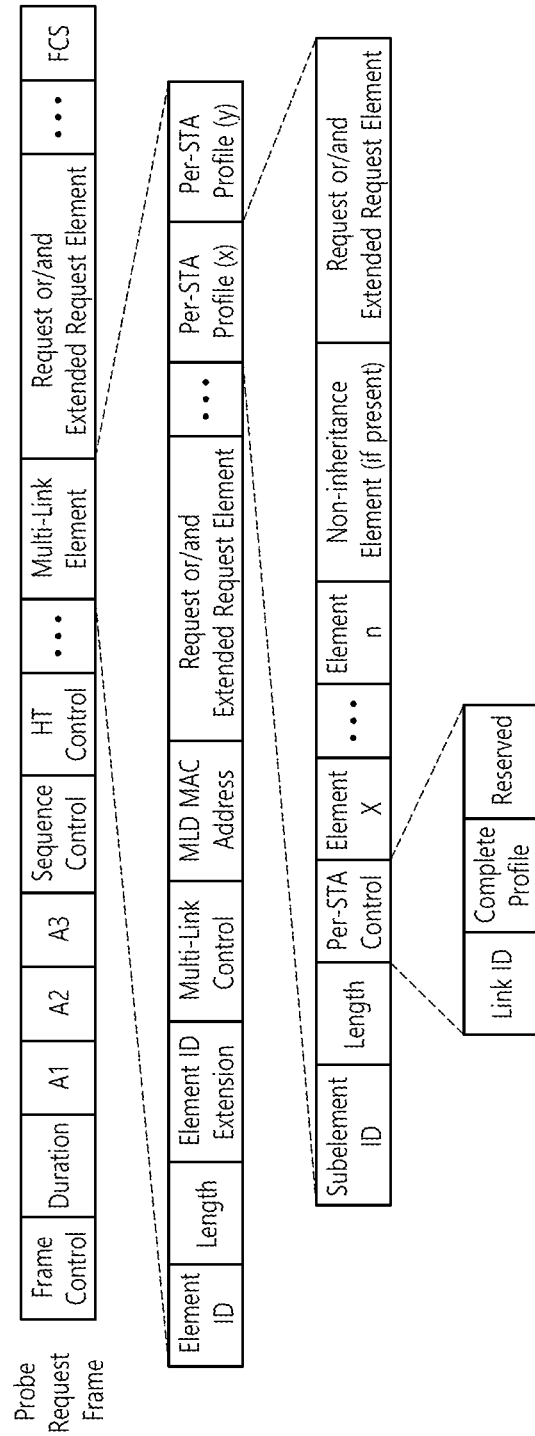
FIG. 45 illustrates another example of an ML IE format.

FIG. 45 illustrates another example of an ML IE format.

When an STA requests information of each of APs through a request frame (e.g., probe request frame), some pieces of information may be identically requested, and the other pieces of information may be requested such that information differs for each AP. A format for indicating this is defined and an embodiment thereof is proposed. If the request or/and extended request element is included together with the multi-link element in the request frame (e.g., probe request), this means that the STA requests partial information on a link (i.e., associated AP) to which the STA is connected. Upon requesting information on APs not corresponding to a link of the STA among APs of an AP MLD to which the STA is connected, indication information thereof includes an ML IE (multi-link element). Accordingly, when a request or/and extended request element is included in the ML IE before the per-STA profile (x) element, information requested commonly for other APs (APs not corresponding to the link of the STA among APs included in the AP MLD to which the STA is connected) of the AP MLD requested by the STA through a corresponding element may be indicated. The information requested commonly for other APs may be indicated through the request or/and extended request element in the ML IE, and the information requested differently for each of other APs may be indicated by adding the request or/and extended request element subsequent to the per-STA control field in the per-STA profile (x). When an indicator of an AP corresponding to a link of the STA, not other APs, is included in the per-STA profile (x) in the ML IE, the STA may also obtain information on an AP corresponding to the link of the STA through the ML IE. In this case, the request or/and extended request element included together with the ML IE to request partial information on the AP corresponding to the link of the STA may be omitted.

However, element information arranged subsequent to the per-STA control field may be optionally omitted as described above.

Fifth, the STA may request some pieces of complete information or some pieces of partial information on a peer AP (i.e., transmitting link) and other APs (i.e., other links) through the MLD probe request. Several cases and embodiments related thereto are as follows.

1) When complete information is requested for the peer AP, and complete information is also requested for other APs An EHT non-AP STA is able to transmit a message for requesting complete information on the peer AP and other APs by using one probe request frame.

Figure 46:
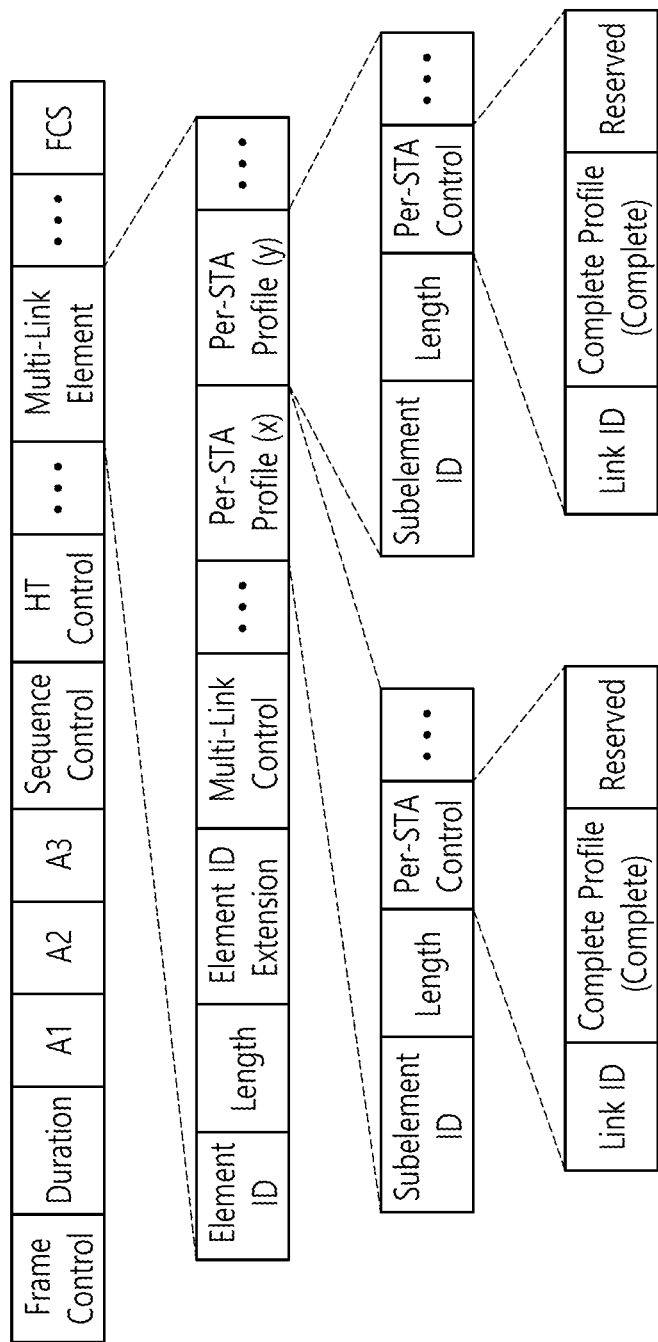
FIG. 46 illustrates an example of a probe request frame including an ML IE format.

FIG. 46 illustrates an example of a probe request frame including an ML IE format.

Referring to FIG. 46, when complete information is requested for the peer AP, a complete information request for other APs is indicated by setting a complete profile subfield in the per=STA control field in the per-STA profile of the multi-link element (i.e., probe request variant multi-link element) to 1, without having to include the (extended) request element in a core of probe request frame (frame body of the probe request frame).

2) When complete information is requested for the peer AP, and complete or partial information is requested for other APs 2) When complete information is requested for the peer AP, and complete or partial information is requested for other APs The EHT non-AP STA is able to transmit a message for requesting complete information on the peer AP and requesting complete or partial information on other APs indicated through the ML IE by using one probe request frame.

Figure 47:
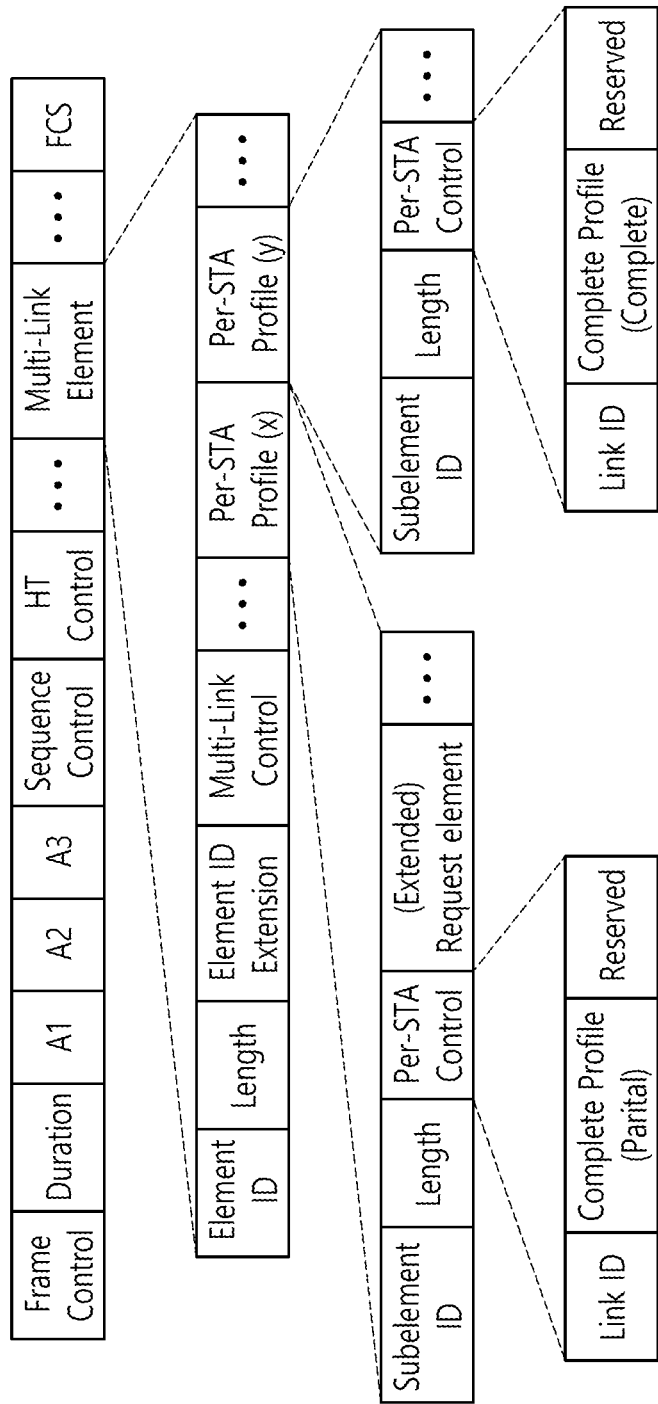
FIG. 47 illustrates another example of a probe request frame including an ML IE format.

FIG. 47 illustrates another example of a probe request frame including an ML IE format.

Referring to FIG. 47, when complete information is requested for a peer AP, an (extended) request element is not included in a core of probe request frame, and when partial information is requested for other APs, a partial information request is indicated for other APs by including the (extended) request element in a per-STA profile of a multi-link element (i.e., a probe request variant multi-link element) and by setting a 'complete profile' subfield in the 'per-STA control' field to 0. In this case, when it is desired to request complete information on other APs, the 'complete profile' subfield in the 'per-STA control' field is set to 1 without the (extended) request element in the per-STA profile. As such, for other APs, a request of complete information or partial information is possible for each AP with one probe request frame.

3) When partial information is requested for the peer AP, and complete or partial information is requested for other APs The EHT non-AP STA is able to request partial information on the peer AP by using one probe request frame and to request complete or partial information on other APs indicated through the multi-link element.

Figure 48:
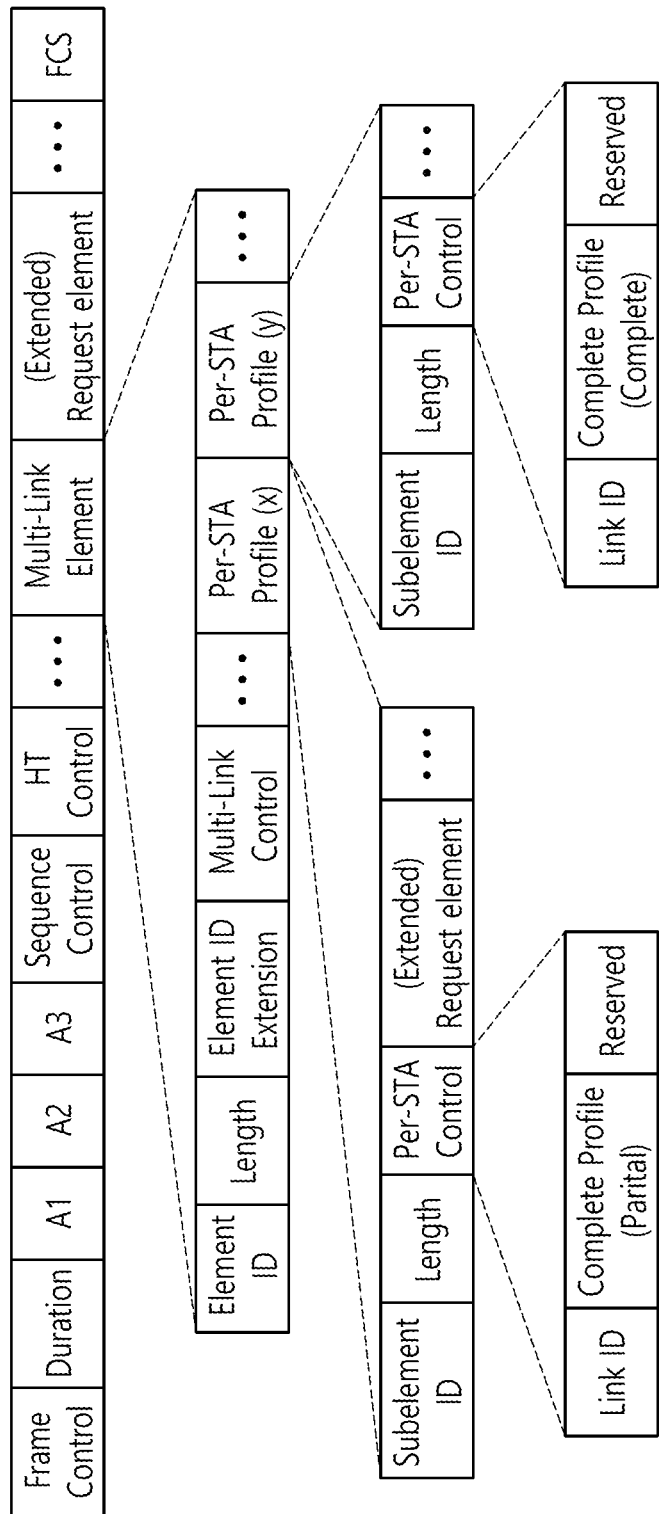
FIG. 48 illustrates another example of a probe request frame including an ML IE format.

FIG. 48 illustrates another example of a probe request frame including an ML IE format. Referring to FIG. 48, when partial information is requested for a peer AP, an (extended) request element is included in a core of probe request frame, and when complete information is requested for other APs, a complete information request may be indicated for other APs without the (extended) request element in a per-STA profile of a multi-link element (i.e., a probe request variant multi-link element) and by setting a 'complete profile' subfield in the 'per-STA control' field to 1.

In this case, when it is desired to request partial information on other APs, the 'complete profile' subfield in the 'per-STA control' field is set to 0 by including the (extended) request element in the per-STA profile. In a case where the inheritance model is applied to the MLD probe request, if the same information is requested for the peer AP and the AP (x) (i.e., link) indicated in the per-STA profile (x) as partial information, the (extended) request element in the per-STA profile (x) may be omitted. That is, the (extended) request element is included in the per-STA profile (x) only when the (extended) request element included in the core of probe request frame corresponds to the non-inheritance element, and otherwise, may be omitted.

Figure 49:
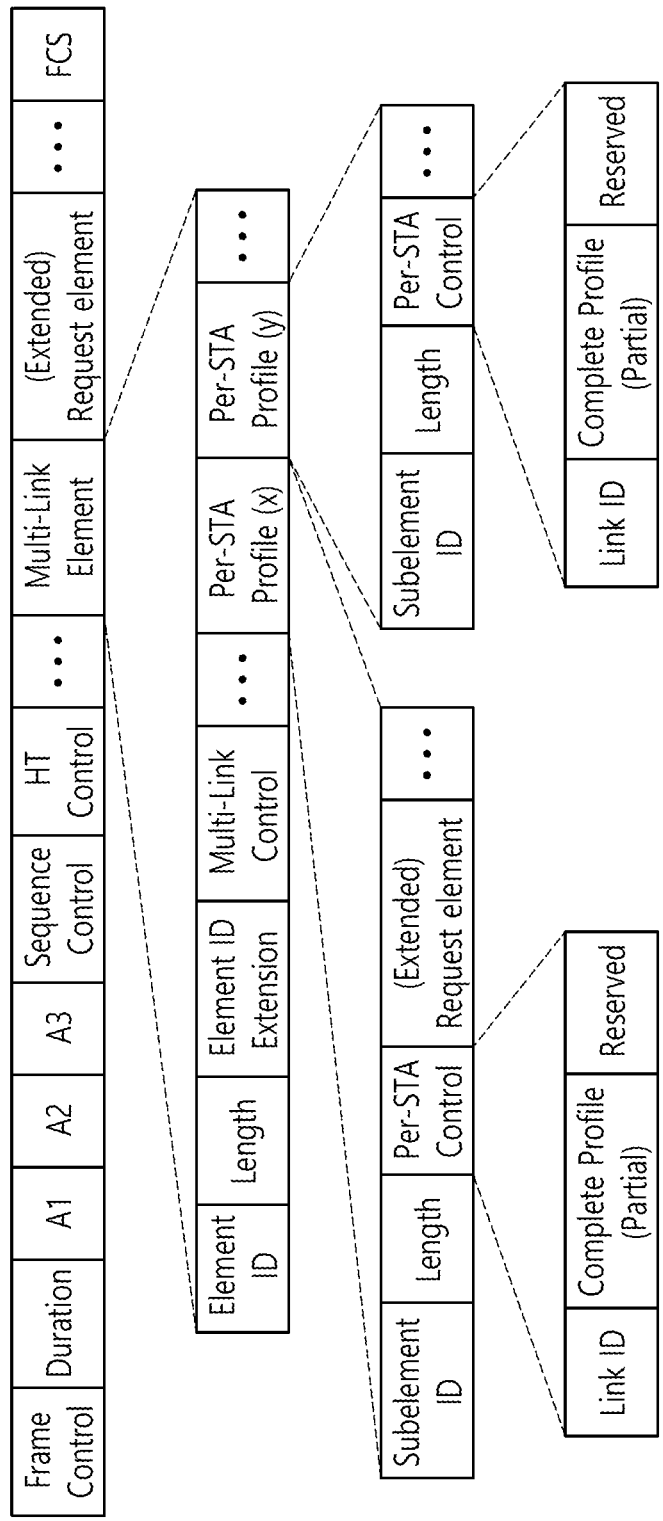
FIG. 49 illustrates another example of a probe request frame including an ML IE format.

An embodiment in which the inheritance model is applied to the MLD probe request is as shown in FIG. 49.

FIG. 49 illustrates another example of a probe request frame including an ML IE format.

Referring to FIG. 49, when an EHT non-AP STA requests partial information on a peer AP through an MLD probe request, an (extended) request element is included in a core of probe request frame. In this case, when partial information different from that of the peer AP is requested for some APs (i.e., per-STA profile (x)) among APs indicated by a multi-link element, different information may be requested by including the (extended) request element corresponding to the non-inheritance element in the per-STA profile (x). In this case, a complete profile value of the per-STA control field is set to 0.

Alternatively, when partial information which is the same as that of the peer AP is requested for some APs (i.e., per-STA profile (y)) among the APs indicated by the multi-link element, the (extended) request element in the per-STA profile (y) is omitted. In this case, the complete profile value of the per-STA control field is set to 0. As such, in a case where the inheritance model is applied to the MLD probe request, when the EHT non-AP STA requests the peer AP for Element (a) and Element (b) and requests the AP (x) indicated by the per-STA profile (x) for Element (a) and Element (c), there is information (e.g., Element (a)) requested identically to the peer AP and the AP (x) but different information (e.g., Element (c)) is also included. Therefore, in order for the AP to identify this, an (extended) request element indicating an information request for Element (a) and Element (c) shall be included in the per-STA profile (x). (In case of applying the inheritance model, when the (extended) request element is present in the per-STA profile (x), even if there is partial information requested redundantly by the peer AP, this is recognized as a non-inheritance element. Therefore, if it is not the case of requesting the same partial information as the peer AP, all element information requested for an AP (e.g., AP (x)) indicated through the per-STA profile (x) shall be indicated in the (extended) request element included in the per-STA profile (x) irrespective of partial information requested for the peer AP). However, when the EHT non-AP STA requests the peer AP for Element (a) and Element (b) and requests the AP (x) indicated by the per-STA profile (x) for the same Element (a) and Element (b), since the same information is requested for the peer AP and the AP (x), the 'complete profile' subfield in the per-STA profile (x) may be set to 0 by applying the inheritance model, and the (extended) request element indicating an information request for Element (a) and Element (b) may be omitted.

In this case, when the complete profile value of the per-STA control field is set to 1, it means a complete information request for the AP (y), instead of applying the inheritance model to the request information on the peer AP. That is, in the content of the partial information request for the peer AP, the complete profile value of the per-STA control field shall be set to 0 in order to apply the inheritance model to the multi-link element.

The STA may request different information for each link, by classifying information requested according to an arrangement of an element in the frame into common information or link-specific information.

To this end, additionally, a new field for indicating whether information requested by a corresponding ML IE in the multi-link control field identifies common information is proposed. As such, the STA may represent common information on a corresponding link according to an arrangement of the request element or/and extended request element. The request element or/and extended request element may be present in the request frame according to whether the common information is requested, before the per-STA profile (x) in the ML IE. Accordingly, a control field for indicating this is proposed as shown in FIG. 50.

Figure 50:
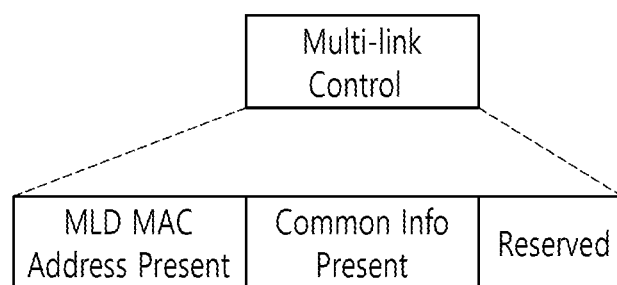
FIG. 50 illustrates an example of a multi-link control field format.

FIG. 50 illustrates an example of a multi-link control field format.

A field of FIG. 50 may be defined such as a 'common info present' field, and a term thereof may be defined as another term at a later time. In a case where the field is indicated with 1, when information on other APs is requested to an AP MLD, an STA transmits to the AP MLD a request element or/and extended request element which means the same information request, by including this element before a per-STA profile (x) element. In addition, link-specific information requested differently for each AP is indicated through the request element or/and extended request element included in the per-STA profile (x) element. In a case where the field is indicated with 0, it means that there is no information requested by the STA identically for other APs, and means that there is no additional request element or/and extended request element before the per-STA profile (x) element.

An embodiment for this is as follows.

An STA may request an AP of an AP MLD partially only for critical update information. To this end, two options are proposed. In this case, the AP may be all APs (reporting AP and reported AP) which are obtainable by the STA through a beacon. The reported AP means other APs which are obtainable by the STA through an RNR element of the beacon, and may be not only other APs in the same AP MLD as the reporting AP but also other APs corresponding to a TxBSSID group, other APs corresponding to a non-TXBSSID group, or the like. In other words, the STA may request critical update information on all other APs capable of obtaining change sequence number (CSN) information through the beacon (For reference, it is agreed in the 802.11be to include change sequence field information on other APs in the RNR element of the beacon frame).

First, there is a method in which a 'critical update request' field is newly defined for a request of critical update information on other APs.

'Critical update request' field: a field which requests only system information defined as critical update of an AP. It may be used together with a link indicator and may be used when system information defined as critical update of a specific link is requested.

When the STA requests information on other APs of the AP MLD, if a request frame (e.g., probe request frame) is transmitted together with link indicator information by setting a field value thereof to 1, an AP which has received this responds with a response frame including critical update information on the indicated link. In this case, the critical update information means several system information (a) Inclusion of an Extended Channel Switch Announcement, b) Modification of the EDCA parameters, c) Modification of the S1G Operation element) defined as critical update in the system information update procedure of the conventional 802.11 standard. However, in case of a later version, i.e., 802.11be, new information may be additionally defined in addition to system information predefined conventionally for the critical update, and critical update information mentioned in the present specification means information including the critical update information newly defined in the 802.11be. If a corresponding field value is set to 0 in transmission, the AP responds with a response frame as in the conventional operation. The proposed field may be included in any element in the request frame, and may be used by being included in the aforementioned MLD request element or ML IE. An embodiment for this is as shown in FIG. 51.

Figure 51:
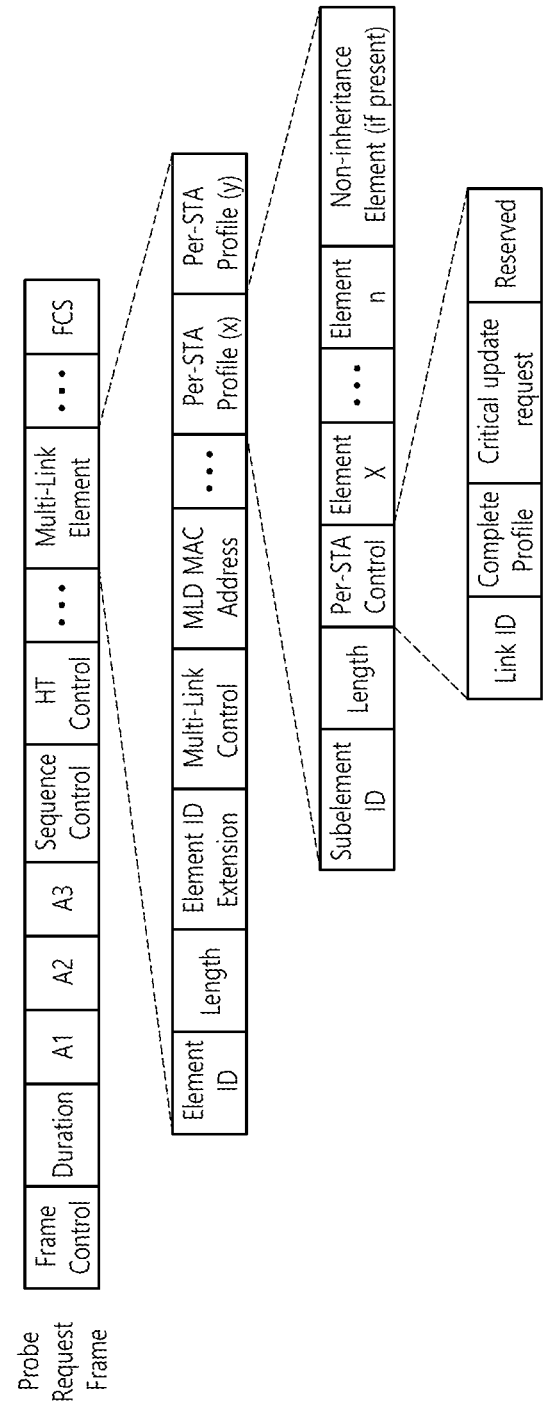
FIG. 51 illustrates an example in which a critical update request field is included in an ML IE format.

FIG. 51 illustrates an example in which a critical update request field is included in an ML IE format.

Referring to FIG. 51, when an STA requests information on specific links by using an ML IE in a probe request, information corresponding to a specific link may be requested through a per-STA profile (x). In this case, when a 'critical update request' field newly defined in a per-STA control in the per-STA profile (x) is included and set to 1 in transmission, an AP responds with a response frame including current system information defined as critical update for a link indicated in the per-STA profile (x). In this case, a non-AP STA of a non-AP MLD performs transmission by setting a 'critical update request' field value to 1 to request critical update information through an MLD probe request, change sequence number (CSN) information (e.g., change sequence element, change sequence field, etc.) for each non-AP STA of the non-AP MLD may be included together in transmission, or may be omitted in transmission according to an implementation of the STA. In this case, if critical update information on APs is requested by using the MLD probe request (i.e., 'Critical update request' field=1), an additional indicator is not required in case of using the change sequence element when CSN information is included (since the AP is capable of verifying an element ID of the change sequence element to verify a presence thereof). However, if the change sequence field is used as the CSN information, there is a need to additionally defined a (sub) field (e.g., 'CSN presence' subfield) to indicate whether the change sequence field is present. Accordingly, an indicator for indicating whether CSN information is present in the per-STA profile in the ML IE is additionally proposed in the present specification.

'CSN Presence' (sub)field: a field for indicating that a change sequence field is present. When a value thereof is set to 1, it indicates a presence of the change sequence field, and when the value is set to 0, it indicates an absence of the change sequence field.

This field may be used together with the 'critical update request' field when the STA requests critical update information on other APs (For example, the 'CSN presence' (sub)field may be used together with the 'critical update request' (sub)field in the per-STA control field of the per-STA profile element in the ML IE).

This field may also be used when the AP advertises CSN information on APs (including the reporting AP and the reported AP) through the beacon/probe response. This field is not necessary when the change sequence element is used to advertise the CSN information, but the 'CSN presence' (sub)field indicating a presence of the field is necessary when the change sequence field is used. In this case, the (sub)field may be included variously according to a location at which CSN information of each AP is included. It may be included in the beacon/probe response frame (e.g., when CSN information on the reporting AP is located in the beacon/probe response frame), or may be included in a common info part in the ML IE (e.g., when the CSN information on the reported AP is located in the common info part in the ML IE), or may be included in a per-STA profile (when the CSN information on the reported AP is located in a link info part in the ML IE).

In this case, if the non-AP STA requests critical update information on the STA (x) by setting a value of the 'critical update request' field of the per-STA control in the per-STA profile (x) of the multi-link element (e.g., probe request variant multi-link element) to 1 in order to request critical update information on each of STA (x), (y), (i.e., AP (x), (y), . . . ) by using the MLD probe request, an AP which has received this may respond as follows for an MLD probe response.

1) When the non-AP STA transmits the MLD probe request including CSN information thereof (i.e., it may be included in the form of the change sequence element or the change sequence field as CSN information received most recently) in the per-STA profile (x), together with 'critical update request' field=1'.

A. The AP may compare the CSN information on the non-AP STA (x) with the current CSN information on the AP (x) connected to the non-AP STA (x), and may make a response by including only updated critical update information (i.e., elements classified as an critical update event in the 802.11be) in the MLD probe response.

B. In this case, however, if the receiving AP MLD does not implement a function of tracking update information for each CSN of the AP, it is not possible to know which information is updated for each CSN version. Therefore, a response may be made by including all current critical update information on the AP (x) connected to the non-AP STA (x) (i.e., elements classified as the critical update event in the 802.11be) in the MLD probe response.

C. Although it is proposed in the present specification that a response is made for all current critical update information on the AP (x), not complete information on the AP (x), in order to reduce an overhead of the MLD probe response, it is also possible to respond with a complete profile (i.e., complete information) of the AP (x) even if the MLD probe request which is set to 'Critical update request' field=1 in the per-STA profile (x) is received from the non-AP STA according to an AP implementation.

2) When the non-AP STA transmits the MLD probe request by omitting CSN information thereof (i.e., CSN information received most recently) in the per-STA profile (x), together with 'Critical update request' field=1.

A. Since the AP does not know CSN information on the non-AP STA (x), a response may be made by including all current critical update information on the AP (x) connected to the non-AP STA (x) (i.e., elements classified as the critical update event in the 802.11be) in the MLD probe response.

B. Although it is proposed in the present specification that a response is made for all current critical update information on the AP (x), not complete information on the AP (x), in order to reduce an overhead of the MLD probe response, it is also possible to respond with a complete profile (i.e., complete information) of the AP (x) even if the MLD probe request which is set to 'Critical update request' field=1 in the per-STA profile (x) is received from the non-AP STA according to an AP implementation.

Figure 52:
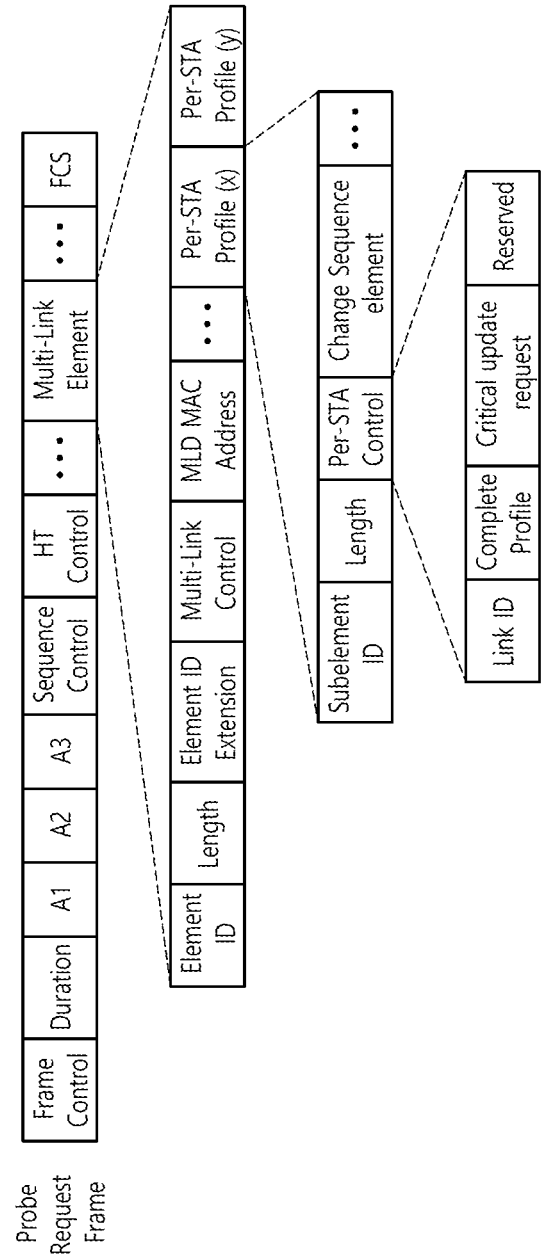
FIG. 52 illustrates an example of an MLD probe request which uses a change sequence element when critical update information is requested.

FIG. 52 illustrates an example of an MLD probe request which uses a change sequence element when critical update information is requested.

Figure 53:
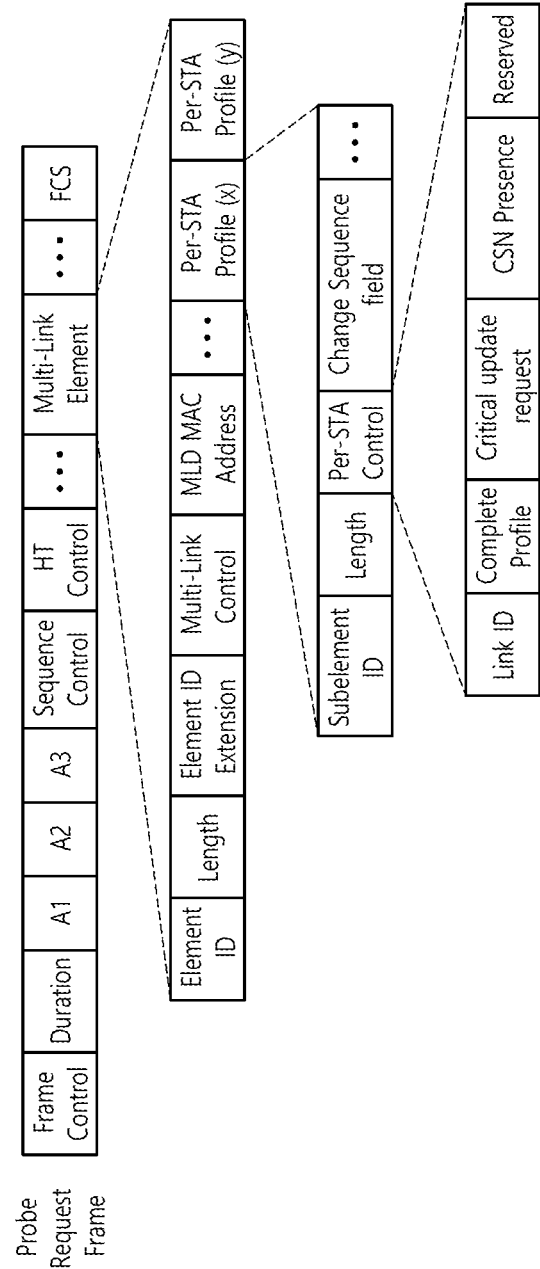
FIG. 53 illustrates another example of an MLD probe request which uses a change sequence element when critical update information is requested.

FIG. 53 illustrates another example of an MLD probe request which uses a change sequence element when critical update information is requested.

For example, when a non-AP STA requests critical update information on a specific STA (x), it may be set as shown in FIG. 53 that critical update request=1, and change sequence number information (e.g., change sequence element or change sequence field) may be transmitted together. In this case, the non-AP STA may optionally omit the change sequence number information in transmission. In this case, however, there may be a limitation in information to be included in the MLD probe response with which an AP responds as defined above.

Figure 54:
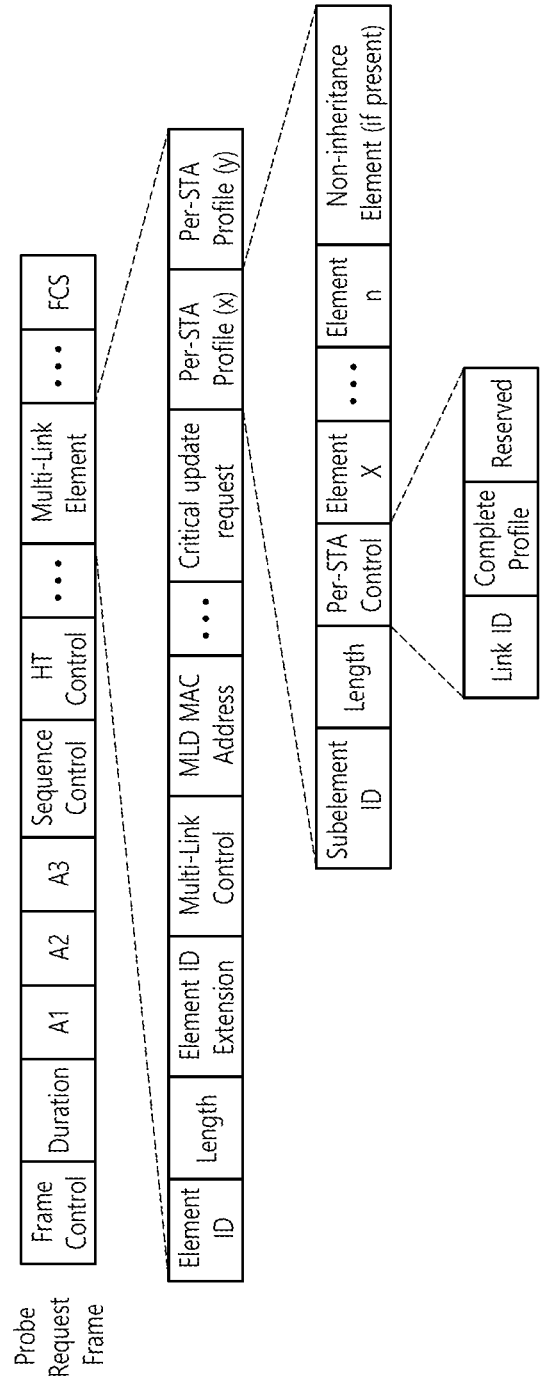
FIG. 54 illustrates an example in which a critical update request field is included in an ML IE format.

FIG. 54 illustrates an example in which a critical update request field is included in an ML IE format.

Referring to FIG. 54, when a critical update request field is located in an ML IE as described above, critical update information on all links indicated through a per-STA profile (x) may be requested. If the critical update request field is included at a location where common information is included in the ML IE, and if a field value is indicated with 1 in transmission, an AP which has received this responds with a response frame including critical update information on links requested in a corresponding request frame. Alternatively, the critical update request field may be indicated by being included in a subfield in the multi-link control field in the ML IE. A form of a field defined as such (field or subfield or sub-element, etc.) or a location in the ML IE may be defined variously according to a definition in a standard.

Second, there is a method of using a change sequence element for a critical update information request of other APs. In the 802.11ah, when the probe request frame is transmitted by including the change sequence element, the AP transmits the compressed probe response frame including only changed critical update information on a corresponding link in the probe response frame. This may also be utilized in the 802.11be.

When an STA makes a request by including a change sequence element in the probe response frame together with a link indicator for other APs, an AP which has received this transmits a probe response including only changed critical update information on indicated links in the probe response. The change sequence element may be included in any element or sub-element in the request frame, and may also be used by being included in the MLD request element or the ML IE. An embodiment thereof is as shown in FIG. 55.

Figure 55:
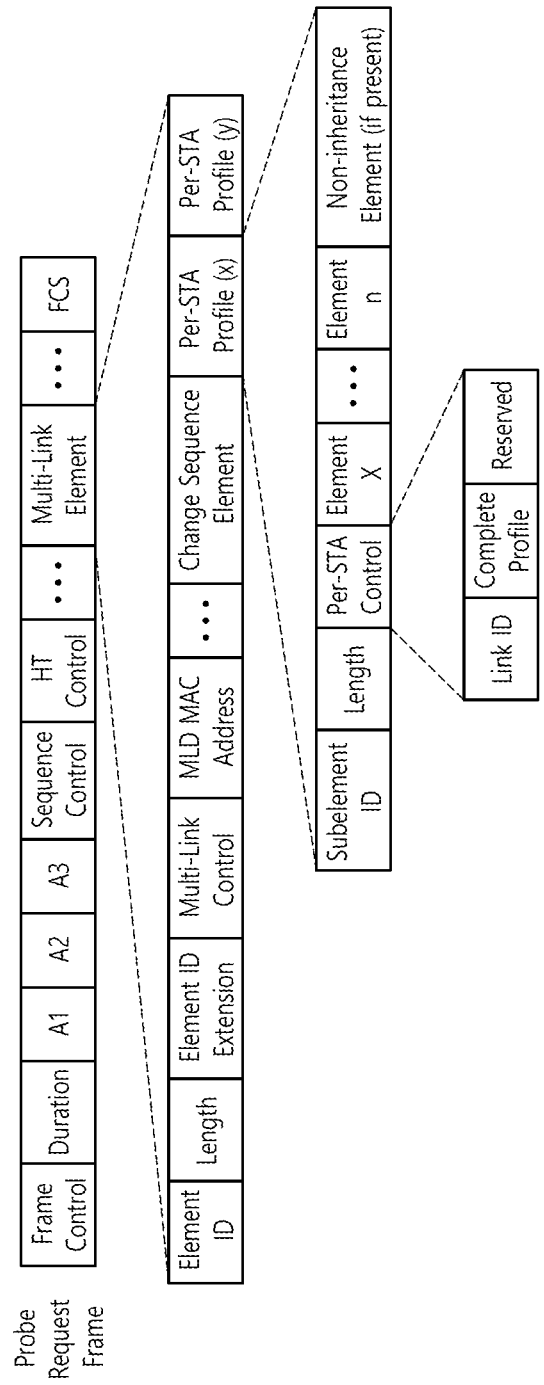
FIG. 55 illustrates an example in which a change sequence element is included in an ML IE format.

FIG. 55 illustrates an example in which a change sequence element is included in an ML IE format.

For example, when a change sequence element is included in an ML IE in transmission as shown in FIG. 55, an AP compares a change sequence field value currently owned by the AP for links indicated through the ML IE and a change sequence field value in a change sequence element transmitted by an STA, and when there is a change, makes a response by including changed critical update information in a probe response. In this case, the change sequence element transmitted by the STA shall include change sequence information on all links for which information is requested in the ML IE. Therefore, when the existing change sequence element is used, link indicator information additionally requested may be necessary. Additionally, the present specification also considers an option in which transmission is performed by including all information related to the critical update, currently owned by the AP, when the change sequence element is included in the ML IE in transmission as described above. If the change sequence field value transmitted by the STA and the field currently owned by the AP are different as a result of compassion performed by the AP, all information related to the critical update, currently owned by the AP, is transmitted to the STA. This method may result in an increase in an overhead for information transmitted by the AP, but may be implemented more simply since there is no need to store change information for each critical update version for each AP.

In addition, the present specification additionally proposes a new element considering an MLD.

'MLD Change Sequence element': An element which may include change sequence information on several links An embodiment thereof is as shown in FIG. 56 and FIG. 57.

FIG. 56 illustrates an example of an MLD change sequence format.

FIG. 57 illustrates another example of an MLD change sequence format.

An MLD change sequence value may be represented by repeatedly arranging a per-link change sequence value as shown in FIG. 56, or may be represented by indicating each of link ID information and change sequence information after indicating the number of links with 'The number of link ID' as shown in FIG. 57.

Figure 58:
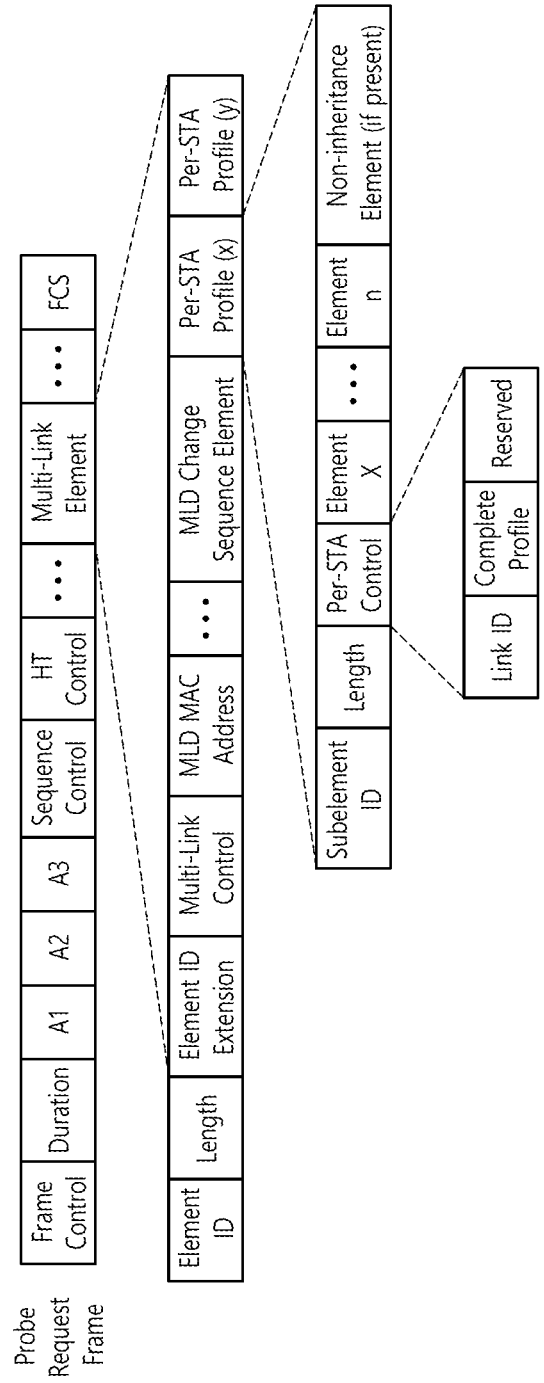
FIG. 58 illustrates an example of an MLD change sequence element.

An embodiment for the MLD change sequence element is as shown in FIG. 58.

FIG. 58 illustrates an example of an MLD change sequence element.

When an MLD change sequence element is transmitted by being included in an ML IE in a probe request frame as shown in FIG. 58, an AP may compare a change sequence value received for each link and a change sequence value owned by the AP, and may make a response by including changed critical update information on links corresponding to an updated change sequence value in a response frame. In this case, if an STA has no request for different information for each link, a per-STA profile (x) sub-element may be omitted in transmission.

In this case, when the existing change sequence element is used, it may be used as shown in FIG. 59.

FIG. 59 illustrates an example of a change sequence element in the conventional standard.

The existing change sequence element in an ML IE may be directly used to request critical update information updated for each link. An embodiment thereof may be as shown in FIG. 59.

Figure 60:
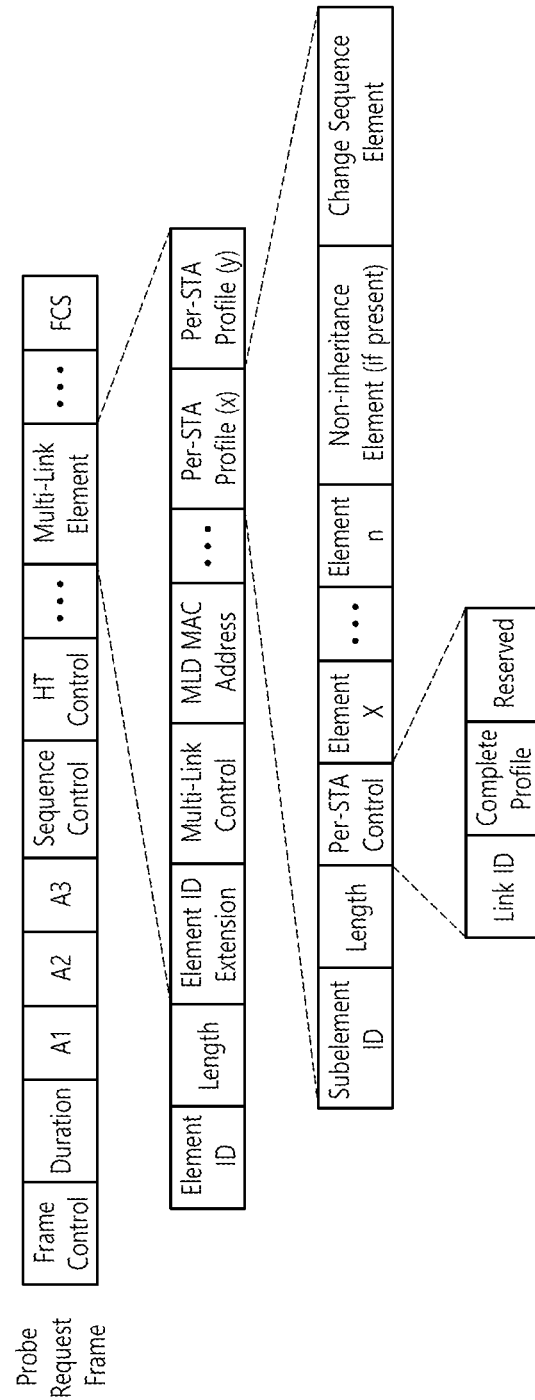
FIG. 60 illustrates another example in which a change sequence element is included in an ML IE format.

FIG. 60 illustrates another example in which a change sequence element is included in an ML IE format.

Referring to FIG. 60, when an STA transmits a probe request including a change sequence element in a per-STA profile (x) in an ML IE, it means a changed critical update information request of a link indicated in the per-STA profile (x). Accordingly, an AP which has verified the change sequence element included in the request frame may compare a received change sequence value and a change sequence value owned by the AP, and if there is an update (i.e., if there is changed information to be updated by the STA), may transmit the response frame including changed critical update information or may transmit the response frame including complete critical update-related information.

Third, there is a method in which a change sequence field is used together with the 'critical update request' field defined above for a request for critical update information on other APs. The 'critical update request' field is defined as follows as an indicator for requesting information on other APs by an STA.

'Critical update request' field: a field which requests only system information defined as critical update of an AP. It may be used together with a link indicator and may be used when system information defined as critical update of a specific link is requested.

However, in a case where the STA requests critical update information on a specific link by using a 1-bit indicator as described above, when an AP which has received this does not know a version of critical update information currently owned by the STA (i.e., a change sequence field value of critical update information currently owned by the STA), the AP shall transmit a response message including all critical update information on a requested link. In addition, the response frame may also be transmitted by including the change sequence element together with the critical update information. Although this is a simple method, information which is already owned by the STA may be transmitted redundantly. Therefore, a format for reducing an overhead thereof is additionally proposed. An embodiment thereof is as follows.

Figure 61:
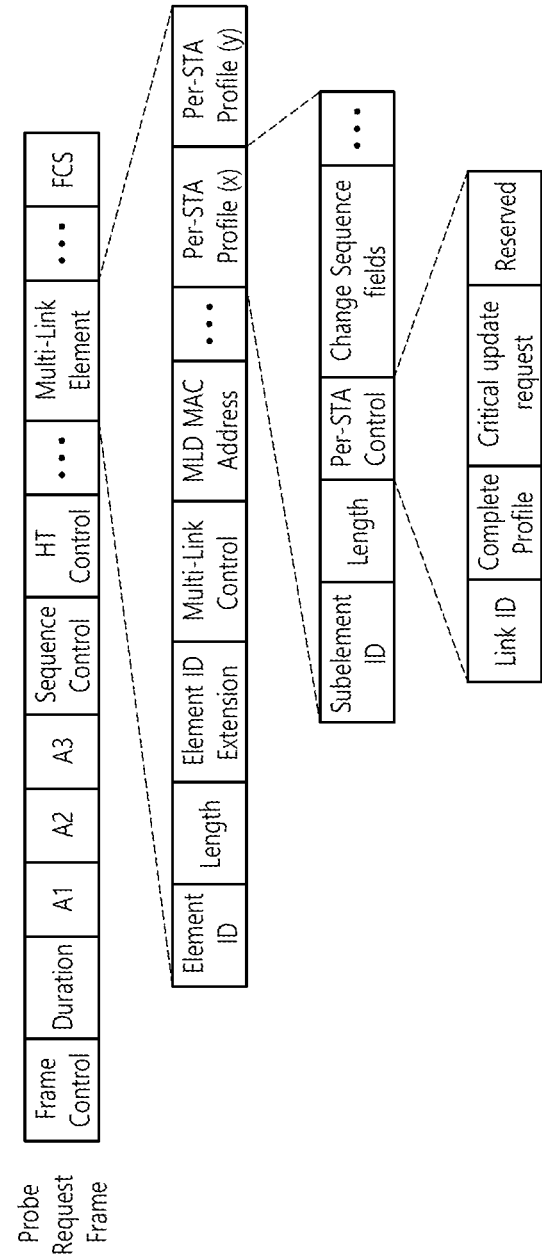
FIG. 61 illustrates an example of a probe request frame for a critical update information request.

FIG. 61 illustrates an example of a probe request frame for a critical update information request.

Referring to FIG. 61, an STA may transmit a request frame including change sequence fields (or change sequence element) indicating version information of critical update, currently owned by the STA, together with a critical update request frame which is an indicator for indicating a critical update information request. In this case, the change sequence fields mean an indicator indicating a per-link change sequence value. In the 802.11be, the STA may periodically receive a change sequence value for APs of a connected AP MLD through a beacon or a probe request. In addition, since it is defined that the STA stores these values, the STA knows per-link change sequence value information currently received by the STA. Therefore, the change sequence fields defined in the present specification mean information on versions (i.e., change sequence values) of critical update information on the APs of the connected AP MLD, which is obtained previously by the STA through the beacon or the probe response.

In this case, when a value of the 'critical update request' field is 1, it means that the STA requests critical update information, and otherwise, this value is indicated with 0. When the value of the 'critical update request' field is 0, since it means a critical update information request, transmission is performed by including the change sequence fields (or change sequence elements), whereas when the value is 0, this field is omitted in transmission. That is, in other words, when the value of the 'critical update request' field is 1, since the STA performs transmission by adding the changed sequence fields (or change sequence elements), an AP which has received this may transmit a response message by inserting only changed information (i.e., only changed information to be updated by the STA) as a result of comparing with information currently owned by the AP, and when the value of the 'critical update request' field is 0, the change sequence fields (or change sequence elements) are omitted in transmission to reduce an overhead. Additionally, the present specification also considers an option in which transmission is performed by including all information related to the critical update, currently owned by the AP, when the change sequence element is included in the ML IE in transmission as described above. If the change sequence field value transmitted by the STA and the field currently owned by the AP are different as a result of compassion performed by the AP, all information related to the critical update, currently owned by the AP, is transmitted to the STA. This method may result in an increase in an overhead for information transmitted by the AP, but may be implemented more simply since there is no need to store change information for each critical update version for each AP.

As such, the change sequence field (or change sequence element) may be defined by identifying a presence/absence thereof according to the 'critical update request' field value. Optionally, however, the 'critical update request' field value and the change sequence field (or change sequence element) may be used by being defined independently. If a request message transmitted by the STA does not include the change sequence fields (or change sequence elements) together with the 'critical update request' field having a value of 1, it is regarded that an AP which has received this desires to receive all critical update information, not the updated crucial update information alone, and thus a response is made by including all crucial update information in a response message. The present specification proposes a method in which change sequence value information obtained previously by the STA is transmitted together with the 'critical update request' field, and is compared with change sequence value information currently owned by the AP, and only changed information is transmitted by being inserted to a response frame as described below. In this case, although the change sequence fields are provided in this section as an example of transferring change sequence information on a link, the STA may request with the change sequence elements, not the change sequence fields. However, since the use of the change sequence element is already mentioned in the section above, an embodiment in which the change sequence element is used together with the 'critical update request' field is omitted in this section.

For example, when the STA transmits the probe request frame including the ML IE for MLD probing, information for requesting critical update may be included in a per-STA profile (x) sub-element for requesting information for each STA as shown in FIG. 61. In this case, the critical update request field is included in the per-STA control field, and the change sequence fields having the current critical update information of the STA may be located in the per-STA profile (x). In this case, the critical update sequence field may be located together with the change sequence fields in the per-STA profile (x), not in the per-STA control field. An embodiment thereof is as shown in FIG. 62.

Figure 62:
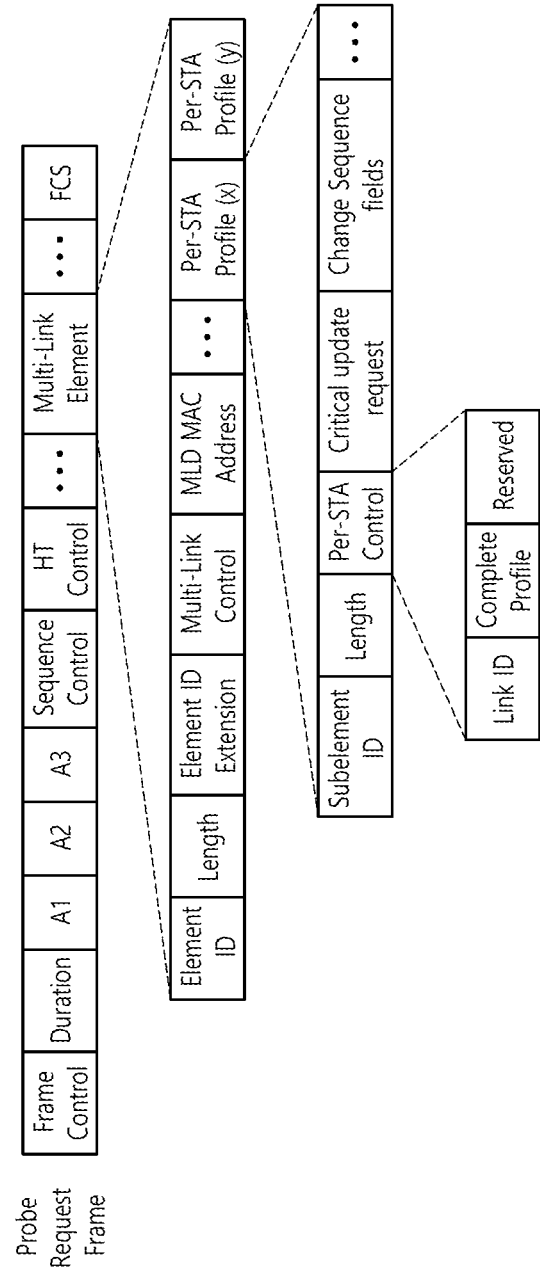
FIG. 62 illustrates another example of a probe request frame for a critical update information request.

FIG. 62 illustrates another example of a probe request frame for a critical update information request.

An AP which has received a request frame of FIG. 62 identifies ML IE information in the request frame, and transmits a response message including critical update information on a specific link, requested by an STA. In this case, if the critical update request field is present in the per-STA profile (x) in the ML IE and if a value thereof is 1, it is recognized that the critical update information is requested by the STA. In addition, change sequence information owned by the STA may be compared with current change sequence information on a link (X) requested by the STA through the change sequence fields information received together in this case, and if there is an update (i.e., if there is changed information to be updated by the STA), a compressed probe response frame including only updated information may be transmitted, or if there is an update, a response may be made for all information related to critical update by using a probe response frame.

Information mentioned above may be included not in a link-specific level in the ML IE but in a common info level, and thus critical update information may be requested not for a specific link but for all links at a time.

Figure 63:
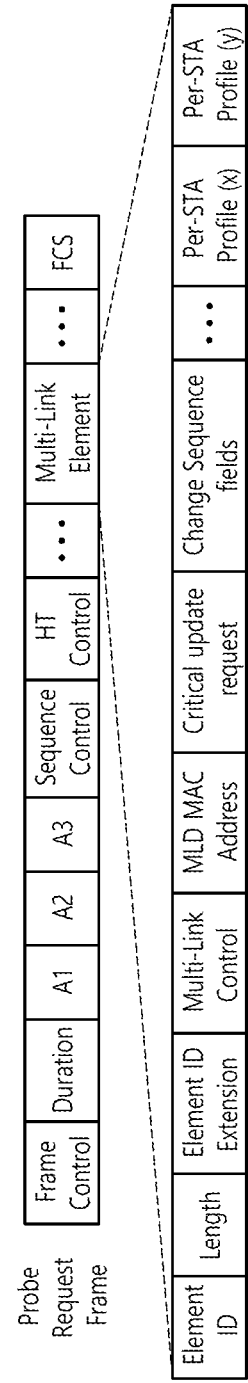
FIG. 63 illustrates another example of a probe request frame for a critical update information request.

An embodiment thereof is as shown in FIG. 63.

FIG. 63 illustrates another example of a probe request frame for a critical update information request.

As shown in FIG. 63, an STA may transmit a request frame including a critical update request field (i.e., a value is set to 1) and changes sequence fields at a common information location, not in a link-specific information location (e.g., per-STA profile (x)) in an ML IE. An AP which has received this may recognize that it is a request for all links owned by the STA, not for a specific link, and may compare change sequence fields information transmitted by the STA and current change sequence information on all links owned by the AP, and if there is an update (i.e., if there is changed information to be updated by the STA), a compressed probe response frame including only updated information on all links may be transmitted, or if there is an update, a response may be made for all information related to critical update by using a probe response frame.

Figure 64:
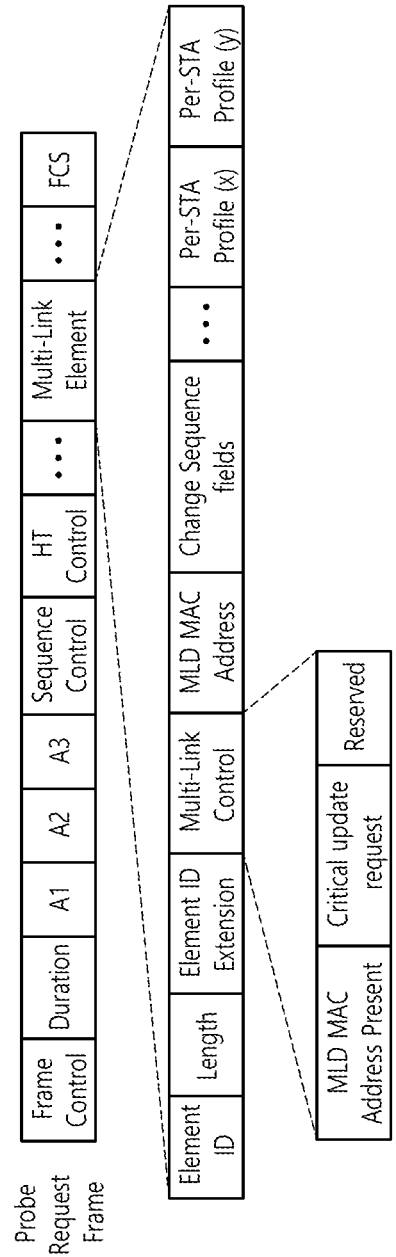
FIG. 64 illustrates another example of a probe request frame for a critical update information request.

FIG. 64 illustrates another example of a probe request frame for a critical update information request.

In this case, a critical update request field is located in the multi-link control field as shown in FIG. 64, and the STA may also indicate a changed critical update information request of a link.

Regarding the aforementioned method in which the STA requests critical update change information on a specific AP, the present specification additionally proposes a response operation in which an AP responds. In the current 802.11ax standard, when a 6 GHz AP receives a probe request, if the AP does not indicate an actual SSID of an SSID element of a beacon frame of the AP in transmission of a probe response frame, a rule of transmitting it by setting a broadcast address in an address 1 field is pre-defined. In a method being discussed in the 802.1be standard with reference to this, an address 1 field is set to a broadcast address if the AP does not indicate the actual SSID of the SSID element of the beacon frame of the AP when responding with an MLD probe response frame, in case of receiving an MLD probe request frame for requesting complete information on the AP operating at a 2.4 GHz band or a 5 GHz band.

For this, the present specification proposes a method in which the address 1 field is set to the broadcast address if the AP does not indicate the actual SSID of the SSID element of the beacon frame of the AP when the AP responds with the MLD probe response frame, even in a case where the STA requests critical update related information on a specific AP through the MLD probe request frame (e.g., when the STA transmits the MLD probe request frame including the change sequence field information). The critical update information is critical change information on the AP, which shall be known to all STAs before data transmission/reception. Therefore, in order to avoid a storm caused by MLD probing, the present specification proposes a method of responding with a broadcast message in the absence of an additional indicator when the STA requests partial information on critical update of a specific AP.

In addition, as described above, a method in which the AP MLD stores which information (i.e., IEs) is updated for each change sequence number (CSN) of each AP (whenever critical update occurs) may be implemented according to an implementation of the AP MLD, or may not be implemented according to a memory size. If the method is supported, the AP needs to remember specific IE information for which update occurs whenever the CSN of the AP changes. For example, when a critical update event for an element X occurs at CSN n=1 and when an update for elements Y and Z occurs at CSN=n+1, the AP shall maintain information indicating which information is changed at CSN=n and CSN n+1. As such, if the AP is capable of tracking which IE changes for each CSN, when the STA transmits a request frame including CSN information currently stored in the STA, not complete information but only changed information may be included in transmission by comparing with the current CSN value of the AP, which may be useful in terms of an overhead. However, the tracking may not be easy, and a corresponding ability may be supported or may not be supported according to an implementation of the AP since an additional memory may also be required for the AP. Therefore, an ability for indicating the capacity for tracking the per-CSN update information on the AP is proposed in the disclosure as follows.

'Critical update Tracking Support' field: This field is information used by the STA or AP to indicate whether to support a function of storing which information (e.g., element ID (EI) information) is updated currently for each CSN value. When a value thereof is 1, this means that the STA or the AP supports an ability for storing specific information for which update occurs for each CSN value, and when the value is 0, it means that the STA or the AP does not support this ability. For example, this field may be included in an extended capabilities element, an EHT capabilities element, or the like.

The STA may verity whether a corresponding AP (or STA) supports this function in an association process, and may utilize this to request critical update information on a specific AP (or STA). This function may be supported at an MLD level, or may be supported at an STA level for each STA.

As such, when the 'critical update tracking support' field indicating whether to support critical update tracking of the MLD is defined, a specific operation based on this may be defined as follows.

For example, when the AP MLD supports critical update tracking (e.g., 'Critical update Tracking Support' field=1), the non-AP MLD may know this in a multi-link setup process.

When the AP MLD supports the critical update tracking, the STA of the non-AP MLD may transmit a probe request frame including change sequence number (CSN) information when only partial information related to critical update is requested. An AP which has received this may compare the current CAN of the AP and the CSN information received from the STA, and may transmit a probe response frame including only updated information. In this case, however, when the STA desires to obtain not only changed information but also complete information related to critical update of the AP, desired information (complete information related to critical update of the AP) may be obtained by transmitting the probe request frame not including the CSN information when the partial information related to critical update is requested.

When the AP MLD does not support the critical update tracking (e.g., 'Critical update Tracking Support' field=0), the STA of the non-AP MLD may not transmit the probe request frame including the CSN information when only information related to critical update is requested. An AP which has received this may transmit the probe response frame including element information related to all critical updates corresponding to the current CSN of the AP (or if there is no additional instruction, requested complete information (i.e., complete profile) of the AP. In this case, however, the STA may transmit the probe request frame including the CSN information when partial information related to critical update is requested. However, since the AP which has received this is not able to track update information for each CSN, the probe response frame including element information related to all critical updates corresponding to the current CAN of the AP (or if there is no additional instruction, requested complete information (i.e., complete profile) of the AP) may be transmitted.

As such, if the non-AP MLD may know whether to support tracking of per-CSN update information on the AP MLD by defining the 'critical update tracking support' field in the MLD, it may be useful since the non-AP MLD may determine whether to include CSN information in the probe request frame when partial information related to critical update is requested.

According to an embodiment, the AP MLD and the non-AP MLD may enable an IOM method proposed through the signaling method proposed in the present specification in the process or the multi-link setup or after the multi-link setup. In addition, the AP MLD and the non-AP MLD may restrict an information range and type requested through various field values in an IOM capability element.

According to an embodiment, although an IOM operation may be performed after accurate operational negotiation between the MLDs through the aforementioned signaling method, the IOM operation may also be performed by implementation of the MLD without an additional signaling process. This may imply that the operation is performed by implementing the AP MLD or the non-AP MLD, without negotiation of the AP MLD and the non-AP MLD.

The AP MLD and the non-AP MLD may operate, based on the aforementioned embodiments. However, when the MLD performs the IOM operation without additional signal exchange, the following restriction may occur.

1) Restriction on the solicited method: If info sharing is not supported between the APs of the AP MLD, a response may be made when the STA requests information on another link.

2) Restriction on the unsolicited method: The AP may provide an additional message (e.g., beacon period, etc.) by autonomously determining an STA which requires additional link information. Therefore, the STA may not predict whether the STA will receive this information.

When the MLD implements the IOM without an additional signal method, advantageously, an operation process becomes simple, but there is a problem in that the aforementioned restrictions may occur.

According to an embodiment, a method of requesting information on a multi-link may be configured based on the agreement between the AP MLD and the non-AP MLD, performed by using the aforementioned IOM capability element. Unlike this, in case of the solicited method, the STA may indicate specific information, not agreed content, and may desire to temporarily obtain the information. In this case, when the STA dynamically transmits a request message, a request may be made by including indicated content (e.g., IOM capability information).

For example, although the STA may receive information provided by the AP, based on the content agreed between the AP MLD and the non-AP MLD in the process or after the multi-link setup, the STA may desire to temporarily request information on a specific AP or specific parameter information on APs. In this case, when information is requested, the STA may transmit a request frame (e.g., probe request frame, (re)association frame, new frame, etc.) including an instruction for information desired to be requested in the "IOM capability" element. The AP may transmit/provide to the STA a response message including information desired to be requested by the STA. According to an embodiment, when a field in the IOM capability element is omitted, the AP may provide information to the STA, based on the existing negotiated content.

Accordingly, the MLD (AP MLD or non-AP MLD) may perform negotiation between the AP MLD and the non-AP MLD by using the aforementioned element, in the process or after the multi-link setup. The non-AP MLD may agree on information to be provided (or information to be received), based on the negotiation, and may receive the agreement. In addition, the STA may transmit a request message including an instruction on information described to be received, so that only requested information is temporarily received. However, when a specific instruction is omitted in the request message, the non-AP MLD and the AP MLD may operate based on an instruction agreed by default.

According to an embodiment, when it is desired to change the agreed content after the multi-link setup is complete, the non-AP MLD and the AP MLD may update the content agreed between the MLDs through additional message exchange.

A procedure for BSS parameter critical update will be described as follows.

When an AP of an AP MLD does not belong to a multi-BSSID or if the AP corresponds to a transmitted BSSID in a multi-BSSID set, the AP transmits a beacon and a probe response frame including a BSS parameter change count (BPCC) subfield for each of all APs belonging to the same AP MLD.

A value of the BPCC subfield of each AP is initialized to 0, and shall be incremented (module 256) when critical update occurs for an operational parameter for the AP.

The BPCC subfield for each of other APs of the AP MLD shall be transferred in an MLD parameters subfield of a target beacon transmission time (TBTT) information field of a reduced neighbor report (RNR) element corresponding to the AP.

The BPCC subfield for the AP shall be transferred in the common info field of the basic multi-link element.

The AP provides a critical update flag subfield of a capability information field of a beacon and probe response frame, and transmits an update indicator for a value transferred in the BPCC subfield of the MLD parameters field of the RNR element of a specific AP of the same AP MLD (or a value transferred in the BPCC subfield of the common info field of the basic multi-link element).

When there is a change in a value transferred in a BPCC subfield of the MLD parameters field of the RNR element for a specific AP of the same AP MLD (or a value transferred in a BPCC subfield of a common info field of the basic multi-link element), the AP sets the critical update flag subfield of the capability information field in the beacon frame to 1, and allows to include a next DTIM beacon frame for a link in which the AP operates.

Otherwise, the AP sets the critical update frag subfield of the capability information field to 1.

The non-AP MLD shall maintain a record of a value of the most recently received BPCC subfield for each AP of the AP MLD in which a multi-link is configured.

Hereinafter, the aforementioned embodiment will be described with reference to FIG. 1 to FIG. 64.

Figure 65:
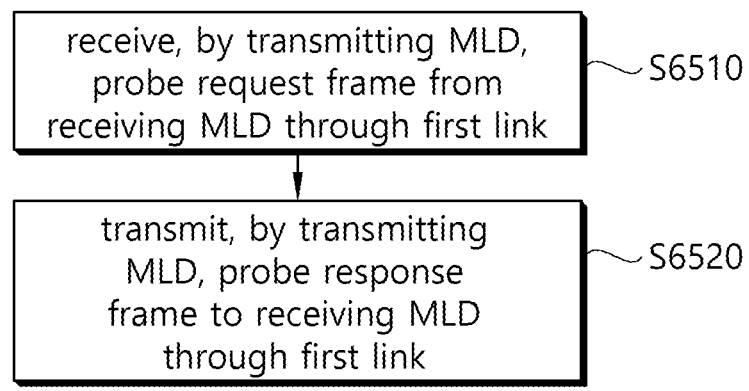
FIG. 65 is a flowchart illustrating a procedure in which a transmitting MLD provides a receiving MLD with complete or partial information on an AP, based on a probe response frame according to the present disclosure.

FIG. 65 is a flowchart illustrating a procedure in which a transmitting MLD provides a receiving MLD with complete or partial information on an AP, based on a probe response frame according to the present disclosure.

An example of FIG. 65 may be performed in a network environment in which a next-generation WLAN system (IEEE 802.11be or EHT WLAN system) is supported. The next-generation WLAN system is a WLAN system evolved from an 802.11ax system, and may satisfy backward compatibility with the 802.11ax system.

The present embodiment proposes a method and apparatus in which, when a non-AP STA requests information on not a peer AP but other APs through a probe request frame, the probe request frame includes a complete information profile subfield, so that whether the request is a partial information request or a complete information request is determined according to a value of the complete information profile subfield. Herein, a transmitting MLD may correspond to an AP MLD, and a receiving MLD may correspond to a non-AP MLD. If the non-AP STA is a first receiving STA, a first transmitting STA connected to the first receiving STA through a first link may be a peer AP, and second and third transmitting STAs connected through other links may be other APs.

In operation S6510, the transmitting MLD receives a probe request frame from a receiving MLD through a first link.

In step S6520, the transmitting MLD transmits a probe response frame to the receiving MLD through the first link.

The transmitting MLD includes a first transmitting station (STA) operating in the first link and a second transmitting STA operating in a second link. The receiving MLD includes a first receiving STA operating in the first link and a second receiving STA operating in the second link.

The probe request frame includes a profile field of the second receiving STA. The profile field of the second receiving STA includes a first complete information profile subfield.

When the first receiving STA requests partial information on the second link, a value of the first complete information profile subfield is set to 0. When the first receiving STA requests complete information on the second link, the value of the first complete information profile subfield is set to 1.

That is, the probe response frame may be configured based on the value of the first complete information profile subfield. When the value of the first complete information profile subfield is 0, the transmitting MLD may transfer the probe response frame including the partial information the second link. When the value of the first complete information profile subfield is 1, the transmitting MLD may transfer the probe response frame including the complete information on the second link.

In addition, the receiving MLD may request complete information or partial information on a plurality of APs in the transmitting MLD.

The transmitting MLD further may include a third transmitting STA operating in a third link. The receiving MLD further may include a third receiving STA operating in the third link.

The probe request frame may further include a profile field of the third receiving STA. A profile field of the third receiving STA may include a second complete information profile subfield.

When the first receiving STA requests partial information on the third link, a value of the second complete information profile subfield may be set to 0. When the first receiving STA requests complete information on the third link, a value of the third complete information profile subfield may be set to 1.

Likewise, the probe response frame may be configured based on the value of the second complete information profile subfield. When the value of the second complete information profile subfield is 0, the transmitting MLD may transfer the probe response frame including the partial information the third link. When the value of the second complete information profile subfield is 1, the transmitting MLD may transfer the probe response frame including the complete information on the third link.

That is, the present embodiment proposes a method of identifying whether a non-AP STA (first receiving STA) requests complete information on other APs (second and third transmitting STAs) in an AP MLD or requests partial information thereof through the aforementioned complete information profile subfield. Accordingly, the AP MLD may decode the complete information profile subfield to determine whether to include complete information on other APs in a probe response frame or to include partial information therein.

The probe request frame may include a first request element and a multi-link element. When the first receiving STA requests partial information on the first link, the partial information on the first link may be requested based on the first request element. The profile fields of the second and third receiving STAs may be included in the multi-link element. That is, in MLD communication, the non-AP STA may request information on a peer AP through a request element not included in the multi-link element, and may request information on another AP which is not the peer AP through the multi-link element.

The profile field of the second receiving STA may further include a first update subfield.

When a value of the first update subfield is set to 1, the probe response frame may include only updated information out of the requested partial information on the second link. When the value of the first update subfield is set to 0, the probe response frame may include the requested partial information on the second link.

The profile field of the third receiving STA may further include a second update subfield. When a value of the second update subfield is set to 1, the probe response frame may include only updated information out of the requested partial information on the third link. When the value of the second update subfield is set to 0, the probe response frame may include the requested partial information on the third link.

Figure 66:
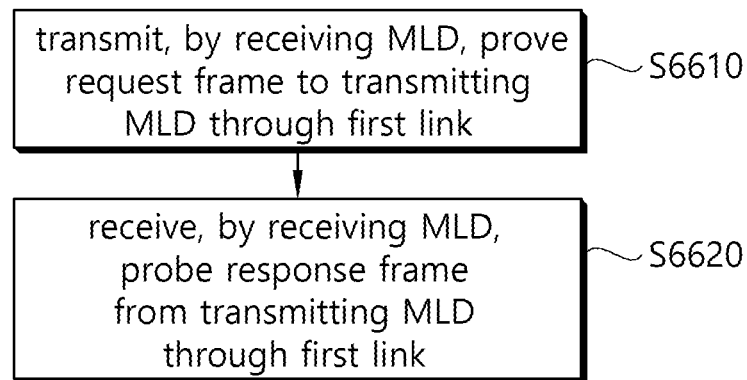
FIG. 66 is a flowchart illustrating a procedure in which a receiving MLD provides a transmitting MLD with complete or partial information on an AP, based on a probe request frame according to the present disclosure.

FIG. 66 is a flowchart illustrating a procedure in which a receiving MLD provides a transmitting MLD with complete or partial information on an AP, based on a probe request frame according to the present disclosure.

An example of FIG. 66 may be performed in a network environment in which a next-generation WLAN system (IEEE 802.11be or EHT WLAN system) is supported. The next-generation WLAN system is a WLAN system evolved from an 802.11ax system, and may satisfy backward compatibility with the 802.11ax system.

The present embodiment proposes a method and apparatus in which, when a non-AP STA requests information on not a peer AP but other APs through a probe request frame, the probe request frame includes a complete information profile subfield, so that whether the request is a partial information request or a complete information request is determined according to a value of the complete information profile subfield. Herein, a transmitting MLD may correspond to an AP MLD, and a receiving MLD may correspond to a non-AP MLD. If the non-AP STA is a first receiving STA, a first transmitting STA connected to the first receiving STA through a first link may be a peer AP, and second and third transmitting STAs connected through other links may be other APs.

In operation S6610, a receiving MLD transmits a probe request frame to a transmitting MLD through a first link.

In step S6620, the receiving MLD receives a probe response frame from the transmitting MLD through the first link.

The transmitting MLD includes a first transmitting station (STA) operating in the first link and a second transmitting STA operating in a second link. The receiving MLD includes a first receiving STA operating in the first link and a second receiving STA operating in the second link.

The probe request frame includes a profile field of the second receiving STA. The profile field of the second receiving STA includes a first complete information profile subfield.

When the first receiving STA requests partial information on the second link, a value of the first complete information profile subfield is set to 0. When the first receiving STA requests complete information on the second link, the value of the first complete information profile subfield is set to 1.

That is, the probe response frame may be configured based on the value of the first complete information profile subfield. When the value of the first complete information profile subfield is 0, the transmitting MLD may transfer the probe response frame including the partial information the second link. When the value of the first complete information profile subfield is 1, the transmitting MLD may transfer the probe response frame including the complete information on the second link.

In addition, the receiving MLD may request complete information or partial information on a plurality of APs in the transmitting MLD.

The transmitting MLD further may include a third transmitting STA operating in a third link. The receiving MLD further may include a third receiving STA operating in the third link.

The probe request frame may further include a profile field of the third receiving STA. A profile field of the third receiving STA may include a second complete information profile subfield.

When the first receiving STA requests partial information on the third link, a value of the second complete information profile subfield may be set to 0. When the first receiving STA requests complete information on the third link, a value of the third complete information profile subfield may be set to 1.

Likewise, the probe response frame may be configured based on the value of the second complete information profile subfield. When the value of the second complete information profile subfield is 0, the transmitting MLD may transfer the probe response frame including the partial information the third link. When the value of the second complete information profile subfield is 1, the transmitting MLD may transfer the probe response frame including the complete information on the third link.

That is, the present embodiment proposes a method of identifying whether a non-AP STA (first receiving STA) requests complete information on other APs (second and third transmitting STAs) in an AP MLD or requests partial information thereof through the aforementioned complete information profile subfield. Accordingly, the AP MLD may decode the complete information profile subfield to determine whether to include complete information on other APs in a probe response frame or to include partial information therein.

The probe request frame may include a first request element and a multi-link element. When the first receiving STA requests partial information on the first link, the partial information on the first link may be requested based on the first request element. The profile fields of the second and third receiving STAs may be included in the multi-link element. That is, in MLD communication, the non-AP STA may request information on a peer AP through a request element not included in the multi-link element, and may request information on another AP which is not the peer AP through the multi-link element.

The profile field of the second receiving STA may further include a first update subfield.

When a value of the first update subfield is set to 1, the probe response frame may include only updated information out of the requested partial information on the second link. When the value of the first update subfield is set to 0, the probe response frame may include the requested partial information on the second link.

The profile field of the third receiving STA may further include a second update subfield. When a value of the second update subfield is set to 1, the probe response frame may include only updated information out of the requested partial information on the third link. When the value of the second update subfield is set to 0, the probe response frame may include the requested partial information on the third link.

The aforementioned technical feature of the present specification may be applied to various apparatuses and methods. For example, the aforementioned technical feature of the present specification may be performed/supported through the apparatus of FIG. 1 and/or FIG. 11. For example, the aforementioned technical feature of the present specification may be applied only to part of FIG. 1 and/or FIG. 11. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 610 and memory 620 of FIG. 11. For example, the apparatus of the present specification transmits a probe request frame to a transmitting MLD through a first link, and receives a probe response frame from the transmitting MLD through the first link.

The technical feature of the present specification may be implemented based on a computer readable medium (CRM). For example, the CRM proposed by the present specification is at least one computer readable medium including an instruction executed by at least one processor.

The CRM may store instructions executing operations including: transmitting a probe request frame to a transmitting MLD through a first link; and receiving a probe response frame from the transmitting MLD through the first link. The instruction stored in the CRM of the present specification may be executed by at least one processor. The at least one processor related to the CRM of the present specification may be the processors 111 and 121 or processing chips 114 and 124 of FIG. 1 or the processor 610 of FIG. 11. Meanwhile, the CRM of the present specification may be the memories 112 and 122 of FIG. 1 or the memory 620 of FIG. 11 or a separate external memory/storage medium/disk or the like.

The foregoing technical features of the present specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality. Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method in a wireless local area network (WLAN) system, the method comprising:
   transmitting, by a receiving multi-link device (MLD), a probe request frame to a transmitting MLD through a first link; and
   receiving, by the receiving MLD, a probe response frame from the transmitting MLD through the first link,
   wherein the transmitting MLD includes a first transmitting STA (station) operating in the first link and a second transmitting STA operating in a second link,
   wherein the receiving MLD includes a first receiving STA operating in the first link and a second receiving STA operating in the second link,
   wherein the probe request frame includes a profile field of the second receiving STA,
   wherein the profile field of the second receiving STA includes a first complete information profile subfield,
   wherein when the first receiving STA requests partial information on the second link, a value of the first complete information profile subfield is set to 0, and
   wherein when the first receiving STA requests complete information on the second link, the value of the first complete information profile subfield is set to 1.

2. The method of claim 1,
   wherein the transmitting MLD further includes a third transmitting STA operating in a third link,
   wherein the receiving MLD further includes a third receiving STA operating in the third link,
   wherein the probe request frame further includes a profile field of the third receiving STA, and
   wherein the profile field of the third receiving STA includes a second complete information profile subfield.

3. The method of claim 2,
   wherein when the first receiving STA requests partial information on the third link, a value of the second complete information profile subfield is set to 0, and
   wherein when the first receiving STA requests complete information on the third link, a value of the third complete information profile subfield is set to 1.

4. The method of claim 1,
   wherein the probe request frame includes a first request element and a multi-link element,
   wherein when the first receiving STA requests partial information on the first link, the partial information on the first link is requested based on the first request element, and
   wherein the profile fields of the second and third receiving STAs are included in the multi-link element.

5. The method of claim 1,
   wherein the profile field of the second receiving STA further includes a first update subfield,
   wherein when a value of the first update subfield is set to 1, the probe response frame includes only updated information out of the requested partial information on the second link, and
   wherein when the value of the first update subfield is set to 0, the probe response frame includes the requested partial information on the second link.

6. The method of claim 2,
   wherein the profile field of the third receiving STA further includes a second update subfield,
   wherein when a value of the second update subfield is set to 1, the probe response frame includes only updated information out of the requested partial information on the third link, and
   wherein when the value of the second update subfield is set to 0, the probe response frame includes the requested partial information on the third link.

7. The method of claim 2, wherein the probe response frame is configured based on values of the first and second complete information profile subfields.

8. A receiving multi-link device (MLD) in a wireless local area network (WLAN) system, the receiving MLD comprising:
   a memory;
   a transceiver; and
   a processor operatively coupled to the memory and the transceiver, wherein the processor is configured to:
   transmit a probe request frame to a transmitting MLD through a first link; and
   receive a probe response frame from the transmitting MLD through the first link,
   wherein the transmitting MLD includes a first transmitting station (STA) operating in the first link and a second transmitting STA operating in a second link,
   wherein the receiving MLD includes a first receiving STA operating in the first link and a second receiving STA operating in the second link, wherein the probe request frame includes a profile field of the second receiving STA, wherein the profile field of the second receiving STA includes a first complete information profile subfield, wherein when the first receiving STA requests partial information on the second link, a value of the first complete information profile subfield is set to 0, and wherein when the first receiving STA requests complete information on the second link, the value of the first complete information profile subfield is set to 1.

9. A method in a wireless local area network (WLAN) system, the method comprising:

receiving, by a transmitting multi-link device (MLD), a probe request frame from a receiving MLD through a first link; and transmitting, by the transmitting MLD, a probe response frame to the receiving MLD through the first link, wherein the transmitting MLD includes a first transmitting station (STA) operating in the first link and a second transmitting STA operating in a second link, wherein the receiving MLD includes a first receiving STA operating in the first link and a second receiving STA operating in the second link, wherein the probe request frame includes a profile field of the second receiving STA, wherein the profile field of the second receiving STA includes a first complete information profile subfield, wherein when the first receiving STA requests partial information on the second link, a value of the first complete information profile subfield is set to 0, and wherein when the first receiving STA requests complete information on the second link, the value of the first complete information profile subfield is set to 1.

10. The method of claim 9, wherein the transmitting MLD further includes a third transmitting STA operating in a third link, wherein the receiving MLD further includes a third receiving STA operating in the third link, wherein the probe request frame further includes a profile field of the third receiving STA, and wherein the profile field of the third receiving STA includes a second complete information profile subfield.

11. The method of claim 10, wherein when the first receiving STA requests partial information on the third link, a value of the second complete information profile subfield is set to 0, and wherein when the first receiving STA requests complete information on the third link, a value of the third complete information profile subfield is set to 1.

12. The method of claim 9, wherein the probe request frame includes a first request element and a multi-link element, wherein when the first receiving STA requests partial information on the first link, the partial information on the first link is requested based on the first request element, and wherein the profile fields of the second and third receiving STAs are included in the multi-link element.

13. The method of claim 9, wherein the profile field of the second receiving STA further includes a first update subfield, wherein when a value of the first update subfield is set to 1, the probe response frame includes only updated information out of the requested partial information on the second link, and wherein when the value of the first update subfield is set to 0, the probe response frame includes the requested partial information on the second link.

14. The method of claim 10, wherein the profile field of the third receiving STA further includes a second update subfield, wherein when a value of the second update subfield is set to 1, the probe response frame includes only updated information out of the requested partial information on the third link, and wherein when the value of the second update subfield is set to 0, the probe response frame includes the requested partial information on the third link.

15. The method of claim 10, wherein the probe response frame is configured based on values of the first and second complete information profile subfields.

* * * * *